US006961345B2

(12) United States Patent
Mizuguchi et al.

(10) Patent No.: US 6,961,345 B2
(45) Date of Patent: Nov. 1, 2005

(54) SYSTEM, METHOD AND APPARATUS FOR DATA TRANSMISSION

(75) Inventors: Yuji Mizuguchi, Osaka (JP); Takahisa Sakai, Hyogo (JP); Toshihisa Ikeda, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 821 days.

(21) Appl. No.: 09/749,723

(22) Filed: Dec. 28, 2000

(65) Prior Publication Data

US 2001/0006525 A1 Jul. 5, 2001

(30) Foreign Application Priority Data

Dec. 28, 1999 (JP) ............................................. 11-373644

(51) Int. Cl.$^7$ ................................................. H04J 3/16
(52) U.S. Cl. ....................................... 370/452; 370/503
(58) Field of Search ............................... 370/452, 442, 370/503, 538, 231, 465

(56) References Cited

U.S. PATENT DOCUMENTS

| 5,406,559 | A | * | 4/1995 | Edem et al. ................. 370/516 |
| 5,544,324 | A | * | 8/1996 | Edem et al. ................. 709/231 |
| 5,550,802 | A | * | 8/1996 | Worsley et al. ............. 370/252 |
| 6,253,245 | B1 | * | 6/2001 | Helbig ........................ 709/232 |
| 6,611,537 | B1 | * | 8/2003 | Edens et al. ................ 370/503 |

FOREIGN PATENT DOCUMENTS

| EP | 0 174 099 | 8/1985 |
| EP | 0 656 704 | 6/1995 |
| EP | 0 696 853 | 7/1995 |
| JP | 2000-101615 | 4/2000 ................. 370/503 |
| WO | 99/63698 | 12/1999 |

OTHER PUBLICATIONS

J. Sakai et al.: "Development of a High Speed Optical Lan for in–vehicle System" Proceedings of the 4$^{th}$ World Congress on Intelligent Transport Systems, Oct. 1997, Pp. 1–7, XP008042680.

J. Sakai et al: "HIQOS–BUS Multimedia Data Bus for In–Vehicle Information Systems" Mashushita Technical Journal, Matsushita Denki Sangyo Kabushiki Gaisha, Moriguchi, JP, vol. 44, No. 3, jun. 1998, pp. 125–132, XP009003440.

"MOST specification Framework Rev 1.1" 1999, Most Cooperation, XP002317478.

Thiel C et al:"Media Orented Systems Ttrnsport (Most) Standard für Multimedia Networking IM Fahrzeug Medai Oriented Systems Transport )Most) Standard for Multimedia Networking in Vehicle Environment" VDI Berichte, Duesseldorf, DE, No. 1415, 1998, pp. 819–834, XP001121034.

Bloks R H J; "The IEEE–1394 high speed serial bus" Philips Journal of Reserach Elsevier, Amsterdam, NL, vol. 50, No. 1, 1996, pp. 209–216, XP004008212.

Rangan P V et al.: "Continuity and Synchronization in MPEG" IEE Journal on Selected Areas in Communications, IEE Inc. New YUork, US. vol. 14, No. 1, 1996, pp. 52–60, XP000548810.

* cited by examiner

Primary Examiner—Ricky Ngo
Assistant Examiner—Richard Chang
(74) Attorney, Agent, or Firm—Wenderoth, Lind & Ponack, L.L.P.

(57) ABSTRACT

A data transmission system including first and second source devices for transmitting video data (isochronous data) outputted from first and second data output units, and a sink device for receiving the video data transmitted from the source devices and outputting the data to a video composition device, in which the video data supplied from the data output units to the source device are synchronized in frame units and transmitted from the source devices to one sink device. In the data transmission system, synchronous information (reference signal information) in the video composition device is transmitted from the sink device to the source devices, and timing reference signals in the data output units are generated by the source devices based on the synchronous information.

31 Claims, 29 Drawing Sheets

Fig.4 (a)
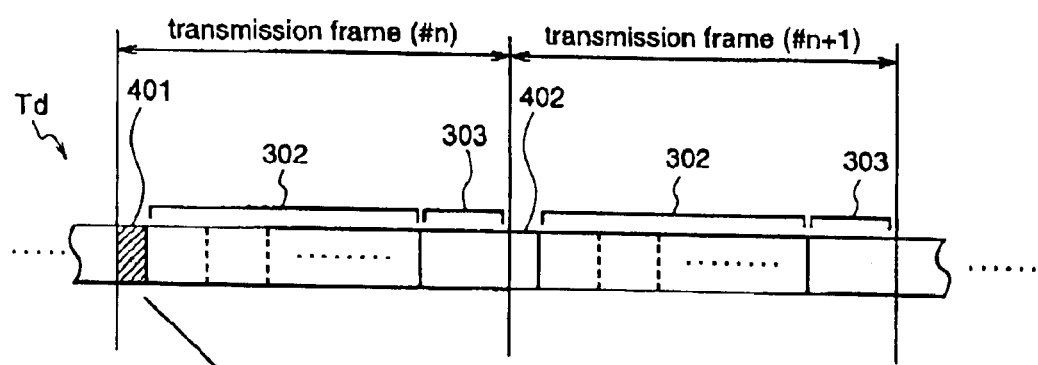
Fig.4 (b)
Fig.4 (c)
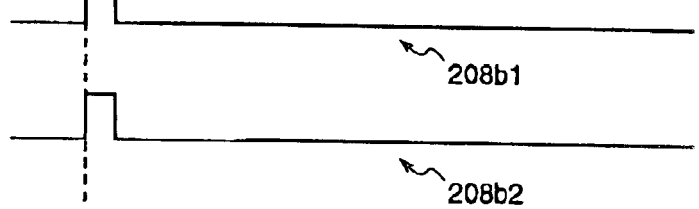

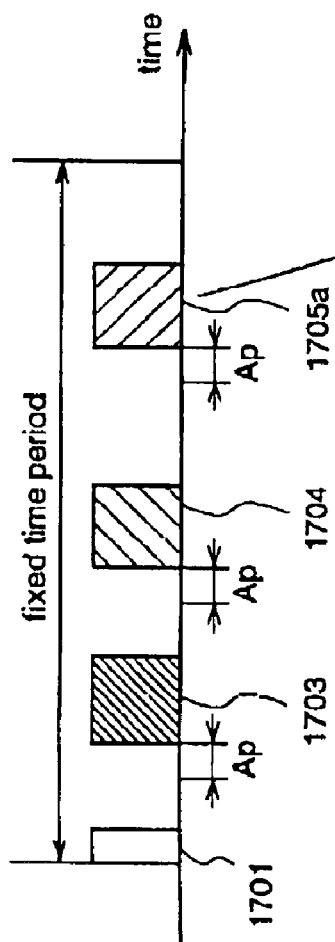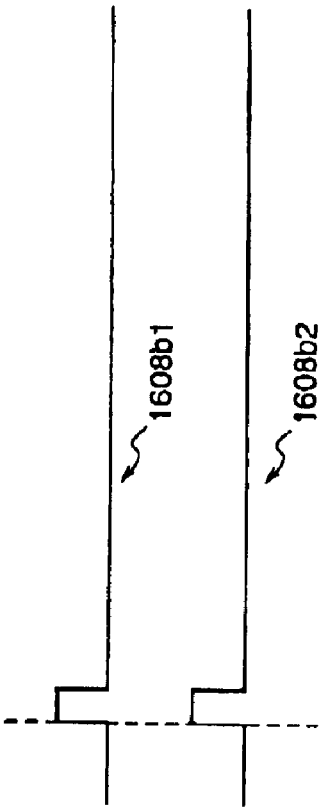
Fig.18 (a)
Fig.18 (b)
Fig.18 (c)

SYSTEM, METHOD AND APPARATUS FOR DATA TRANSMISSION

FIELD OF THE INVENTION

The present invention relates to a system, method and apparatus for data transmission and, more particularly, to a transmission processing of transmitting, via a transmission line such as a data bus, isochronous data which are required to be transmitted with a suppressed transmission delay and asynchronous data which are not synchronized with other data.

BACKGROUND OF THE INVENTION

There is a conventional system of transmitting isochronous data having high real-time characteristics such as audio data or video data. This data transmission system can be utilized in a security system having plural monitoring cameras and one display device, where the security system composes video data from the respective cameras so as to display video on the one display device. Alternatively, the conventional data transmission system can be utilized in a rear-looking system which is mounted on a motor vehicle having cameras which take images on the right, left, and rear sides of the motor vehicle as substitutes for the right and left side mirrors of the motor vehicle, such a rear-looking system composes video data from the cameras so as to display video on a monitor in the vehicle.

FIG. 30 is a diagram illustrating an example of the prior art data transmission system.

The data transmission system 3000 as shown in FIG. 30 comprises a first source device (transmission device) 3002 for receiving a video data 3012 from a first data output unit 3101, which is external to the system, as a first isochronous data Dt1 and transmitting the isochronous data Dt1 at a predetermined timing, and a second source device (transmission device) 3003 for receiving a video data 3103 from a second data output unit 3102, which is external to the system, as a second isochronous data Dt2 and transmitting the isochronous data Dt2 at a predetermined timing The data output units 3101 and 3102 are image-taking devices such as CCD (charge coupled device) cameras. The first source device 3002 has a transmission buffer 3022 which retains the isochronous data Dt1 for a prescribed period, i.e., from its input timing to its output timing. The second source device 3003 has a transmission buffer 3023 which retains the isochronous data Dt2 for a prescribed period, i.e., from its input timing to its output timing.

The data transmission system 3000 comprises a sink device 3001 which is connected to the respective source devices 3002 and 3003 via a transmission line 3000a such as a data bus. The sink device 3001 receives the isochronous data that is transmitted by the respective source devices 3002 and 3003 and outputs the isochronous data at a predetermined timing. The data transmission system 3000 also comprises a video data buffer 3030 for containing an isochronous data 3011 that is output by the sink device 3001 and outputting the contained isochronous data to a video composition device 3200, which is external to the data transmission system 300, at an output timing corresponding to the video composition device 3200. The sink device 3001 has a receiving buffer 3021 which retains the received isochronous data Dt1 and Dt2 for a prescribed period, i.e., from its receiving time to its output timing.

In addition, the data transmission system 3000 can transmit/receive asynchronous data, other than the isochronous data, such as command data for controlling the respective devices, between the sink device 3001 and the respective source devices 3002 and 3003 via the transmission line 3000a.

As shown in FIG. 30, the data transmission system 3000 consisting of the first and second source devices 3002 and 3003, which are mutually connected by the transmission line 3000a such as a data bus, and the sink device 3001 is called a multimedia LAN (Local Area Network) or multimedia bus.

The operation of the data transmission system 3000 will now be described.

Hereinafter, as a specific operation of the data transmission system 3000, a description is given of a case where the first and second video data 3012 and 3013 that are output from the data output units (cameras) 3101 and 3102, which are external to the data transmission system 3000, are transmitted by the data transmission system 3000 to the video composition device 3200 which is external to the system, and then composition and display of the video data 3012 and 3013 is performed by the video composition device 3200.

To be specific, the video data 3012 and 3013 which have been output from the data output units 3101 and 3102 that are external to the system are input to the corresponding source devices 3002 and 3003 in the system 3000, respectively.

In the source device 3002, the input video data 3012 is retained in the transmission buffer 3022, and thereafter, the video data 3012 is output to the transmission line 3000a as the isochronous data Dt1 at a predetermined timing. In the source device 3003, the input video data 3013 is retained in the transmission buffer 3023, and thereafter, the video data 3013 is output to the transmission line 3000a as the isochronous data Dt2 at a predetermined timing.

Then, in the sink device 3001, the isochronous data Dt1 and Dt2 which have been transmitted from the source devices 3002 and 3003 to the transmission line 3000a at the predetermined timing are received, and the received isochronous data Dt1 and Dt2 are retained in the receiving buffer 3021.

Thereafter, in the sink device 3001, a processing of outputting, as a sink output 3011, the isochronous data Dt1 and Dt2 that are retained in the receiving buffer 3021 to the video data buffer 3030 at the prescribed timing is performed. At this time, the isochronous data Dt1 and Dt2 are output in the order in which the data are received by the sink device 3001.

In the video data buffer 3030, a processing for delaying one of the isochronous data Dt1 and Dt2 which have been input as the sink outputs 3011 is performed so that the output timings of the both data for the respective frames coincide with each other. The isochronous data Dt1 and Dt2 to be composed as data which form the same frame are output from the buffer 3030 to the external video composition device 3200 at the same timing.

In this video composition device 3200, a composed image of video that is taken by the respective cameras is displayed based on composed video data which is obtained by the composition processing for the isochronous data Dt1 and Dt2.

In the above-mentioned prior art transmission system 3000, the first and second source devices 3002 and 3003 transmit the video data (isochronous data) to the sink device 3001 at their own timings, respectively. Therefore, in the sink device 3001, the isochronous data Dt1 and Dt2 that are transmitted from the respective source devices are received at arbitrary timings and are stored in the transmission buffer 3021. Accordingly, the output timing corresponding to each frame of the isochronous data Dt1 which is output from the transmission buffer 3021 as the buffer output 3011 does not match the output timing corresponding to each frame of the isochronous data Dt2 which is output from the transmission buffer 3021 as the buffer output 3011.

Thus, in the prior art transmission system 3000, the video data buffer 3030 for containing the buffer output 3011 is provided in the subsequent stage of the transmission buffer 3021. Then, in the video data buffer 3030, the gap between the output timing corresponding to each frame of the isochronous data Dt1 and the output timing corresponding to each frame of the isochronous data Dt2 is absorbed.

However, in the video data buffer 3030, the isochronous data is delayed so as to absorb the gap between the respective output timings of the isochronous data that are outputted from the sink device 3001. Consequently, a data delay occurs from the time when the sink device 3001 receives plural video data as isochronous data to the time when the video data are synchronized in a frame unit and are output from the video data buffer 3030.

Hereinafter, problems due to the data delay are described in more detail by taking, as an example, a motor vehicle in which plural cameras for assisting the sense of sight as substitutes for back mirrors and the data transmission system 3000 are mounted, and video data from the plural cameras, as the substitutes for the back mirrors, are transmitted by the system so as to display composed images of these data on a vehicle-mounted monitor.

In this case, video images of backward views of the motor vehicle are displayed on the vehicle-mounted monitor and are past (delayed) images which have been delayed by a timing corresponding to the data delay in the sink device 3001, as compared to real time images that are taken by the camera. In the case of motor vehicles, it is not permissible to display the past images which have been delayed even a little from the real time on the monitor as the substitutes for the back mirrors. Therefore, the prior art data transmission system 3000 has a poor practicality as the data transmission system which is to be utilized in a system in which data delay is not permissible, such as the above-mentioned vehicle-mounted rear looking system.

Further, in the prior art data transmission system 3000, the video data buffer 3030 is required to synchronize the video data that is output from the sink device 3001, corresponding to the respective data output units, in frame units.

SUMMARY OF THE INVENTION

It is an object of the present invention to provide a system, method and apparatus for data transmission which can synchronize individual isochronous data that are supplied from plural independent information sources to a transmission terminal in frame units so as to transmit the data to a receiving terminal and thereby synchronize the isochronous data in frame units without using a data buffer, and to output the data from the receiving terminal to a required processing device.

Other objects and advantages of the present invention will become more apparent from the following detailed description. The specific embodiments described herein are provided only for illustration since various additions and modifications within the spirit and scope of the present invention will be apparent to those of skill in the art from the detailed description.

According to a first aspect of the present invention, there is provided a data transmission system comprising: a transmission line for transmitting isochronous data to be processed at a timing in synchronization with a reference signal having a fixed cycle, and asynchronous data to be processed at an arbitrary timing; plural source devices for transmitting the isochronous data to the transmission line; and at least one sink device for receiving plural pieces of the isochronous data which have been transmitted to the transmission line. In the data transmission system, a specific device which is one of the sink device and the plural source devices transmits reference signal information for reproducing a predetermined reference signal as a reference for a processing timing of the isochronous data to the transmission line. Further, according to the first aspect, the plural source devices other than the specific device receive the reference signal information which has been transmitted to the transmission line, obtain the predetermined reference signal, and output the isochronous data which are synchronized with the reference signal. Therefore, plural pieces of isochronous data between which data synchronization is established are obtained on the side of the sink device for receiving the plural pieces of isochronous data. Accordingly, the buffer for absorbing the phase difference between the isochronous data which are supplied from the plural source devices can be dispensed with.

According to a second aspect of the present invention, in accordance with the data transmission system of the first aspect, the data transmission on the transmission line is repeatedly performed for each transmission frame as a unit of transmission data, the transmission frame has a frame header which contains information indicating the head of each transmission frame and an isochronous data slot which contains the isochronous data, and the specific device transmits the reference signal information by including the reference signal information in the frame header. Therefore, in the existing data transmission method which uses the transmission frame having the frame header and the isochronous data slot, the reference signal information from the specific device can be transmitted without changing the structure of the data in the transmission frame.

According to a third aspect of the present invention, in accordance with the data transmission system of the second aspect, the specific device periodically transmits the special frame header which includes the reference signal information. Therefore, the source devices other than the specific device can obtain the reference signal information in a fixed cycle. Accordingly, the isochronous data which are always synchronized with the correct reference signal can be generated.

According to a fourth aspect of the present invention, in accordance with the data transmission system of the first aspect, the data transmission on the transmission line is performed for each transmission frame as a unit of transmission data, and the transmission frame has a frame header which contains information indicating the head of each transmission frame, an isochronous data slot which contains the isochronous data and an asynchronous data slot which contains the asynchronous data. Further, according to the fourth aspect, the sink device performs a processing of transmitting/receiving the asynchronous data in addition to the processing of receiving the isochronous data, the source device performs a processing of transmitting/receiving the asynchronous data in addition to the processing of transmitting the isochronous data, and the specific device stores the reference signal information in the isochronous data slot or asynchronous data slot and transmits the isochronous data slot or asynchronous data slot. Therefore, the reference signal information can be multiplexed to the isochronous data or asynchronous data that is to be transmitted.

According to a fifth aspect of the present invention, in accordance with the data transmission system of the first aspect, the specific device transmits, to the transmission line, a transmission/receipt designation packet which contains information designating a source device as a transmission source of the isochronous data and a sink device as a transmission destination of the isochronous data, and a specific transmission/receipt designation packet which is transmitted from the specific device includes the reference signal information. Therefore, in the existing packet transmission method which uses the transmission/receipt designation packet, the reference signal information from the specific device can be transmitted without changing the structure of the data to be transmitted in packets.

According to a sixth aspect of the present invention, in accordance with the data transmission system of the fifth aspect, the specific device periodically transmits the specific transmission/receipt designation packet including the reference signal information. Therefore, the source devices other than the specific device can obtain the reference signal information in the fixed cycle and generate the isochronous data which are always synchronized with the correct reference signal.

According to a seventh aspect of the present invention, in accordance with the data transmission system of the first aspect, the sink device and the source device perform a processing of transmitting/receiving a data packet which contains the isochronous data or asynchronous data. Further, the specific device transmits, to the transmission line, the transmission/receipt designation packet which contains information designating the sink device as a transmission source of the isochronous data, the sink device as a transmission destination of the isochronous data, and the sink device or source device as a transmission source and transmission destination of the asynchronous data, and transmits the reference signal information by including the reference signal information in the isochronous data or asynchronous data. Therefore, the reference signal information can be multiplexed to the isochronous data or asynchronous data so as to be transmitted.

According to an eighth aspect of the present invention, in accordance with the data transmission system of the first aspect, the sink device and the source device perform a processing of transmitting/receiving a data packet which contains the isochronous data or asynchronous data, the data transmission on the transmission line repeatedly performs a unit transmission processing for transmitting data in a fixed time period. In addition, the source and sink devices for transmitting the data packet in each transmission cycle, as the period of the unit transmission processing, perform arbitration for obtaining a transmission right to transmit the data packet, and transmit the data packet between a transmission source device which obtains the transmission right of the data packet by the arbitration and a transmission destination device corresponding to the transmission source device. Further, the specific device transmits a cycle start packet which indicates a start timing of the transmission cycle as the period of the unit transmission processing every fixed time period, and transmits the reference signal information to the transmission line by including the reference signal information in the isochronous data or asynchronous data. Therefore, in the existing packet transmission method in which arbitration is performed to obtain the transmission right to transmit data packets, the reference signal information can be transmitted from the special device without changing the structure of the data to be transmitted in packets.

According to a ninth aspect of the present invention, in accordance with the data transmission system of the first aspect, plural individual transmission systems are formed, each including at least one of the source devices and at least one sink devices. Ones specific device from among the plural devices constituting each of the individual transmission systems transmits the reference signal information to another device in the individual transmission system including the specific device. The device other than the specific device in each of the individual transmission systems receives the reference signal information that is transmitted from the specific device, and reproduces a reference signal which is inherent to each of the individual transmission systems. Therefore, when the sink devices and the source devices constituting the system are divided in plural groups as individual transmission systems, the device which utilizes the isochronous data that is transmitted from the source device of the individual transmission system can obtain isochronous data, between which synchronization is established, as the plural pieces of the isochronous data.

According to a tenth aspect of the present invention, in accordance with the data transmission system of the first aspect, the sink device comprises a phase detector for detecting a phase shift amount of the received plural pieces of isochronous data, and transmits phase difference information which indicates the phase shift amount detected by the phase detector. In addition, at least one of the plural source devices modifies a timing of reproducing the reference signal that is output from the reference signal information based on the phase difference information which is transmitted from the sink device so as to reduce the phase shift amount in the sink device. Therefore, even when the phase difference between the isochronous data from two source devices occurs due to a data delay on the transmission line, the isochronous data having the synchronization established can be obtained.

According to an eleventh aspect of the present invention, there is provided a data transmission system comprising a source device for transmitting isochronous data to be processed at a timing in synchronization with a reference signal having a fixed cycle, a sink device for receiving the isochronous data which have been transmitted from the source device, and first and second transmission lines having different data transmission directions, where the transmission lines connect the source device and the sink device in a one-to-one relationship. In the data transmission system of the eleventh aspect, the sink device performs an information transmission processing of transmitting, to the source device via the first transmission line, reference signal information for reproducing a predetermined reference signal as a reference of a processing timing of the isochronous data. The source device performs a signal reproduction processing of receiving the reference signal information that is transmitted from the sink device and reproducing the predetermined reference signal from the received reference signal information, and a data transmission processing of transmitting the isochronous data to the sink device via the second transmission line in synchronization with the reproduced predetermined reference signal. Further, a transmission speed of the isochronous data on the second transmission line is higher than a transmission speed of the reference signal information on the first transmission line. Therefore, when the isochronous data are transmitted by using a plurality of the systems, the device for receiving the isochronous data can obtain isochronous data having the frame synchronization established as plural pieces of the isochronous data. Accordingly, the buffer for absorbing the phase difference between the isochronous data that are supplied from the plural source devices can be dispensed with. Further, cheaper elements can be used for the transmission lines for transmitting data from the sink device to the source device. Besides, a cheaper transmission/receiving unit for performing the data transmission from the sink device to the source device can be used. Therefore, both low-cost and efficient data transmission can he performed.

According to a twelfth aspect of the present invention, in accordance with the data transmission system of the eleventh aspect, the sink device and the source device perform a processing of transmitting/receiving asynchronous data to be processed at arbitrary timing, and the data transmission on each of the transmission lines is performed for each transmission frame as a unit of transmission data. Further, according to the twelfth aspect, data transmission from the sink device to the source device is performed in a unit of a first transmission frame which has a frame header indicating the head of each transmission frame and an asynchronous data slot containing the asynchronous data to be processed at arbitrary timing, data transmission from the source device to the sink device is performed in a unit of a second transmission frame which has the frame header, an isochronous data slot containing the isochronous data and the asynchronous data slot. In addition, the sink device transmits the reference signal information by including the reference signal information in the frame header of the first transmission frame. Therefore, in the existing data transmission method which uses a transmission frame having the flame header and the isochronous data slot, the transmission of the reference signal information can be performed without changing the structure of data in the transmission frame.

According to a thirteenth aspect of the present invention, in accordance with the data transmission system of the twelfth aspect, the sink device transmits the frame header including the processing timing information in a fixed cycle. Therefore, the source device can obtain the reference signal information in the fixed cycle and generate the isochronous data which are always synchronized with the correct reference signal.

According to a fourteenth aspect of the present invention, in accordance with the data transmission system of the eleventh aspect, the sink device and the source device perform a processing of transmitting/receiving asynchronous data to be processed at arbitrary timing, and the data transmission on each of the transmission lines is performed for each transmission frame as a unit of transmission data. Data transmission from the sink device to the source device is performed in a unit of a first transmission frame which has a frame header indicating the head of each transmission frame and an asynchronous data slot containing the asynchronous data to be processed at arbitrary timing, and data transmission from the source device to the sink device is performed in a unit of a second transmission frame which has the frame header and an isochronous data slot containing the isochronous data and the asynchronous data slot. Further, the sink device transmits the reference signal information by including the reference signal information in the asynchronous data. Therefore, the reference signal information can be multiplexed to the isochronous data or asynchronous data so as to be transmitted.

According to a fifteenth aspect of the present invention, in accordance with the data transmission system of the eleventh aspect, the sink device stores information which designates a device as a transmission source of the isochronous data and a device as a transmission destination of the isochronous data, in a transmission/receipt designation packet, and transmits the transmission/receipt designation packet to the first transmission line. A specific transmission/receipt designation packet which is transmitted from the sink device includes the reference signal information. Therefore, in the existing packet transmission method which uses the transmission/receipt designation packet, the reference signal information can be transmitted from the specific device without changing the structure of the data to be transmitted in packets.

According to a sixteenth aspect of the present invention, in accordance with the data transmission system of the fifteenth aspect, the sink device periodically transmits the specific transmission/receipt designation packet including the reference signal information. Therefore, in the source device, the reference signal information can be obtained in the fixed cycle, and the isochronous data which are always synchronized with the correct reference signal can be generated.

According to a seventeenth aspect of the present invention, in accordance with the data transmission system of the eleventh aspect, the sink device performs a processing of transmitting/receiving asynchronous data to be processed at an arbitrary timing. Further, the sink device also performs a processing of storing, in a transmission/receipt designation packet to be transmitted to the first transmission line, information which designates a device as a transmission source of the isochronous data or asynchronous data and a device as a transmission destination of the isochronous data or asynchronous data and storing the reference signal information in a required asynchronous data packet among asynchronous data packets including the asynchronous data to be transmitted to the first transmission line. The source device performs a processing of transmitting/receiving the asynchronous data to be processed at an arbitrary timing, and transmits an isochronous data packet which contains the isochronous data to the second transmission line. Therefore, the reference signal information can be multiplexed to the asynchronous data to be transmitted.

According to an eighteenth aspect of the present invention, in accordance with the data transmission system of the first or eleventh aspect, the transmission line is composed of an optical fiber. Therefore, the data transmission can be performed at high speeds.

According to a nineteenth aspect of the present invention, in accordance with the data transmission system of the first aspect, the sink device and the source device transmit/receive data as an optical signal. Further, the transmission line comprises: an optical star coupler having plural input terminals and plural output terminals, where the optical star coupler outputs the optical signal which has been supplied to any one of the input terminals from all of the output terminals; output side optical fibers for connecting output terminals of the sink device and the source device and the input terminals of the optical star coupler; and input side optical fibers for connecting input terminals of the sink device and the source device and the output terminals of the optical star coupler. Therefore, even when the data communication is interrupted on one of the transmission lines, the data transmission can be performed via other transmission lines, and therefore, the reliability of the data transmission is improved.

According to a twentieth aspect of the present invention, in accordance with the data transmission system of the eleventh aspect, the sink device transmits output data as an electric signal and receives input data as an optical signal, and the source device transmits output data as an optical signal and receives input data as an electric signal. The first transmission line for transmitting data from the sink device to the source device is composed of a conductor which propagates the electric signal, and the second transmission line for transmitting data from the source device to the sink device is composed of an optical fiber which propagate the optical signal. Therefore, the transmission of data having a smaller data amount is performed by the first transmission line, and the transmission of data having a larger data amount is performed by the second transmission line. Accordingly, the data transmission system which has a good transmission efficiency and which is cheaper can be realized.

According to a twenty-first aspect of the present invention, in accordance with the data transmission system of the first or eleventh aspect, the source device is connected to a video data output unit which has an image-taking unit for performing an image-taking processing or to a video reproduction unit for performing a reproduction processing for video data, and the source device transmits the video data that is output from the video data output unit to the transmission line as isochronous data. The sink device is connected to a video processing device for composing or recording plural pieces of video data, and the sink device receives the plural pieces of video data which have been transmitted from the plural source devices as isochronous data so as to supply the data to the video processing device. Therefore, the navigation system with real images in the motor vehicle or the like, a drive recorder in the motor vehicle or the like, or a monitoring camera system can be realized.

According to a twenty-second aspect of the present invention, in accordance with the data transmission system of the twenty-first aspect, the source device comprises a video compression unit for compressing the video data which have been supplied from the video data output unit and outputting compressed video data, and transmits the compressed video data as the isochronous data. Therefore, the data amount of the isochronous data which are transmitted from the source device can be reduced.

According to a twenty-third aspect of the present invention, in accordance with the data transmission system of the first or eleventh aspect, the sink device, the source device, and the transmission line which connects these devices are mounted on a motor vehicle. The source device is connected to a motor-vehicle-mounted video data output unit having an image-taking unit for performing an image-taking processing or a video reproduction unit for performing a reproduction processing for video data, and the source device transmits the video data which have been output from the video data output unit as the isochronous data to the transmission line. The sink device is connected to a motor-vehicle-mounted video processing device for composing or recording plural pieces of video data, and the sink device receives the plural pieces of video data which have been transmitted from the plural source devices as the isochronous data so as to supply the data to the video processing device. The sink device, the source device, and the transmission line constitute a network for transmitting the video data in the motor vehicle. Therefore, the motor-vehicle-mounted navigation system with real images or the motor-vehicle-mounted drive recorder can be realized.

According to a twenty-fourth aspect of the present invention, there is provided a data transmission method for transmitting isochronous data to be processed at a timing in synchronization with a reference signal having a fixed cycle, and asynchronous data to be processed at an arbitrary timing from plural source devices as transmission sources of the isochronous data to at least one sink device as a transmission destination of the isochronous data via a transmission line. The method of the twenty-fourth aspect comprises: a data transmission step of transmitting reference signal information for reproducing a predetermined reference signal as a reference of a processing timing of the isochronous data from a specific device from among the sink device and the plural source devices to the transmission line; and a signal reproduction step of receiving the reference signal information which has been transmitted to the transmission line and reproducing the reference signal in the plural source devices. Therefore, plural pieces of isochronous data between which data synchronization is established can be obtained on the side of the sink device for receiving the plural pieces of isochronous data, and the buffer for absorbing the phase difference between the isochronous data that is supplied from the plural source devices can be dispensed with.

According to a data transmission method of a twenty-fifth aspect of the present invention, there is provided a data transmission system for transmitting isochronous data to be processed at a timing in synchronization with a reference signal having a fixed cycle from a source device, as a transmission source of the isochronous data, to a sink device as a transmission destination of the isochronous data which is connected to the source device in a one-to-one relationship. The system of the twenty-fifth aspect comprises: an information transmission step of transmitting reference signal information for reproducing a predetermined reference signal as a reference of a processing timing of the isochronous data from the sink device to the source device via a first transmission line; a signal reproduction step of receiving the reference signal information from the sink device and reproducing the predetermined reference signal in the source device; and a data transmission step of transmitting the isochronous data to the sink device via a second transmission line in synchronization with the reproduced predetermined reference signal. In the data transmission system, a transmission speed of the isochronous data on the second transmission line is higher than a transmission speed of the reference signal information on the first transmission line. Therefore, when the transmission of the isochronous data is performed by using the isochronous data and a plurality of the systems having the source device, the device for receiving the isochronous data can obtain the isochronous data between which the frame synchronization is established as the plural pieces of isochronous data. Accordingly, the buffer for absorbing the phase difference between the isochronous data which are supplied from the plural source devices can be dispensed with. Further, the transmission speed of the isochronous data on the second transmission line is higher than the transmission speed of the reference signal information on the first transmission line. Therefore, cheaper elements can be used for the transmission line for transmitting data from the sink device to the source device, and a cheaper transmission/receiving unit for performing data transmission from the sink device to the source device can be used. Accordingly, both a low-cost and efficient data transmission can be performed.

According to a twenty-sixth aspect of the present invention, there is provided a data transmission apparatus which is connected to a transmission line. The data transmission apparatus of the twenty-sixth aspect transmits or receives isochronous data to be processed at a timing in synchronization with a reference signal having a fixed cycle, and asynchronous data to be processed at an arbitrary timing via the transmission line. The data transmission apparatus comprises: a controller for controlling the transmission or reception of the isochronous data and the asynchronous data; and a reference signal generator for reproducing the reference signal based on reference signal information for reproducing a predetermined reference signal as a reference of a processing timing of the isochronous data, which have been received as the asynchronous data. Therefore, in the device for receiving the plural pieces of isochronous data, the plural pieces of the isochronous data between which the synchronization is established can be obtained. Accordingly, the buffer for absorbing the phase difference between the isochronous data which are supplied from the plural data transmission sources can be dispensed with.

According to a twenty-seventh aspect of the present invention, the data transmission apparatus of the twenty-sixth aspect further comprises an image-taking unit for performing an image-taking processing and outputting video data. In the data transmission apparatus, the image-taking unit outputs the video data in synchronization with the reference signal which has been reproduced by the reference signal generator, and the controller transmits the video data which have been output from the image-taking unit as the isochronous data to the transmission line. In the device for receiving the plural pieces of video data, the plural pieces of video data between which the synchronization is established can be obtained.

According to a twenty-eighth-aspect of the present invention, the data transmission apparatus of the twenty-seventh aspect comprises: a video compression unit for compressing the video data which have been output from the image-taking unit and outputting compressed video data. Further, in the data transmission apparatus, the controller transmits the compressed video data as the isochronous data. Therefore, the data amount of the isochronous data which are transmitted from the transmission source of the video data can be reduced.

BRIEF DESCRIPTION OF THE DRAWINGS

FIG. 4(a) is a diagram illustrating a data structure of a transmission data which propagates on the transmission line of the data transmission system according to the first embodiment, and FIGS. 4(b) and 4(c) are diagrams illustrating timing reference signals which are reproduced by the first and second source devices in the data transmission system.

FIG. 5(a) to 5(f) are diagrams for explaining a processing for transmitting data in the data transmission system of the first embodiment. FIGS. 5(a) and 5(c) show the timing reference signals outputted from the first and second source devices. FIGS. 5(b) and 5(d) show video data inputted to the first and second source devices. FIG. 5(e) shows a transmission data Td on a transmission line. FIGS. 5(f) and 5(g) show a video data outputted from the sink device.

FIGS. 11(a) to 11(f) are diagram for explaining a processing for transmitting data in the data transmission system of the second embodiment. FIGS. 11(a) and 11(c) show timing reference signals outputted from the first and second source devices. FIGS. 11(b) and 11(d) are video data inputted to the first and second source devices. FIG. 11(e) shows a transmission data Td on a transmission line. FIGS. 11(f) and 11(g) show a video data outputted from the sink device.

FIG. 18(a) is a diagram illustrating a data structure of transmission data which propagate on a transmission line of the data transmission system of the third embodiment, and FIGS. 18(b) and 18(c) are diagrams illustrating timing reference signals which are reproduced by the first and second source devices of the data transmission system.

FIGS. 19(a) to 19(f) are diagrams for explaining a processing for transmitting data in the data transmission system of the third embodiment. FIGS. 19(a) and 19(c) show timing reference signals outputted from the first and second source devices. FIGS. 19(b) and 19(d) show video data inputted to the first and second source devices. FIG. 19(e) shows a transmission data Td on a transmission line. FIGS. 19(f) and 19(g) show a video data outputted from the sink device.

FIGS. 21(a) and 21(b) show video data outputted from the sink devices. FIGS. 21(d) and 21(f) show video data inputted to the second source device. FIGS. 21(c) and 21(e) show frame synchronous signals corresponding to the video data.

FIGS. 28(a) and 28(d) show timing reference signals, FIGS. 28(b) and 28(e) show video data, and FIG. 28(c) shows a multiplexed signal.

FIG. 29(a) shows a data transmission apparatus as a sink device or source device. FIG. 29(b) shows a camera device as a source device. FIG. 29(c) shows a camera device having a compression unit.

DETAILED DESCRIPTION OF THE INVENTION

Hereinafter, embodiments to the present invention will be described with reference to the drawings.

First Embodiment

Figure 1:
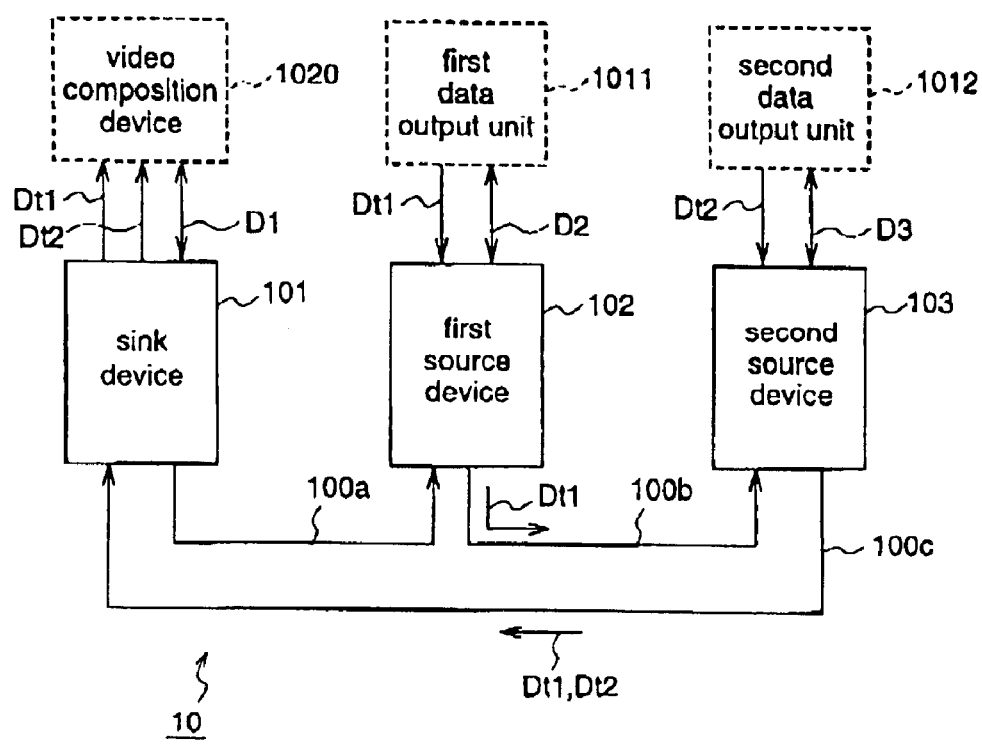
FIG. 1 is a diagram illustrating a data transmission system according to a first embodiment of the present invention.

FIG. 1 is diagram illustrating a data transmission system according to the first embodiment of the present invention.

The data transmission system 10 of the first embodiment comprises a first source device 102 for receiving a data having high real-time characteristics like audio or video data from a first data output unit 1011 such as a camera which is external to the system, and transmitting the data as an isochronous data Dt1. The data transmission system 10 also comprises a second source device 103 for receiving a data having high real-time characteristics like audio or video data from a second data output unit 1012 such as a camera which is external to the system, and transmitting the data as an isochronous data Dt2.

The data transmission system 10 further comprises a sink device 101 for receiving the isochronous data Dt1 and Dt2 which are transmitted from the first and second source devices 102 and 103 and outputting the isochronous data Dt1 and Dt2 to a video composition device 1020 which is external to the system. Further, the data transmission system 10 comprises a first transmission line 100a for transmitting data between the sink device 101 and the first source device 102, a second transmission line 100b for transmitting data between the first and second source devices 102 and 103, and a third transmission line 100c for transmitting data between the second source device 103 and the sink device 101.

In this data transmission system 10, the sink device 101, the first and second source devices 102 and 103, and the first to third transmission lines 100a to 100c constitute one data transmission path in a form of ring. In addition, in this data transmission system 10, the respective devices 101 to 103 operate with the same system clock, to be specific, with an operational clock of one device of these devices 101 to 103 (for example, the sink device 101), and operational clocks of other devices (the source devices 102 and 103) are synchronized.

FIG. 2(a) is a diagram illustrating a detailed structure of the sink device 101.

This sink device 101 comprises a controller 201a for performing a processing of receiving a transmission data Td from the transmission line 100c, a processing of transmitting the transmission data Td to the transmission line 100a, and a processing of controlling the video composition device 1020 which is external to the system. The sink device 101 also comprises a reference signal generator 202a for generating a reference signal 208a based on reference signal information Is which is included in the received transmission data Td.

The reference signal is a signal having a fixed cycle as a reference of processing the timing of isochronous data (hereinafter, referred to also as a timing reference signal). The reference signal information is information for reproducing the reference signal, which information relates to the frequency or phase of the reference signal (hereinafter, referred to as synchronous information). In addition, the isochronous data are not limited to video data or audio data, and can be any type of data as long as the data are processed at a timing in synchronization with the reference signal having a fixed cycle. Further, the asynchronous data are not limited to the control commands, and can be any type of data as long as the data are processed at arbitrary timings.

Here, the reference signal 208a is a frame synchronous signal for determining a timing of the composition of the isochronous data for each frame by the video composition device 1020. The receiving processing of the controller 201*a* is a processing of receiving the transmission data Td from the transmission line 100*c* and outputting an isochronous data 204*a*1 and 204*a*2 that are included in the received transmission data Td to the video composition device 1020 which is external to the system. In addition, the transmission processing of the controller 201*a* is a processing of transmitting synchronous information (reference signal information) 207*a* from the video composition device 1020 to the transmission line 100*a* as a part of the transmission data Td. This synchronous information 207*a* is a synchronous signal indicating a timing of the composition of plural isochronous data for each frame by the video composition device 1020. Further, the control processing of the controller 201*a* is a processing of transmitting/receiving an asynchronous data 203*a* such as a command for controlling the video composition device 1020 to/from the video composition device 1020.

In this data transmission system 10 of the first embodiment, the sink device 101 outputs the synchronous information of the data transmission system 10. Therefore, a synchronous information output processing in the controller 201*a* of outputting the synchronous information Is that is included in the received transmission data Td to the reference signal generator 202*a*, and an operation in the reference signal generator 202*a* of generating the reference signal 208*a* based on the synchronous information Is are not required. However, when the source device (e.g., the first or second source device 102 and 103) other than the sink device 101 of the data transmission system 10 generates the synchronous information of the data transmission system 10, the synchronous information output processing in the controller 201*a* and the operation in the reference signal generator 202*a* of generating the reference signal 208*a* are performed.

Figure 2:
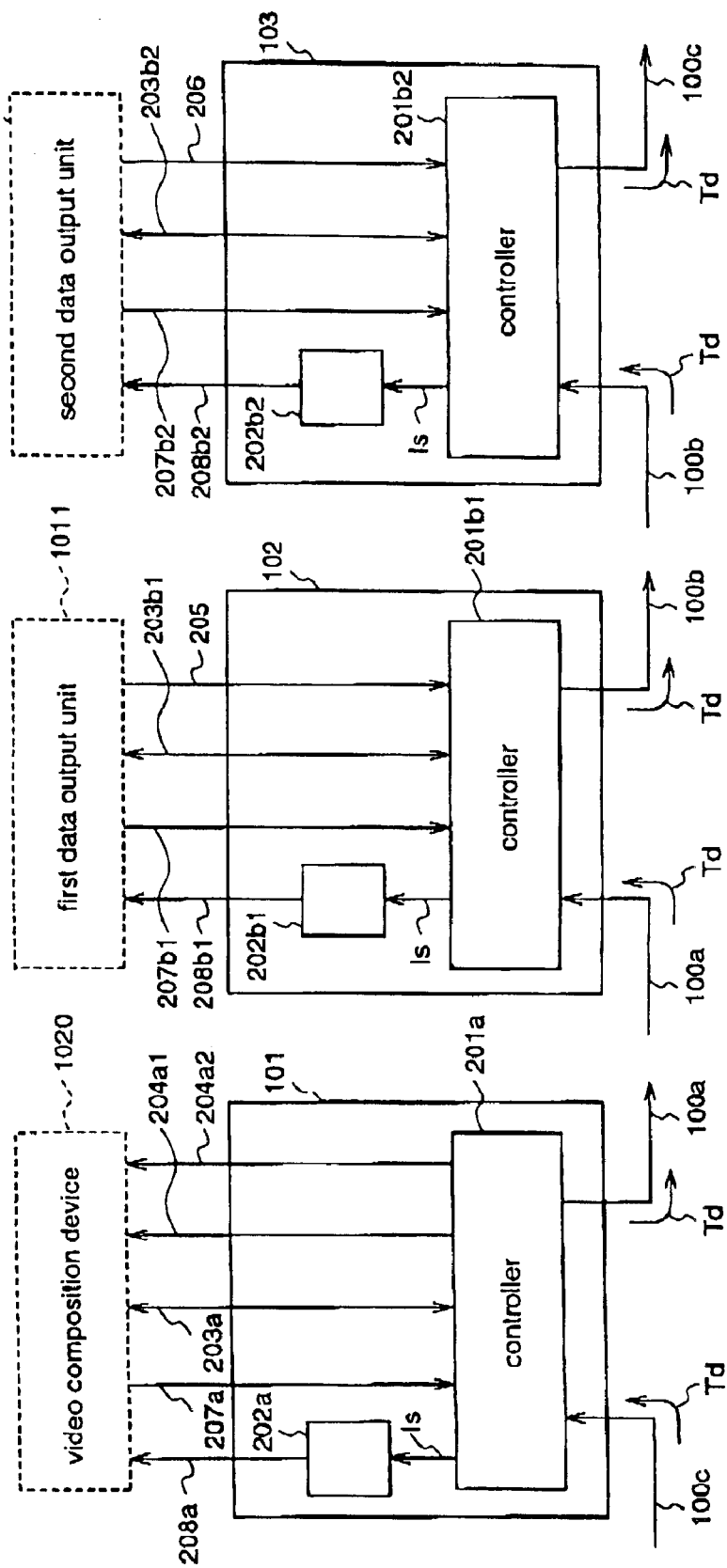
FIG. 2(a) is a diagram illustrating a structure of a sink device in the data transmission system of the first embodiment.
FIG. 2(b) is a diagram illustrating a structure of a first source device.
FIG. 2(c) is a diagram illustrating a structure of a second source device.

FIG. 2(*b*) is a diagram illustrating a detailed structure of the first source device 102.

The first source device 102 comprises a controller 201*b*1 for performing a processing of receiving the transmission data Td from the transmission line 100*a*, a processing of transmitting the transmission data Td to the transmission line 100*b*, and a processing of controlling the first data output unit (camera) 1011 which is external to the system. The first source device 102 also comprises a reference signal generator 202*b*1 for generating a reference signal 208*b*1 based on the synchronous information is that is included in the received transmission data Td.

Here, the reference signal 208*b*1 is a synchronous signal for determining a timing of outputting video data of each frame by the first data output unit 1011. The receiving processing of the controller 201*b*1 is a processing of receiving the transmission data Td from the transmission line 100*a* and outputting the synchronous information Is that is included in the transmission data Td to the reference signal generator 202*b*1. In addition, the transmission processing of the controller 201*b* 1 is a transmission processing of transmitting a video data 205 from the first data output unit 1011 to the transmission line 100*b* as a part of the transmission data Td (isochronous data). The control processing of the controller 201*b*1 is a processing of transmitting/receiving an asynchronous data 203*b*1 such as a command for controlling the first data output unit 1011 to/from the data output unit 1011.

In the data transmission system 10 of the first embodiment, the sink device 101 generates the synchronous information of the data transmission system 10. However, when the source device 102 outputs the synchronous information of the data transmission system 10, a transmission processing of transmitting a synchronous information 207*b*1 from the first data output unit 1011, where the synchrous information 207*b*1 indicates the operational timing as a part of the transmission data Td to the transmission line 10*b*, is also performed in the controller 201*b*1 in addition to the processing of transmitting the isochronous data. To be specific, the synchronous information 207*b*1 indicating the operational timing is a frame synchronous signal which indicates a timing of outputting the video data of each frame by the first data output unit 1011 to the source device 102.

FIG. 2(*c*) is a diagram illustrating a detailed structure of the second source device 103.

The second source device 103 comprises a controller 201*b*2 for performing a processing of receiving the transmission data Td from the transmission line 100*b*, a processing of transmitting the transmission data Td to the transmission line 100*c*, and a processing of controlling the second data output unit (camera) 1012 which is external to the system. The second source device 103 also comprises a reference signal generator 202*b*2 for generating a reference signal 208*b*2 based on the synchronous information Is that is included in the received transmission data Td.

Here, the reference signal 208*b*2 is a synchronous signal for determining a timing of outputting video data of each frame by the second data output unit 1012. The receiving processing of the controller 201 b2 is a processing of receiving the transmission data Td from the transmission line 100*b* and outputting the synchronous information Is that is included in the transmission data Td to the reference signal generator 202*b*2. In addition, the transmission processing of the controller 201*b*2 is a transmission processing of transmitting a video data 206 from the second data output unit 1012 to the transmission line 100*c* as a part of the transmission data Td (isochronous data). The control processing of the controller 201*b*2 is a processing of transmitting/receiving an asynchronous data 203*b*2 such as a command for controlling the second data output unit 1012 to/from the data output unit 1012.

As described above, in the data transmission system 10 of the first embodiment, the sink device 101 generates the synchronous information of the data transmission system 10. However, when the second source device 103 outputs the synchronous information of the data transmission system 10, a transmission processing of transmitting a synchronous information 207*b*2 which indicates the operational timing in the second data output unit 1012 as a part of the transmission data Td to the transmission line 100*c* is also performed in the controller 201*b*2 in addition to the processing of transmitting the isochronous data. To be specific, the synchronous information 207*b*2 indicating the operational timing is a frame synchronous signal which indicates a timing of outputting the video data of each frame by the second data output unit 1012 to the source device 103.

Figure 3:
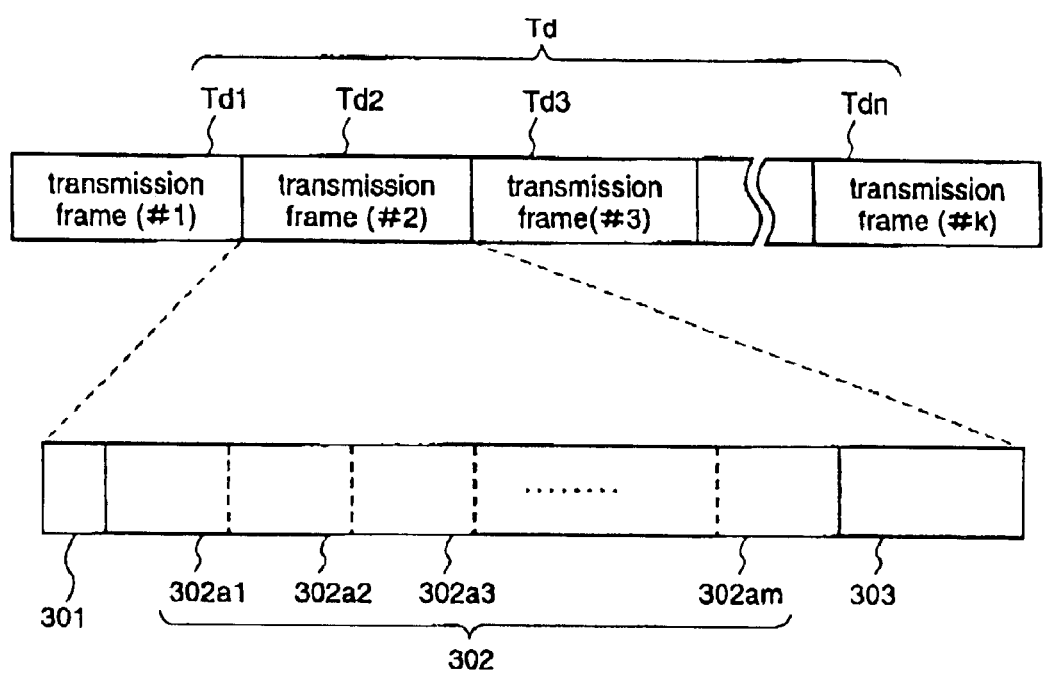
FIG. 3 is a diagram illustrating a data structure of transmission data which propagate on a transmission line of the data transmission system (transmission frame format) according to the first embodiment.

FIG. 3 is a diagram illustrating a data structure (transmission frame format) of the transmission data Td to be transmitted on the transmission lines 100*a* to 100*c*.

The transmission data Td is composed of plural data blocks which are transmitted in a prescribed cycle, i.e., transmission frames (#1) Td1, (#2) Td2, (#3) Td3, . . . (#k) Tdk.

For example, the transmission frame (#2) Td2 is composed of a frame header 301 indicating the head of the transmission frame (#2) Td2, an isochronous data slot 302 for the transmission of isochronous data by the respective source devices, and an asynchronous data slot 303 for transmitting asynchronous data such as control data or status data.

Here, the isochronous data slot 302 is divided into a first individual data slot 302a1, a second individual data slot 302a2, a third individual data slot 302a3, ..., a m-th individual data slot 302am. The individual data slots 302a1 to 302am are previously allocated to the isochronous data which are transmitted from the source devices, respectively. For example, in this first embodiment, the first individual data slot 302a1 is allocated to the isochronous data to be transmitted from the first source device 102 to the sink device 101, and the second individual data slot 302a2 is allocated to the isochronous data to be transmitted from the second source device 103 to the sink device 101.

In this first embodiment, the asynchronous data slot 303 is not divided into individual data slots like the isochronous data slots 302. However, it is also possible for the asynchronous data slot 303 to be divided into individual data slots like the isochronous data slots 302, and then the respective individual data slots of the asynchronous data slot 303 are allocated to data which are outputted from the sink device 101 and the source devices 102 and 103, respectively. Further, the sink and source devices 101 to 103 also can use the asynchronous data slot 303 for data transmission as needed.

FIG. 4(a) shows the transmission data Td which propagates on the transmission line in the data transmission system 10 of the first embodiment. FIGS. 4(b) and 4(c) show reference signals which are reproduced by the first and second source devices 102 and 103, respectively.

In the n-th transmission frame (#n) and the (n+1)-th transmission frame (#n+1) of the transmission data Td, frame headers 401 and 402 indicating the head of each of the frames are located. Following these frame headers, the isochronous data slots 302 and the asynchronous data slots 303 are located. Here, the frame header 401 in the n-th transmission frame (#n) is a special frame header which includes synchronous information that is inherent to the isochronous data corresponding to this frame. The frame header 402 in the (n+1)-th transmission frame (#n+1) is a normal frame header which does not include the synchronous information. The normal frame header 402 or the special frame header 401 is always located at the head of each transmission frame.

The synchronous information that is inherent to the isochronous data which are included in the special frame header is reproduced by the reference signal generator 202b1 of the first source device 102 as the reference signal 208b1 (FIG. 4(b)). The synchronous information is reproduced by the reference signal generator 202b2 of the second source device 103 as the reference signal 208b2 (FIG. 4(c)).

The operation of the data transmission system 10 of the first embodiment will now be described.

Figure 5:
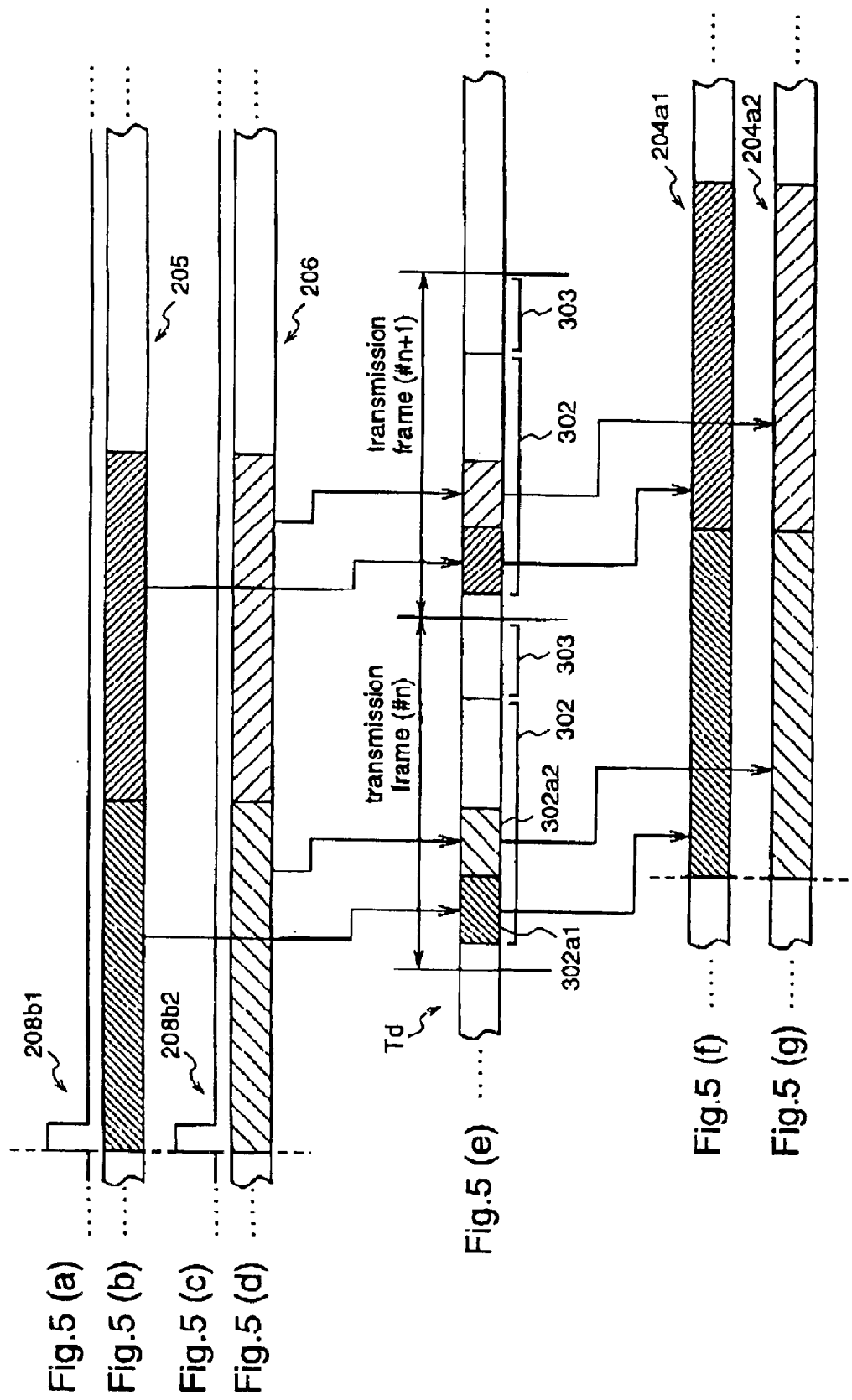

FIGS. 5(a)–5(f) are diagrams for explaining the operation of the data transmission system 10. FIG. 5(a) shows the reference signal 208b1 which is output from the reference signal generator 202b of the first source device 102. FIG. 5(b) shows the video data 205 which is input from the first data output unit 1011 to the controller 201b1 of the first source device 102. FIG. 5(c) shows the reference signal 208b2 which is output from the reference signal generator 202b2 of the second source device 103. FIG. 5(d) shows the video data 206 which is input from the second data output unit 1012 to the controller 201b2 of the second source device 103. FIG. 5(e) shows the transmission data Td on the transmission line 100. FIGS. 5(f) and 5(g) show the video data 204a1 and 204a2 which are output from the controller 201a of the sink device 101 to the video composition device 1020 (i.e., video data 205 and 206 which are output from the first and second data output units). Here, synchronous signals as shown in FIGS. 5(a) and 5(c) are the same as those shown in FIGS. 4(b) and 4(c), respectively.

Initially, the synchronous information 207a is input to the sink device 101 from the video composition device 1020 which is external to the system. This synchronous information represents a timing signal as the reference of a processing of composing two kinds of video data, i.e., the video data from the first and second data output units 1011 and 1012, in the video composition device 1020. For example, as the synchronous information, a frame synchronous signal which indicates the head of the video frame is employed.

Here, the synchronous information (reference signal information) is not limited to the frame synchronous signal but can be information which can be used to reproduce the frame synchronous signal. For example, the synchronous information can include frequency information indicating the frequency of the frame synchronous signal and phase information indicating the phase of the frame synchronous signal. Here, the frequency information is information which indicates that the frame synchronous-signal is obtained by X-dividing (where x is a positive integer) an operational clock of the system or information which indicates the cycle of the reference signal or the like. The phase information is information which indicates the timing of a rising edge or a falling edge of the frame synchronous signal or time information which indicates the phase with respect to the rising edge or falling edge or the like. Further, as the operational clock of the system, an operational clock of one of the sink device 101 and the source devices 102 and 103 in the data transmission system 10, and the video composition device 1020 and the first and second data output units (cameras) which are external to the system is employed.

When the synchronous information 207a that is outputted from the video composition device 1020 which is external to the system is input to the sink device 101, the controller 201a performs the transmission processing of multiplexing the synchronous information and the special frame header 401 of a predetermined transmission frame and transmits the multiplexed information to the transmission line 100a. The simplest method of multiplexing the synchronous information and the special frame header 401 is a method of generating the special frame header 401 in synchronization with the frame synchronous signal. To be more specific, the special frame header 401 is generated for each predetermined number of transmission frames at the rising or falling timing of the frame synchronous signal. Therefore, the timing of receiving the special frame header of the transmission frame on the receiving end of the transmission data is the timing of starting processing of the frame. In this case, discrimination between the special frame header 401 and the normal frame header 402 should be made by each of the devices. The special frame header 401 includes an identification bit for distinguishing the special frame header from the normal frame header 402. When the transmission frame and the special frame header 401 are multiplexed as described above, it is not required that the special frame header 401 includes specially the frequency information or phase information for reproducing the frame synchronous signal.

In the first source device 102, when the transmission data Td which is transmitted from the sink device 101 is received via the transmission line 100a, the processing of outputting the synchronous information that is included in the special frame header 401 in the received predetermined transmission frame to the reference signal generator 202b1 is performed in the controller 201b1. Then, in the reference signal generator 202b1, the frame synchronous signal, as the reference signal 208b1 (FIG. 4(b)) for processing the video data, is reproduced based on the synchronous information Is that is outputted from the controller 20b1.

In a case where the timing of outputting the special frame header 401 is the rising or falling timing of the frame synchronous signal itself, and when the source device receives the special frame header 401 from the sink device 101 at least once, the source device can judge the phase of the frame synchronous signal with respect to the head of the transmission frame based on the timing of receiving the head of the transmission frame and the timing of receiving the special frame header 401. Therefore, as for the transmission frames which are subsequent to the transmission frame including the special frame header 401, the frame synchronous signal can be generated based on the timing of receiving the head of each transmission frame.

Then, the timing reference signal 208b1 (FIG. 5(a)) that is generated by the reference signal generator 202b1 of the first source device 102 is output to the first data output unit 1011 which is external to the system. Then, in the first data output unit (camera) 1011, the image-taking processing is performed in synchronization with the timing reference signal 208b1 that is output from the source device 102, and then, the video data 205 which is obtained by the image-taking processing is output to the first source device 102.

Then, the video data 205 (FIG. 5(b)) that is output from the first data output unit 1011 is retained by the controller 201b1 of the first source device 102. Thereafter, in the controller 201b1, the transmission processing of inserting the video data 205 into the isochronous data slot 302a1 of the received transmission frame as isochronous data, as shown in FIG. 5(e), and transmitting the transmission frame to the transmission line 100b is performed.

When the transmission frame which is transferred from the first source device 102 is received by the second source device 103 via the transmission line 10b, the controller 201 b2 of the second source device 103 performs the processing of outputting the synchronous information that is included in the special frame header 401 of the received predetermined transmission frame to the reference signal generator 202b2. Then, in the reference signal generator 202b2, the frame synchronous signal, as the timing reference signal 208b2 (FIG. 4(c)) for processing the video data, is reproduced based on the synchronous information that is output from the controller 201 b2.

Then, the timing reference signal 208b2 (FIG. 5(c)) that is generated by the reference signal generator 202b2 of the second source device 103 is output to the second data output unit 1012 which is external to the system. Then, in the second data output unit (camera) 1012, the image-taking processing is performed in synchronization with the timing reference signal 208b2 that is output from the second source device 103, and the video data 206 which is obtained by the image-taking processing is output to the second source device 103.

Then, in the controller 201b2 of the second source device 103, the video data 206 (FIG. 5(d)) that is output from the second data output unit 1012 is retained. Thereafter, in the controller 201b2, the transmission processing of inserting the video data 206 into the isochronous data slot 302a2 of the received transmission frame as isochronous data, as shown in FIG. 5(e), and transmitting the transmission frame to the transmission line 100c is performed.

When the transmission data (FIG. 5(e)) which has been transferred by the second source device 103 is received by the sink device 101 via the transmission line 100c, the controller 201a of the sink device 101 performs a processing of copying the isochronous data which has been stored in the isochronous data slots 302a1 and 302a2 of the received predetermined transmission frame, and outputting the copied isochronous data to the video composition device 1020 as the video data 204a1 and 204a2 (FIGS. 5(f) and 5(g)) that are output from the first and second source devices 102 and 103. These two kinds of video data 204a1 and 204a2 are video data 205 and 206 which have been input from the first and second data output units 1011 and 1012 to the first and second source devices 102 and 103, respectively, in a status where their frame synchronization is established. Therefore, the frame synchronization of the two kinds of video data remains established also when the video data are output from the sink device 101 to the video composition device 1020.

Thereafter, in the controller 201a of the sink device 101, the processing of transferring the transmission frame (#n+1) including the normal frame header 402, the isochronous data slot 302 and the asynchronous data slot 303 to the first source device 102 is performed.

As described above, in the data transmission system 10 of the first embodiment, the sink device 101 performs the transmission processing of multiplexing the synchronous information which is supplied from the video composition device 1020 as the special frame header of the transmission frame and the transmission data, and transmitting the multiplexed data to the source devices. The source devices 102 and 103 receive the same special frame header 401 which are output by the sink device 101, and reproduce the timing reference signal that is output from the same synchronous information which is included in the received special frame header 401. Therefore, as shown in FIGS. 5(a) and 5(c), the timing reference signals 205 and 206 whose frequency and phase coincide with each other are output from the reference signal generators 202b1 and 202b2 of the source devices 102 and 103 to the first and second data output units 1011 and 1012, respectively. However, a data delay resulting from the receipt or transfer in the respective devices, or a data delay on the transmission lines is ignored.

Further, in the data transmission system 10 of the first embodiment, the frame synchronous signal is output as the timing reference signal from the first and second source devices 102 and 103 to the first and second data output units 1011 and 1012 which are external to the system, respectively. Therefore, two kinds of video data which are input from the first and second data output units 1011 and 1012 to the first and second source devices 102 and 103, respectively, are in the status where their frame synchronization is established. In other words, the two kinds of video data are input to the respective controllers 201b1 and 201b2 of the first and second source devices 102 and 103 in the status where the frame synchronization is established, and are output from the first and second source devices 102 and 103 to the sink device 101 in the status where the frame synchronization is established.

Consequently, the sink device 101 for receiving plural pieces of isochronous data can receive plural pieces of isochronous data in which the frame synchronization is established as the video data that is output from the first and second data output units 1011 and 1012. Thereby, the video data buffer for absorbing the gap in processing timings for corresponding frames of the two kinds of video data between the sink device 101 and the video composition device can be dispensed with. Further, the data delay from a time when the sink device 101 receives the plural pieces of video data as the isochronous data to a time when the video data are output to the video composition device can be avoided.

In this first embodiment, a description was given of a case where the synchronous information for reproducing the timing reference signal is transmitted by using the special frame header 401 of the transmission frame. However, the synchronous information can be transmitted by using the asynchronous data slot 303 or the isochronous data slot 302 of the transmission frame.

Hereinafter, a detailed description is given of the case where the synchronous information is transmitted by using the isochronous data slot 302.

Figure 6:
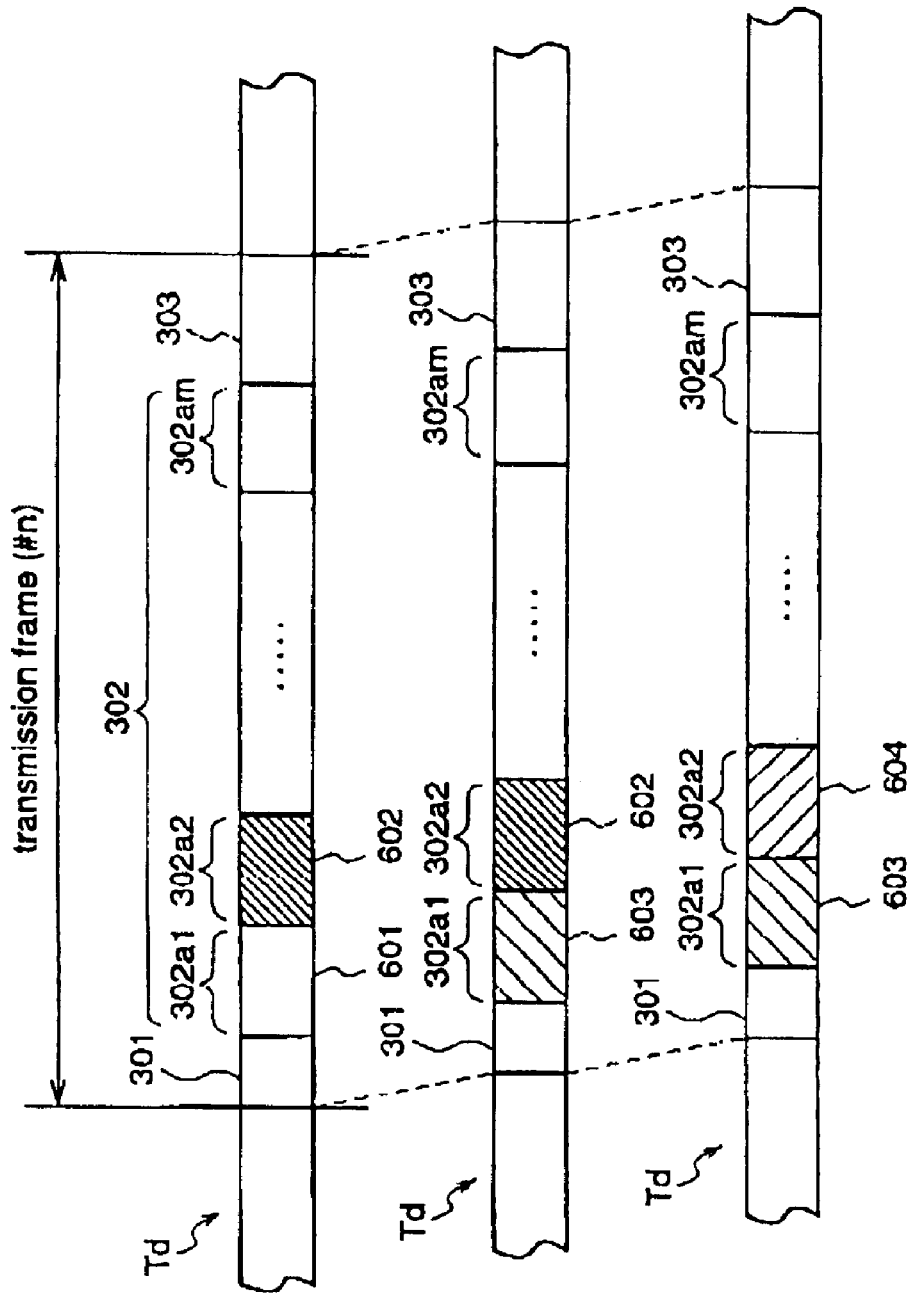
FIGS. 6(a) to 6(c) are diagrams for explaining a case where synchronous information is transmitted by using an isochronous data slot in the data transmission system of the first embodiment, and for illustrating a data arrangement in a transmission frame of data which propagate on transmission lines 100a, 100b and 100c.

FIGS. 6(*a*)–6(*c*) are diagrams for explaining the status of using the isochronous data slot 302 in a predetermined transmission frame (#n). FIG. 6(*a*) shows a transmission frame which propagates on the transmission line 100*a* from the sink device 101 to the source device 102. FIG. 6(*b*) shows a transmission frame which propagates on the transmission line 100*b* from the source device 102 to the source device 103. FIG. 106(*c*) shows a transmission frame which propagates on the transmission line 100*c* from the source device 103 to the sink device 101.

The predetermined transmission frame (#n) is composed of the frame header 301 which indicates the head of the transmission frame, an isochronous data slot 302 for transmitting isochronous data, and an asynchronous data slot 303 for the transmission of asynchronous data such as control data or status data.

As shown in FIG. 3, the isochronous data slot 302 of the predetermined transmission frame (#n) is divided into the first individual data slot 302*a*1, the second individual data slot 302*a*2, . . . , and the m-th individual data slot 302 am. In this case, the first individual data slot 302*a*1 is allocated to the isochronous data which is transmitted from the first source device 102 to the sink device 101, and the second individual data slot 302*a*2 is allocated to the isochronous data which is transmitted from the second source device 103 to the sink device 101.

In addition, an isochronous data 601 which has been already transmitted from the first source device 102 to the sink device 101 is stored in the first individual data slot 302*a*1 of the transmission frame (#n) that is transmitted from the sink device 101 to the source device 102 (FIG. 6(*a*)).

A data 602 including the synchronous information that is transmitted from the sink device 101 to the first and second source devices 102 and 103 is stored in the second individual data slot 302*a*2 of the transmission frame (#n) which is transmitted from the sink device 101 to the first source device 102 (FIG. 6(*a*)).

An isochronous data 603 which is transmitted from the first source device 102 to the sink device 101 is stored in the first individual data slot 302*a*1 of the transmission frame (#n) (FIG. 6(*b*)) that is transmitted from the first source device 102 to the second source device 103.

An isochronous data 604 which is transmitted from the source device 103 to the sink device 101 is stored in the second individual slot 302*a*2 of the transmission frame (#n) (FIG. 6(*c*)) that is transmitted from the source device 103 to the sink device 101.

Next, a simple description is given of the operation of the data transmission system 10 in the case where the synchronous information is transmitted by using the isochronous data slot 302 of the transmission frame.

In the sink device 101, the processing of inserting the data 602 including the synchronous information in the second individual data slot 302*a*2 to the isochronous data slot 302 of the transmission frame, and transmitting the transmission frame to the first source device 102 is performed.

In the first source device 102, when the transmission frame (FIG. 6(*a*)) that is output from the sink device 101 is received, a processing of reproducing the timing reference signal based on the synchronous information that is included in the stored data 602 in the second individual data slot 302*a*2, and outputting the timing reference signal to the first data output unit 1011 is performed. In addition, in the first source device 102, a processing of replacing the isochronous data 601 which is stored in the first individual data slot 302*a*1 of the transmission frame with the video data 603 which is supplied by the first data output unit 1011, and transmitting the transmission frame to the source device 103 is performed.

In the second source device 103, when the transmission frame (FIG. 6(*b*)) that is output from the source device 102 is received, a processing of reproducing the timing reference signal based on the synchronous information that is included in the data 602 which is stored in the second individual data slot 302*a*2, and outputting the timing reference signal to the second data output unit 1012 is performed. In addition, in the second source device 103, a processing of replacing the data 602 that is stored in the second individual data slot 302*a*2 of the transmission frame with the video data 604 which is supplied from the second data output unit 1012, and transferring the transmission frame to the sink device 01 is performed.

In the sink device 101, when the transmission frame (FIG. 6(*c*)) that is output from the second source device 103 is received, a processing of obtaining isochronous data 603 and 604, between which the frame synchronization is established, from the first and second individual data slots 302*a*1 and 302*a*2 in the transmission frame is performed.

When the data transmission system 10 uses the isochronous data slot 302 for transmitting the isochronous data as the isochronous data transmission slot in cases where data are transmitted from the source device to the sink device, and when the data transmission system 10 uses the isochronous data slot 302 as the synchronous information transmission slot in cases where data are transmitted from the sink device to the source device, plural pieces of isochronous data between which the frame synchronization is established by the sink device can be obtained.

In FIG. 6, the synchronous information is transmitted by using the isochronous data slot. However, the synchronous information can be transmitted by using the asynchronous data slot 303. Also, in this case, plural pieces of isochronous data between which the frame synchronization is established by the sink device can be obtained.

In this first embodiment, the data transmission system in which the sink device 101 transmits the synchronous information to the first and second source devices 102 and 103 is shown. However, in the data transmission system 10, one of the two source devices can transmit the synchronous information to the sink device and the other source device. Also, in this case, the same effects as those in the first embodiment can be obtained.

In addition, in this first embodiment, the data transmission system in which the synchronous information that is generated by the sink device 101 is sequentially transferred in the fixed direction between the sink device 101 and the source devices constituting the transmission path in the form of ring is shown. However, in the data transmission system 10 of the first embodiment, the synchronous information can be transmitted from the sink device directly to each of the source devices. Also, in this case, the same effects as those in the first embodiment can be obtained.

Further, in this first embodiment, the sink device and the source devices constituting the data transmission system 10 perform data transmission based on one synchronous information. However, in this data transmission system 10 of the first embodiment, it is possible that plural data transmission apparatus (i.e., plural sink devices and plural source devices) constituting the data transmission system 10 are divided into plural groups and the data transmission apparatus that is included in each of the groups performs data transmission for each group based on different synchronous information.

Further, in this first embodiment, the timing reference signal that is used in the data transmission system 10 is a frame synchronous signal which indicates the head of each video frame (i.e., indicates the timing of start of signal processing for each video frame). However, when the signal processing for each video frame is performed for each of the blocks which divide a video frame, the timing reference signal can be a signal indicating the timing of the signal processing for the blocks (a block synchronous signal).

Further, the timing reference signal can be a signal which indicates the timing of signal processing for each of the left and right channels of an audio signal (channel synchronous signal). In this case, the signal processing for each of the left and right channels of the audio signal is performed for each processing unit of the audio signal (audio frame). Therefore, the signal processing for the left and right channels can be synchronized by the channel synchronous signal for each audio frame.

Furthermore, in this first embodiment, cameras are connected to the source devices, respectively, as the data output units which are external to the system, and the video composition device is connected to the sink device as the device which is external to the system. However, the data output unit which is external to the system and connected to the source device can be a video transmission device such as a VTR, and the device which is external to the system and connected to the sink device can be a monitor or a display device of a navigation system or the like, or a video recording device.

For example, when the data output unit which is external to the system and connected to the source device is a camera and the device which is external to the system and connected to the sink device is a display device, the motor-vehicle-mounted navigation system using real video can be realized. In addition, when the data output unit which is external to the system and connected to the source device is a camera and the device which is external to the system and connected to the sink device is a video recording device, a monitoring camera system or a motor-vehicle-mounted drive recorder (such as a device which records video in the case of accidents or robbery) can be realized.

Further, in this first embodiment, no specific example of members constituting the transmission line in the data transmission system 10 is particularly shown. However, optical fibers can be used for the transmission line.

Furthermore, in this first embodiment, the video data which propagate on the transmission lines as isochronous data in the data transmission system can be either non-compressed data or data which are compressed by a compressive method corresponding to MPEG (Moving Picture Experts Group).

Second Embodiment

Figure 7:
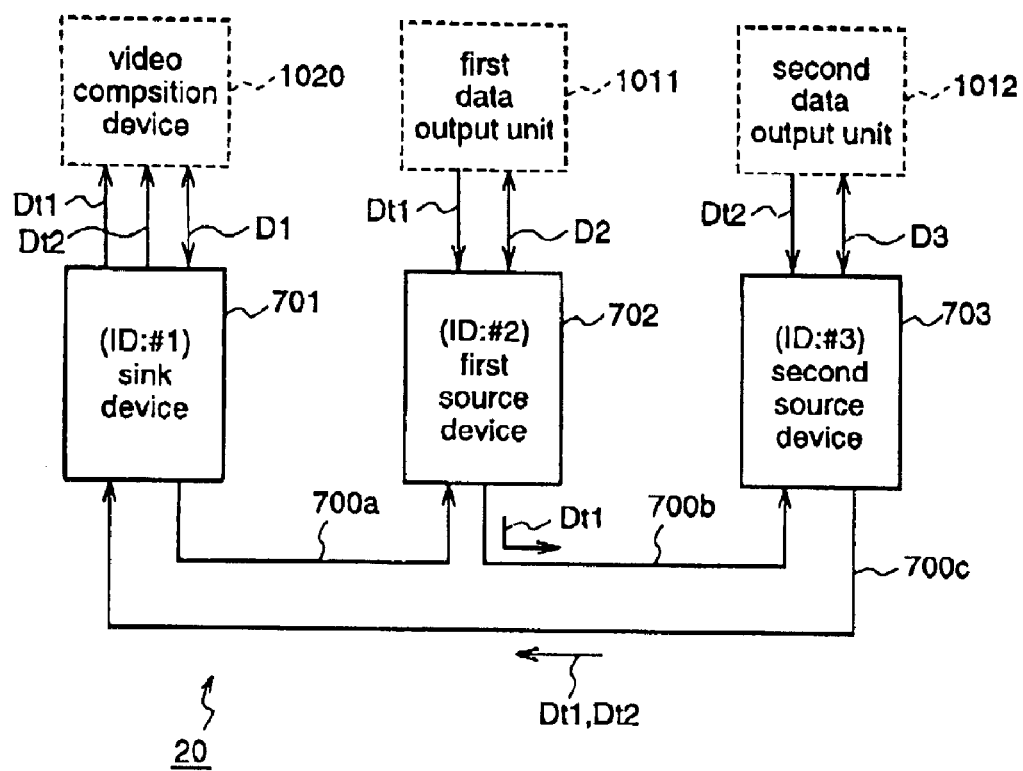
FIG. 7 is a diagram illustrating a data transmission system of a second embodiment of the present invention.

FIG. 7 is a diagram illustrating a data transmission system according to a second embodiment of the present invention.

The data transmission system 20 of the second embodiment comprises a first source device 702 for receiving a data having high real-time characteristics like audio data and video data that is output from a first data output unit 1011 such as a camera which is external to the system, and transmitting the data as an isochronous data Dt1. The data transmission system 20 also comprises a second source device 703 for receiving a data having high real-time characteristics like audio data and video data that is output from a second data output unit 1012 such as a camera which is external to the system, and transmitting the data as an isochronous data Dt2.

In addition, this data transmission system 20 has a sink device 701 for receiving the isochronous data Dt1 and Dt2 which are transmitted from the source devices 702 and 703, respectively, and outputting the isochronous data Dt1 and Dt2 to a video composition device 1020 which is external to the system. The data transmission system 20 also includes a first transmission line 700a for transmitting data between the sink device 701 and the first source device 702, a second transmission line 700b for transmitting data between the first and second source devices 102 and 103, and a third transmission line 700c for transmitting data between the second source device 103 and the sink device 101.

In this data transmission system 20, the sink device 701, the first and second source devices 702 and 703, and the first to third transmission lines 700a to 700c constitute one data transmission path in the form of a ring. In addition, in this data transmission system 20, the devices 701 to 703 operate with the same system clock, i.e., with an operational clock of one of the devices 701 to 703 (for example, the sink device 701), and operational clocks of other devices (the source devices 702 and 703) are synchronized.

In this second embodiment, identification ID (ID:#1), identification ID (ID:#2), and identification TD (ID:#3) are set in the devices 701 to 703, respectively, as identification IDs for identifying the devices.

Figure 8:
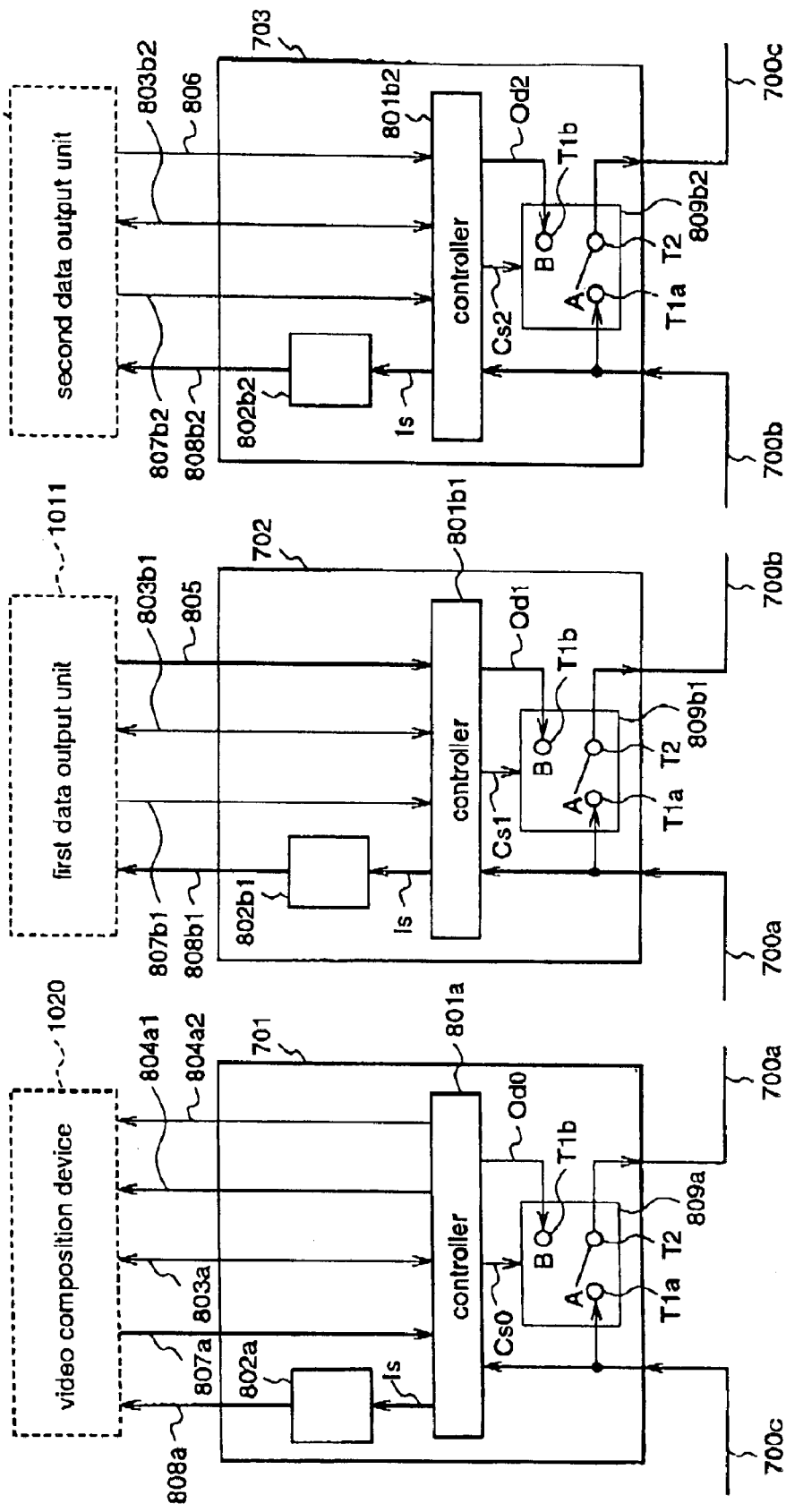
FIG. 8(a) is a diagram illustrating a structure of a sink device of the data transmission system according to the second embodiment.
FIG. 8(b) is a diagram illustrating a structure of a first source device.
FIG. 8(c) is a diagram illustrating a second source device.

FIG. 8(a) is a diagram illustrating a detailed structure of the sink device.

The sink device 701 comprises a controller 801a for performing a processing of receiving a transmission data Td from the transmission line 700c, a processing of transmitting the transmission data Td to the transmission line 700a, and a processing of controlling the video composition device 1020 external to the system. The sink device 701 also comprises a reference signal generator 802a for generating a reference signal (hereinafter referred to also as a timing reference signal) 808a based on synchronous information Is that is included in the received transmission data Td, and a selector switch 809a for selecting one of the transmission data Td from the transmission line 700c and an output data Od0 from the controller 801a in accordance with a control signal Cs0 that is output from the controller and outputting the selected data.

The timing reference signal 808a is a synchronous signal for determining a timing of composing isochronous data by the video composition device 1020 for each frame. The receiving processing of the controller 801a is a processing of receiving the transmission data Td from the transmission line 700c and outputting an isochronous data 804a1 and 804a2 that is included in the transmission data Td to the video composition device 1020 which is external to the system. The transmitting processing of the controller 801a includes an output processing of outputting a synchronous information 807a from the video composition device 1020 to the transmission line 700a as a part of the transmission data Td, and a transfer processing of transferring the transmission data Td from the transmission line 700c in its current form to the transmission line 700a, thereby controlling the selector switch 809a so as to switch the processing between the output processing and transfer processing in accordance with the control signal Cs0. In addition, the synchronous information 807a is a frame synchronous signal which indicates a timing of composing plural pieces of isochronous data by the video composition device 1020 for each frame. Further, the control processing of the controller 801a is a processing of transmitting/receiving an asynchronous data 803a such as commands for controlling the video composition device 1020 to/from the video composition device 1020.

The selector switch 809a has a first input terminal T1a (A end) which is connected to the transmission line 700c, a second input terminal T1b (B end) to which the output data Od0 that is output from the controller 801a is input, and an output terminal T2 which is connected to the transmission line 700a. In accordance with the control signal Cs0 that is output from the controller 801a, the output terminal T2 is connected to one of the first and second input terminals T1a and T1b.

Here, in this data transmission system 20 of the second embodiment, the sink device 701 outputs the synchronous information of the data transmission system 20 Therefore, a synchronous information output processing in the controller 801a of outputting the synchronous information Ts that is included in the received transmission data Td to the reference signal generator 802a and an operation in the reference signal generator 802a of generating the timing reference signal 808a based on the synchronous information Is are not required However, when the source device (e.g., the first or second source device 702, 703) other than the sink device 701 in the data transmission system 20 generates the synchronous information of the data transmission system 20, the synchronous information output processing in the controller 801a and the operation in the reference signal generator 802a for generating the timing reference signal 808a are performed.

FIG. 8(b) is a diagram illustrating a detailed structure of the first source device 702.

The first source device 702 has a controller 801b1 for performing a processing of receiving a transmission data Td from the transmission line 700a, a processing of transmitting the transmission data Td to the transmission line 700b, and a processing of controlling the first data output unit (camera) 1011 which is external to the system. The first source device 702 also includes a reference signal generator 802b1 for generating a timing reference signal 808b1 based on the synchronous information Is that is included in the received transmission data Td, and a selector switch 809b1 for selecting one of the transmission data Td from the transmission line 700a and an output data Ob1 that is output from the controller 801b1 in accordance with a control signal Cs1 that is output from the controller and outputting the selected data.

The timing reference signal 808b1 is a synchronous signal for determining a timing of outputting video data of each frame by the first data output unit 1011. The receiving processing of the controller 801b1 is a processing of receiving the transmission data Td from the transmission line 700a and outputting the synchronous information Is that is included the transmission data Td to the reference signal generator 802b1. In addition, the transmission processing of the controller 801b1 includes an output processing of outputting a video data 805 from the first data output unit 1011 to the transmission line 700b as a part of the transmission data Td (isochronous data), and a transfer processing of transferring the transmission data from the transmission line 700a as it is to the transmission line 700b. Further, the controller 801b1 performs processing of controlling the selector switch 809b1 so as to switch the processing between the output processing and the transfer processing in accordance with the control signal Cs1 this is output from the controller 801b1. Further, the control processing of the controller 801b1 is transmitting/receiving an asynchronous data 803b1 such as a command for controlling the first data output unit 1011 to/from the first data output unit 1011.

The selector switch 809b1 has a first input terminal T1a (A end) which is connected to the transmission line 700a, a second input terminal T1b (B end) to which the output data Od1 that is output from the controller 801b1 is input, and an output terminal T2 which is connected to the transmission line 700b. In accordance with the control signal Cs1 that is output from the controller 801b1, the output terminal T2 is connected to one of the first and second input terminals T1a and T1b.

In this data transmission system 20 of the second embodiment, the sink device 701 generates the synchronous information of the data transmission system 20. However, when the first source device 702 outputs the synchronous information of the data transmission system 20, the controller 801b1 of the first source device 702 also performs a processing of transmitting the synchronous information 807b1 which indicates the operation timing from the first data output unit 1011 to the transmission line 700b as a part of the transmission data Td in addition to the output processing and the transfer processing. To be more specific, the synchronous information 807b1 indicating the operation timing shows the timing of outputting the video data of each frame by the first data output unit 1011 to the source device 702.

FIG. 8(c) is a diagram illustrating a detailed structure of the second source device 703.

The second source device 703 comprises a controller 801b2 for performing a processing of receiving the transmission data Td from the transmission line 700b, a processing of transmitting the transmission data Td to the transmission line 700c, and a processing of controlling a second data output unit (camera) 1012 which is external to the system. The second source device 703 also comprises a reference signal generator 802b2 for generating a timing reference signal 808b2 based on the synchronous information Is that is included in the received transmission data Td, and a selector switch 809b2 for selecting one of the transmission data Td from the transmission line 700b and an output data Ob2 that is output from the controller 801b2 in accordance with the control signal Cs2 that is output from the controller and outputting the selected one.

The timing reference signal 808b2 is a synchronous signal for determining a timing of outputting the video data of each frame by the second data output unit 1012 The receiving processing of the controller 801b2 is a processing of receiving the transmission data Td from the transmission line 700b and outputting the synchronous information Is that is included in the transmission data to the reference signal generator 802b2. The transmission processing of the controller 801b2 includes an output processing of outputting a video data 806 from the second data output unit 1012 to the transmission line 700c as a part of the transmission data Td (isochronous data), and a transfer processing of transferring the transmission data Td from the transmission line 700b in its current form to the transmission line 700c. Further, the controller 801b2 performs control processing of controlling the selector switch 809b2 so as to switch the processing between the output processing and transfer processing in accordance with the control signal Cs2 that is output from the controller 801b2. Further, the control processing of the controller 801b2 is a processing of transmitting/receiving an asynchronous data 803b2 such as a command for controlling the second data output unit 1012 to/from the data output unit 1012.

The selector switch 809b2 has a first input terminal T1a (A end) which is connected to the transmission line 700b, a second input terminal T1b (B end) to which the output data Od2 from the controller 801b2 is input, and an output terminal T2 which is connected to the transmission line 700c. In accordance with the control signal Cs2 that is output from the controller 801b2, the output terminal T2 is connected to one of the first and second input terminals T1a and T1b.

In this data transmission system 20 of the second embodiment, the sink device 701 generates the synchronous information of the data transmission system 20. However, when the source device 703 outputs the synchronous information of the data transmission system 20, a processing of transmitting the synchronous information 807b2 which indicates the operation timing from the second data output unit 1012 to the transmission line 700c as a part of the transmission data Td is also performed by the controller 801b2 as the transmission processing in addition to the output processing and transfer processing. To be more specific, the synchronous information 807b2 indicating the operation timing shows the timing of outputting the video data of each frame by the second data output unit 1012 to the source device 703.

Figure 9:
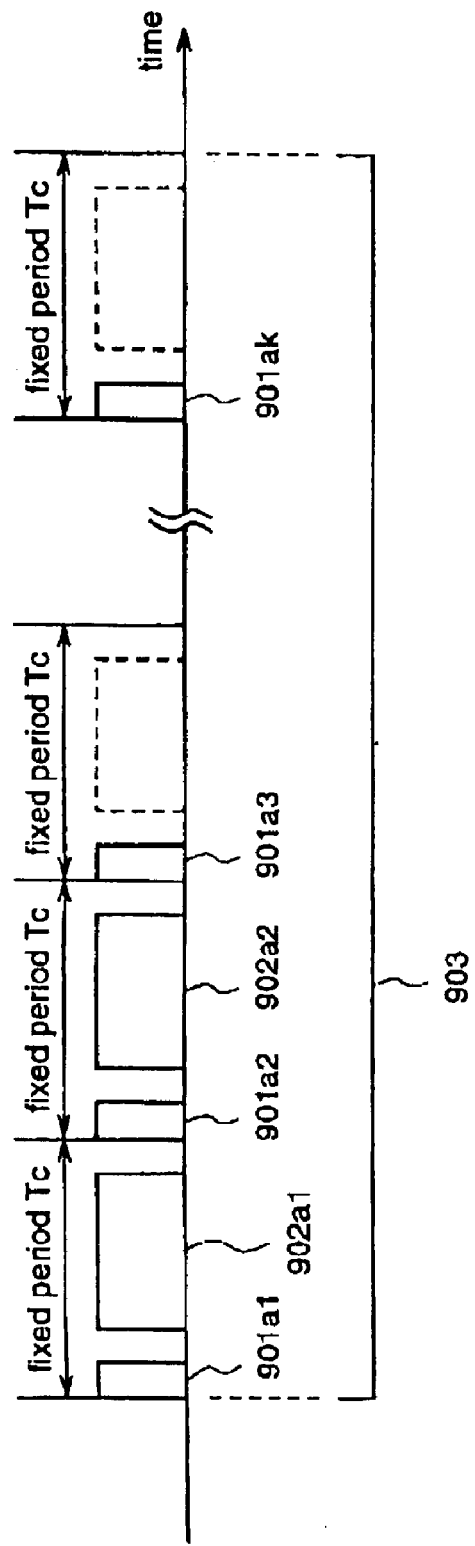
FIG. 9 is a diagram illustrating a data structure of transmission data which propagate on a transmission line of the data transmission system (transmission frame format) according to the second embodiment.

FIG. 9 is a diagram illustrating a data structure (transmission frame format) of the transmission data which are transmitted to the transmission lines 700a to 700c.

In the transmission frame 903 as a repetitive unit of the data transmission, a predetermined number of groups of a transmission/receipt designation packet and a data packet are transmitted in a group of a transmission/receipt designation packet and the subsequent data packet. In this case, the transmission/receipt designation packet is a transmission/receipt designation packet which contains information for designating a device for transmitting an immediately following data packet (transmission source device) and a device for receiving this data packet (transmission destination packet). In addition, the data packet is a packet which contains data which are transmitted/received to/from the device that is designated by information stored in the immediately preceding transmission/receipt designation packet, which are output from the respective devices. Here, the transmission/receipt packets 901a1 to 901ak are the first to k-th transmission/receipt designation packets in the transmission frame 903. The data packets 902a1 to 902ak are the first to k-th data packet in the transmission frame 903.

Further, the respective transmission/receipt designation packets and data packets are transmitted from one of the devices 701 to 703. During the period corresponding to one frame (frame period), the transmission/receipt designation packet and data packet are transmitted at fixed time periods TC.

The transmission/receipt designation packet is transmitted to the transmission line at a fixed time interval as a packet containing NULL information which does not designate the transmission source device and the transmission destination device even during a time period when isochronous data are not output in the frame period. That is, the transmission/receipt designation packet is transmitted to the transmission line at a fixed time interval without interruption for each frame period.

During each period of the transmission frame, the predetermined number of groups of the transmission/receipt designation packet and data packet are transmitted by taking the transmission/receipt designation packet and the data packet as one group, and the transmission frame, as a unit of the data transmission, is repeatedly transmitted.

The operation of the data transmission system 20 will now be described.

In the following description, assume that in the data transmission system 20 of the second embodiment the sink device 701 transmits the transmission/receipt designation packet at predetermined periods. Further, the transmission/receipt designation packet 901a1 designates the first source device 702 (ID:#2) as the transmission device for the data packet 902a1, and designates the sink device 701 (ID:#1) as the receiving device for the data packet 902a1. In addition, the transmission/receipt designation packet 901a2 designates the second source device 703 (ID:#3) as the transmission device for the data packet 902a2, and designates the sink device 701 (ID:#1) as the receiving device of the data packet 902a2. Further, the transmission/receipt designation packet 901a3 is a packet containing NULL data which does not designate the source device or the sink device.

Further, the data transmission operation of the data transmission system 20 according to the second embodiment is an operation for transmitting the video data from the first and second data output units (cameras) from the corresponding two source devices 702 and 703 to one sink device 701, and outputting the two kinds of video data that are received by the sink device to the video composition device 1020 which is external to the system.

Hereinafter, the basic operation of the data transmission system 20 of the second embodiment will be described. In this data transmission system 20, the respective selector switches 809a, 809b1 and 809b2 of the devices 701 to 703 are normally in the data transfer status where the output terminal T2 is connected to the first input terminal T1a (A end).

In this data transfer status, initially in the sink device 701, the selector switch 809a is controlled in accordance with the control signal Cs0 that is output from the controller 801a so that the transmission line 700a on its output end is connected to the output end (B end) of the controller 801a. Then, the transmission/receipt designation packet 901a1 is transmitted from the controller 801a to the transmission line 700a via the selector switch 809a.

At this time, in the respective selector switches 809b1 and 809b2 of the first and second source devices 702 and 703, the output terminals T2 are connected to the first input terminal T1a (A end). Therefore, in the first and second source devices 702 and 703, the processing of transferring the transmission/receipt designation packet 901a1 and the processing of receiving the transmission/receipt designation packet 901a1 by the controllers 801b1 an 801b2 are performed.

To be more specific, in the first source device 702, the transmission/receipt designation packet 901a1 that is output from the sink device 701 is input to the controller 801b1 via the transmission line 700a. At the same time, the transmission/receipt designation packet 901a1 is transferred to the third source device 703 via the transmission line 700b. In addition, in the second source device 703, the transmission/receipt designation packet 901a1 that is output from the source device 702 is input to the controller 801b2 via the transmission line 700b. At the same time, the transmission/receipt designation packet 901a1 is transferred to the sink device 701 via the transmission line 700c.

In this way, the transmission/receipt designation packet 901a1 that is output from the sink device 701 passes through the transmission line 700a, the first source device 702, the transmission line 700b, the second source device 703, and the transmission line 700c, and returns to the sink device 701 again. At this time, in the selector switch 809a of the sink device 701, the output terminal T2 is connected to the second input terminal T1b (B end). Therefore, the transmission/receipt designation packet 901a1 is not transferred to the source device 702 again, and is abandoned by the controller 801a of the sink device 701. In the selector switch 809a of the sink device 701, the output terminal T2 is connected to the first input terminal T0a (A end) after the abandonment of the transmission/receipt designation packet 901a1.

In addition, when the transmission/receipt designation packet 901a1 is input to the devices, i.e., the sink device 701 and the source devices 702 and 703, the controller of each of the devices analyzes the input transmission/receipt designation packet 901a1 and thereafter performs the operations in accordance with the analysis result.

Hereinafter, the operation of the controller will be mainly described in more detail. Here, the transmission/receipt packet 901a1 that is transmitted from the sink device 701 includes information which designates the first source device 702 as the supply source of data and which designates the sink device 701 as the supply destination of data. In addition, the transmission/receipt designation packet 901a2 that is transmitted from the sink device 701 includes information which designates the source device 703 as the supply source of data and designates the sink device 701 as the supply destination of data. The transmission/receipt designation packet 901a3 that is transmitted from the sink device 701 includes NULL information which does not designate the source device or sink device.

The Operation in the Cycle of Transmitting the First Transmission/Receipt Designation Packet 901a1

Initially, a description is given of the operation from a time when the first transmission/receipt designation packet 901a1 is transmitted from the sink device 701 to a time when this packet returns to the sink device 701.

In the sink device 701, the connection status in the selector switch 809a is switched in accordance with the control signal Cs0 that is output from the controller 801a1. That is, in the selector switch 809a, the normal connection status where the first input terminal T1a (A end) is connected to the output terminal T2 is switched to the data output status where the second input terminal T1b (B end) is connected to the output terminal T2. The transmission/receipt designation packet 901a1 which is generated by the controller 801a is output to the transmission line 700a via the selector switch 809a.

When the transmission/receipt designation packet 901a1 is received by the first source device 702, the transmission/receipt designation packet 901a1 is analyzed by the controller 801b1 in the first source device 702, and the transmission/receipt designation packet 901a1 is transmitted to the transmission line 700b via the selector switch 809b1.

Thereafter, in accordance with the analysis result of the transmission/receipt designation packet 901a1, the connection status of the selector switch 809b1 of the first source device 702 is switched in accordance with the control signal Cs1 that is output from the controller 801b1. In this case, the transmission/receipt designation packet 901a1 includes the information which designates the first source device 702 as the data supply source. Therefore, in the selector switch 809b1, the normal connection status where the first input terminal T1a (A end) is connected to the output terminal T2 is switched to the data output status where the second input terminal T1b (B end) is connected to the output terminal T2 in accordance with the control signal Cs1 that is output from the controller 801b1 of the first source device 702 so that the output data Od1 of the controller 801b1 is output to the transmission line 700b. Then, the data packet 902a1 which contains video data that is output from the first data output unit 1011 which is external to the system is output from the controller 801b1 to the transmission line 700b via the selector switch 809b1.

When the transmission/receipt designation packet 901a1 that is transmitted from the first source device 702 is input to the second source device 703, the transmission/receipt designation packet 901a1 is analyzed by the controller 801b2 in the second source device 703, and the transmission/receipt designation packet 901a1 is transmitted to the transmission line 700c via the selector switch 809b2 In this case, the transmission/receipt designation packet 901a1 does not include the information which designates the second source device 703 as the data supply source. Therefore, in the selector switch 809b2, the normal connection status where the first input terminal T1a (A end) is connected to the output terminal T2 is maintained in accordance with the control signal Cs2 that is output from the controller 801b2. Further, the data packet 902a1 following to the transmission/receipt designation packet 901a1 is transferred to the transmission line 700c via the selector switch 809b2.

When the transmission/receipt designation packet 901a1 is input to the sink device 701 via the transmission line 700c, the transmission/receipt designation packet 901a1 is analyzed by the controller 801a in the sink device 701. At this time, the selector switch 809a of the sink device 701 is in the data output status where the second input terminal bulb (B end) is connected to the output terminal T2. Therefore, the transmission/receipt designation packet 901a1 from the transmission line 700c is not output to the transmission line 700a and is abandoned. Thereafter, in the selector switch 809a of the sink device 701, the connection status is switched from the data output status to the normal connection status in accordance with the control signal Cs0 that is output from the controller 801a.

When the data packet 902a1 following the transmission/receipt designation packet 901a1 is input to the sink device 701, the processing according to the analysis result of the transmission/receipt designation packet 901a1 is performed in the controller 801a. To be specific, the transmission/receipt designation packet 901a1 includes the information which designates the sink device 701 as the data supply destination. Therefore, in the controller 801a of the sink device 701, the isochronous data (video data that is output from the first data output unit 1011) which is stored in the data packet 902a1 following the transmission/receipt designation packet 901a1 is extracted and retained. At this time, the selector switch 8091 is in the normal connection status where the first input terminal T1a (A end) is connected to the output terminal T2. Therefore, the data packet 902a1 from the transmission line 700c is output to the transmission line 700a via the selector switch 809a.

The Operation in the Cycle of Transmitting the Second Transmission/Receipt Designation Packet 901a2

The operation from the transmission of the second transmission/receipt designation packet 901a2 from the sink device 701 to the receipt of the packet 901a2 by the sink device 701 will now be described.

After the first data packet 901a1 was transmitted, the transmission/receipt designation packet 901a2 is generated in the controller 801a of the sink device 701, and the connection status is switched to the data output status where the second input terminal T1b (B end) is connected to the output terminal T2 in the selector switch 809a in accordance with the control signal Cs0 that is output from the controller 801a of the sink device 701. Then, the transmission/receipt designation packet 901a2 is output to the transmission line 700a via the selector switch 809a.

When the first data packet 902a1 that is transmitted from the sink device 701 is input to the first source device 702, the data packet 902a1 is abandoned. At this time, the selector switch 809b1 of the first source device 702 is in the data output status where the second input terminal T1b (B end) is connected to the output terminal T2. Therefore, the data packet 902a1 from the transmission line 700a is not output to the transmission line 700b. Thereafter, in the selector switch 809b1, the connection status is switched to the normal connection status in accordance with the control signal Cs0 that is output from the controller 801b1.

When the second transmission/receipt designation packet 901a2 that is transmitted from the sink device 701 is input to the first source device 702, following the first data packet 902a1, the analysis of the transmission/receipt designation packet 901a2 is performed by the controller 801b1 of the first source device 702. In addition, the transmission/receipt designation packet 901a2 does not include the information which designates the first source device 702 as the data supply source. Therefore, in the selector switch 809b1, the normal connection status where the first input terminal T1a is connected to the output terminal T2 is maintained in accordance with the control signal Cs1 that is output from the controller 801b1. Further, the transmission/receipt designation packet 901a2 is transmitted to the transmission line 700b via the selector switch 809b1.

When the second transmission/receipt designation packet 901a2 is received by the second source device 703, the transmission/receipt designation packet 901a2 is analyzed by the controller 801b2 of the second source device 703, and the transmission/receipt designation packet 901a2 is transmitted to the transmission line 100c via the selector switch 809b2 of the second source device 703.

Thereafter, the selector switch 809b2 is switched and controlled in accordance with the control signal Cs2 that is output from the controller 801b2 in accordance with the result of the analysis of the transmission/receipt designation packet 901a2. In this case, the transmission/receipt designation packet 901a2 includes the information which designates the second source device 703 as the data supply source. Therefore, in the selector switch 809b2, the connection status is switched in accordance with the control signal Cs2 that is output from the controller 801b2 to the data output status where the output data Od2 of the controller 801b2 is output to the transmission line 7000c. Then, the second data packet 902a2 which contains the video data that is transmitted from the second data output unit 1012 which is external to the system is output from the controller 801b2 to the transmission line 700c via the selector switch 809b2.

When the second transmission/receipt designation packet 901a2 is input to the sink device 701 via the transmission line 700c, the analysis of the transmission/receipt designation packet 901a2 is performed by the controller 801a of the sink device 701. At this time, in the selector switch 809a, the second input terminal T1b (B end) is connected to the output terminal T2. Therefore, the second transmission/receipt designation packet 901a2 from the transmission line 700c is not output to the transmission line 700a and is abandoned. Thereafter, the connection status of the selector switch 809a of the sink device 701 is switched from the data output status to the normal connection status in accordance with the control signal Cs0 that is output from the controller 801a.

When the second data packet 902a2 following the second transmission/receipt designation packet 901a2 is input to the sink device 701, the processing according to the result of the analysis of the transmission/receipt designation packet 901a2 is performed by the controller 801a of the sink device 701. To be specific, the transmission/receipt designation packet 901a2 includes the information which designates the sink device 701 as the data supply source. Therefore, in the controller 801a, the isochronous data that is stored in the second data packet 902a2 following the second transmission/receipt designation packet 901a2 (video data from the second data output unit 1012) is extracted and retained. At this time, the selector switch 809a is in the normal connection status where the first input terminal T0a (A end) is connected to the output terminal T2. Therefore, the second data packet 902a2 from the transmission line 700c is output to the transmission line 700a via the selector switch 809a.

The Operation in the Cycle of Transmitting the Third Transmission/Receipt Designation Packet 901a3

The operation from the transmission of the third transmission/receipt designation packet 901a3 from the sink device 701 to the receipt of the packet 901a3 by the sink device 701 will be described.

After the second data packet 902a2 was transmitted, the third transmission/receipt designation packet 901a3 is generated in the controller 801a of the sink device 701, and, in the selector switch 809a of the sink device 701, the connection status is switched to the data output status in accordance with the control signal Cs0 that is output from the controller 801a. Then, the third transmission/receipt designation packet 901a3 is output to the transmission line 700a via the selector switch 809a.

When the second data packet 902a2 that is transmitted from the sink device 701 is input to the first source device 702, the data packet 902a2 is transferred to the second source device 703. At this time, the selector switch 809b1 of the first source device 702 is in the normal connection status where the first input terminal T1a (A end) is connected to the output terminal T2. Therefore, the data packet 902a2 from the transmission line 700a is output to the transmission line 700b.

When the third transmission/receipt designation packet 901a3 that is transmitted from the sink device 701 is input to the first source device 702, following the second data packet 902a2, the analysis of the transmission/receipt designation packet 901a3 is performed by the controller 801b1 of the first source device 702. As a result of this analysis, the transmission/receipt designation packet 901a3 does not include information which designates the first source device 702 as the data supply source. Therefore, in the selector switch 809b1 of the first source device 702, the normal connection status where the first input terminal T1a is connected to the output terminal T2 is maintained. Accordingly, the transmission/receipt designation packet 901a3 is transmitted to the transmission line 700b via the selector switch 809b1.

When the second data packet 902a2 that is transmitted from the first source device 702 is input to the second source device 703, the data packet 902a2 is abandoned. At this time, the selector switch 809b2 of the second source device 703 is in the data output status where the second input terminal T1b (B end) is connected to the output terminal T2. Therefore, the data packet 902a2 from the transmission line 700b is not output to the transmission line 700c. Thereafter, in the selector switch 809b2, the connection status is switched to the normal connection status in accordance with the control signal Cs2 that is output from the controller 801b2 of the second source device 703.

When the third transmission/receipt designation packet 901a3 that is transmitted from the sink device 701, following the second data packet 902a2 is input to the second source device 703, the analysis of the transmission/receipt designation packet 901a3 is performed by the controller 801b2 of the second source device 703. As a result of the analysis, the third transmission/receipt designation packet 901a3 does not include information which designates the second source device 703 as the data supply source. Therefore, in the selector switch 809b2, the normal connection status where the first input terminal T1a is connected to the output terminal T2 is maintained in accordance with the control signal Cs2 that is output from the controller 801b2. Further, the third transmission/receipt designation packet 901a3 is transmitted to the transmission line 700c via the selector switch 809b2. When the third transmission/receipt designation packet 901a3 is input to the sink device 701 via the transmission line 700c, the analysis of the transmission/receipt designation packet 901a3 is performed by the controller 801a of the sink device 701. At this time, the selector switch 809a of the sink device 701 is in the data output status where the second input terminal T1b (B end) is connected to the output terminal T2. Therefore, the third transmission/receipt designation packet 901a3 from the transmission line 700c is not output to the transmission line 700a and is abandoned. Thereafter, in the selector switch 809a of the sink device 701, the data output status is switched to the normal connection status in accordance with the control signal Cs0 that is output from the controller 801a.

Thereafter, in the sink device 701, similar to the third transmission/receipt designation packet 901a3, the transmission and receipt of the transmission/receipt designation packets 901a4 to 901 an containing NULL information is performed until one frame period has elapsed. These transmission/receipt designation packets 901a4 to 901 an do not include information which designates the data supply source or data supply destination. Therefore, in any of the first and second source devices 702 and 703, generation of data packets corresponding to the transmission/receipt designation packets 901a4 to 901 an is not performed but only transferring the transmission/receipt designation packets 901a4 to 901an is performed.

In the data transmission system 20 of the second embodiment, the processing of transmitting transmission/receipt designation packets and data packets is repeatedly performed for each transmission frame. Thereby, the data transmission is performed between devices which are designated by the transmission/receipt designation packets. In this case, the video data 805 that is output from the first data output unit 1011 and the video data 806 that is output from the second data output unit 1012 are transmitted from the source devices 702 and 703, respectively, to the sink device 701 in units of frame.

Since the interval of transmission of the transmission/receipt designation packets is a fixed time period, the sizes of the data packets are finite. Therefore, when the size of the data to be transmitted from one source device to the corresponding sink device during one transmission frame period, for example the data size of video data of one frame to be transmitted from the first source device to the sink device is larger than the size of data which can be stored in the data packet 902, it is difficult to satisfactorily transmit the isochronous data having real-time characteristics such as video data in this data transmission system 20.

Then, when the isochronous data having a larger data size is to be transmitted, a method of generating a plurality of the transmission/receipt designation packets which designate the same source device and the same sink device in one transmission frame period can be employed. In this method, the isochronous data having a larger data size can be distributed to plural data packets in one transmission frame period so as to be transmitted. Accordingly, the isochronous data having a higher rate can be transmitted in one frame period.

Then, in this data transmission system 20 of the second embodiment, when the data transmission operation using the above-mentioned transmission/receipt designation packet and data packet is to be performed, the inherent synchronous information (reference signal information) corresponding to the isochronous data which is transmitted by using the data packet as well as the information which designates the source device as the data supply source and the sink device as the data supply destination (transmission data designation information) is stored in the transmission/receipt designation packet, and is transmitted.

Hereinafter, a description is given of the data transmission operation for storing the synchronous information together with the transmission data designation information in the first transmission/receipt designation packet so as to transmitted.

Figure 10:
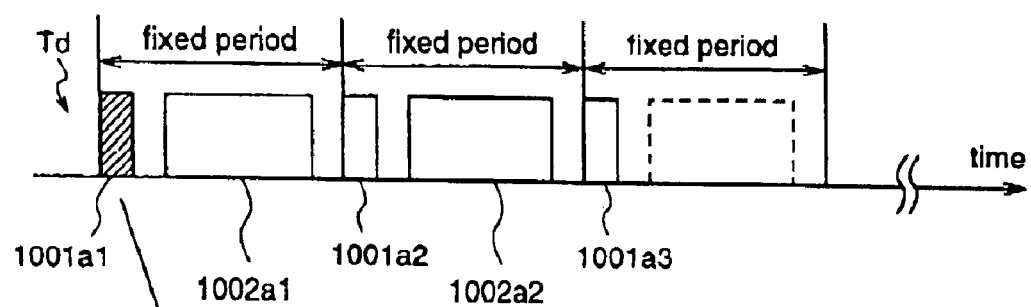
FIG. 10(a) is a diagram illustrating a data structure of transmission data which propagate on a transmission line of the data transmission system according to the second embodiment.
FIGS. 10(b) and 10(c) are diagrams illustrating timing reference signals which are reproduced by the first and second source devices in the data transmission system of the second embodiment.
Figure 10:
Figure 10:
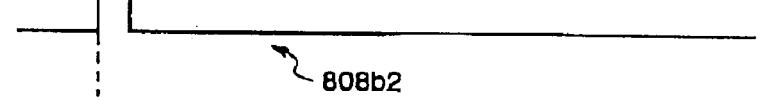

FIG. 10(a) shows a transmission data which propagates on the transmission lines in the data transmission system 20 of the second embodiment. FIGS. 10(b) and 10(c) show reference signals which are reproduced in the first and second source devices.

During a predetermined transmission frame period of the transmission data Td, the transmission/receipt designation packets 1001a1 to 100a3 are transmitted at fixed time intervals. In addition, following the transmission/receipt designation packet 1001a1, the corresponding data packet 1002a1 is transmitted, and following the transmission/receipt designation packet 1001a2, the corresponding data packet 1002a2 is transmitted.

Here, the transmission/receipt designation packet 1100a1 is a special transmission/receipt designation packet which includes the transmission data designation information designating the first source device 702 as the supply source of data that is stored in the data packet 1002a1 corresponding to the packet 1001a1 and designating the sink device 701 as the supply destination, as well as the synchronous information (reference signal information) inherent to the isochronous data. In addition, the transmission/receipt designation packet 1001a2 includes the transmission data designation information which designates the second source device 703 as the supply source of data stored in the data packet 1002a2 corresponding to the packet 1001a2, and designates the sink device 701 as the supply destination. In addition, the transmission/receipt designation packet 1001a3 includes NULL information for which there is no data packet corresponding thereto.

Further, the synchronous information which is inherent to the isochronous data that is included in the special transmission/receipt designation packet is reproduced by the reference signal generator 802b0 in the first source device 702 as the reference signal 808b1 (FIG. 10(b)), and the synchronous information is reproduced by the reference signal generator 802b2 in the second source device 703 as the reference signal 808b2 (FIG. 10(c)).

Figure 11:
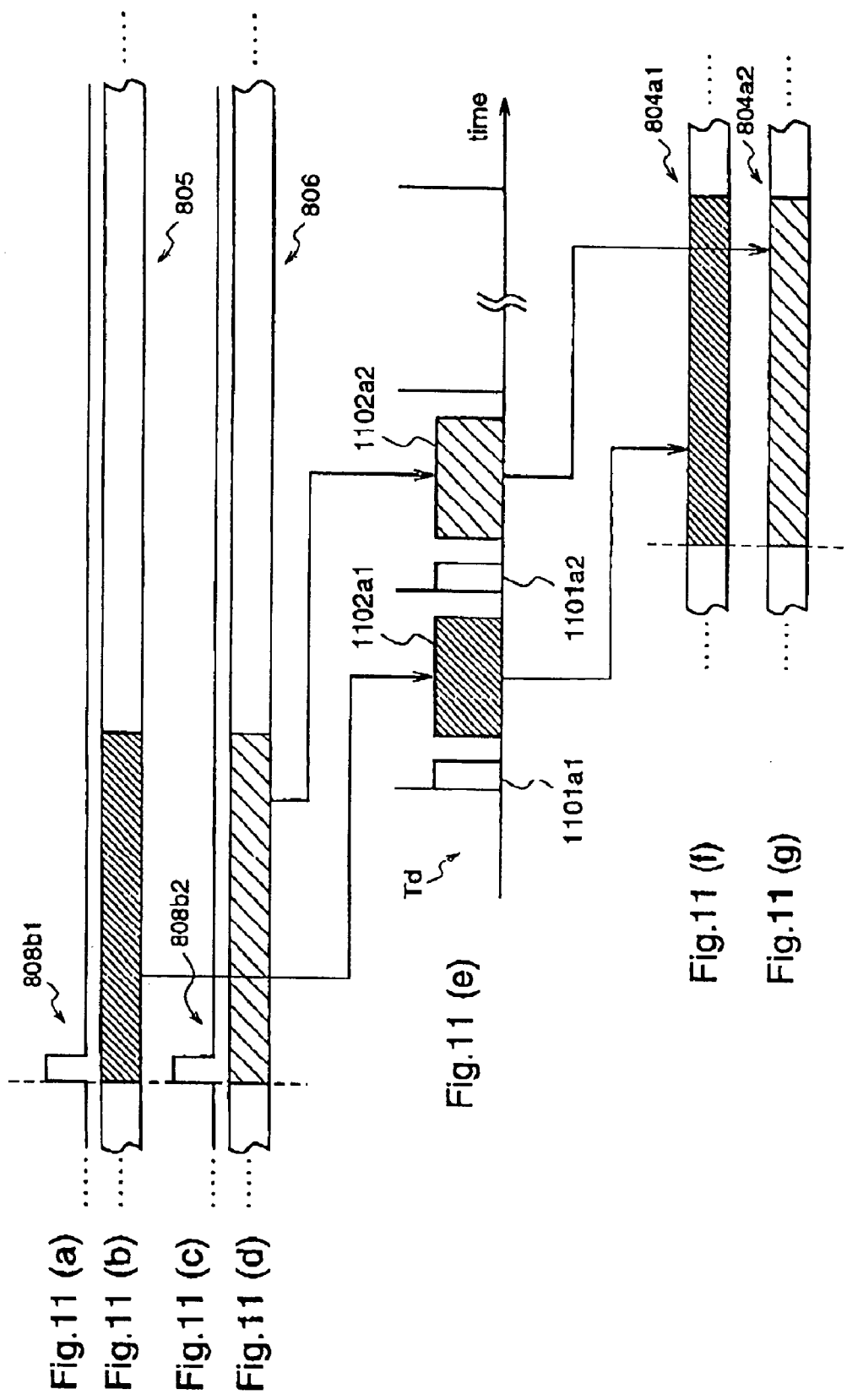

FIGS. 11(a)–11(f) are diagrams for explaining the respective operations of the devices of the data transmission system 20. FIG. 11(a) shows the reference signal 808b1 that is output by the reference signal generator 802b1 of the first source device 702. FIG. 11(b) shows the video data 805 which is input from the first data output unit 1011 to the controller 801b1 of the first source device 702. FIG. 11(c) shows the reference signal 808b2 which is output from the reference signal generator 802b2 of the second source device 703. FIG. 11(d) shows the video data 806 which is input from the second data output unit 1012 to the controller 801b2 of the second source device 703. Further, FIG. 11(e) shows the transmission data Td on the transmission line of the data transmission system 20, and FIGS. 11(f) and 11(g) show the video data 804a1 and 804a2 which is output from the controller 801a of the sink device 701 to the video composition device 1020 (i.e., the video data 805 and 806 which are output from the first and second data output units 1011 and 1012) Here, the synchronous signals shown in FIGS. 11(a) nd 11(c) are the same as the synchronous signals as shown in the FIGS. 10(b) and 10(c), respectively.

Initially, the synchronous information 807a is input from the video composition device 1020 which is external to the system to the sink device 701. This synchronous information represents a timing signal as a reference of a processing of composing two pieces of video data, i.e., video data that are output from the first and second data output units 1011 and 1012 in the video composition device 1020. For example, a frame synchronous signal indicating the head of the video frame is used as the synchronous information.

Here, the synchronous information is not limited to the frame synchronous signal. It can be any information as long as such information can reproduce the frame synchronous signal. For example, the synchronous information can include frequency information which indicates the frequency of the frame synchronous signal and phase information which indicates the phase of the frame synchronous signal. Here, the frequency information is information which indicates that the frame synchronous signal is obtained by X-dividing (where X is a positive integer) the operational clock of the system, or information which indicates the cycle of the frame synchronous signal, or the like. The phase information is information which indicates the timing of a rising edge or falling edge of the frame synchronous signal, or temporal information which indicates the phase with respect to the rising edge or falling edge, or the like. In addition, as the operational clock of the system, an operational clock of any one of the sink device 701 and the first and second source devices 802 and 803 in the data transmission system 20, and the video composition device 1020 and the first and second data output units (cameras) 1011 and 1012 which are external to the system is employed.

When the synchronous information 807a that is output from the video composition device 1020 which is external to the system is input to the sink device 701, the transmission processing of multiplexing the synchronous information and the special transmission/receipt designation packet 100a1 of a predetermined transmission frame and transmitting the multiplexed information to the transmission line 700a is performed in the controller 801a of the sink device 701. The simplest method of multiplexing the synchronous information and the special transmission/receipt designation packet 1001a1 is a method of synchronizing the transmission/receipt designation packet 1001a1 with the frame synchronous signal and multiplexing these data. To be specific, one special transmission/receipt designation packet is multiplexed for each predetermined number of transmission frames at a timing of rising or falling of the frame synchronous signal. Thereby, it can be seen that the timing of receiving the special transmission/receipt designation packet of the transmission frame is a timing of starting the processing of the frame on the receiving end of the transmission data. In this case, each of the devices should distinguish between the special transmission/receipt designation packet 1001a1 and the normal transmission/receipt designation packet 1001a2. The special transmission/receipt designation packet 1001a1 includes an identification bit for distinguishing the special transmission/receipt designation packet 1001a1 from the normal transmission/receipt designation packet 1001a2. When the special transmission/receipt designation packet 1001a1 is multiplexed in the transmission frame, it is unnecessary for the special transmission/receipt designation packet 1001a1 to particularly include the frequency information or phase information for reproducing the frame synchronous signal.

When the special transmission/receipt designation packet 1001a1 that is transmitted from the sink device 701 is received by the first source device 702 via the transmission line 700a, the processing of outputting the synchronous information that is included in the received special transmission/receipt designation packet 1001a1 to the reference signal generator 802b1 is performed in the controller 801b1 of the first source device 702. Then, in the reference signal generator 802b1, the frame synchronous signal, as the timing reference signal 808b1 (FIG. 10(b)) in processing video data, is reproduced based on the synchronous information that is output from the controller 801a of the sink device 701.

When the timing of outputting the special transmission/receipt designation packet 1001a1 is the rising or falling timing itself of the frame synchronous signal, the first source device 702 can know the phase of the frame synchronous signal with respect to the head of the transmission frame based on the timing of receiving the head of the transmission frame and the timing of receiving of the special transmission/receipt designation packet 1001a1 only when the special transmission/receipt designation packet 1001a1 that is output from the sink device 701 is received at least once. Therefore, for the transmission frames which are subsequent to the transmission frame including the special transmission/receipt designation packet 1001a1, the frame synchronous signal can be generated based on the timing of receiving the head of each transmission frame.

Then, the timing reference signal 808b1 (FIG. 11(a)) which is generated by the reference signal generator 802b1 of the first source device 702 is output to the first data output unit 1011 which is external to the system. Then, in the first data output unit (camera) 1011, an image-taking processing is performed in synchronization with the timing reference signal 808b1 that is output from the first source device 702, and the video data 805 which is obtained by the image-taking processing is output to the first source device 702 (FIG. 11(b)).

Then, in the controller 801b1 of the first source device 702, the video data 805 that is output from the data output unit 1011 is retained. Thereafter, in the controller 801b1, the transmission processing of storing the video data 805 in the data packet 1102a1 (data packet 1002a1 in FIG. 10(a)) as the isochronous data and transmitting the data packet 11102a1 so as to follow the received special transmission/receipt designation packet 1001a1 (transmission/receipt designation packet 1001a1 in FIG. 10(a)) to the transmission line 700b is performed (FIG. 11(e)).

When the special transmission/receipt designation packet 1001a1 that is transmitted from the sink device 701 is received by the second source device 703 via the transmission line 700b, the processing of outputting the synchronous information which is included in the received special transmission/receipt designation packet 1001a1 to the reference signal generator 802b2 of the second source device 703 is performed in the controller 801b2. Then, in the reference signal generator 802b2, the frame synchronous signal, as the timing reference signal 808b2 (FIG. 10(c)) in processing video data, is reproduced based on the synchronous information that is output from the controller 801a of the sink device 701.

Then, the timing reference signal 808b2 (FIG. 11(c)) that is generated by the reference signal generator 802b2 of the second source device 703 is output to the second data output unit 1012 which is external to the system. Then, in the second data output unit (camera) 1012, an image-taking processing is performed in synchronization with the timing reference signal 808b2 that is output from the second source device 703, and the video data 806 which is obtained by the image-taking processing is output to the source device 703 (FIG. 11(d)).

Then, in the controller 801b2 of the second source device 703, the video data 806 that is output from the data output unit 1012 is retained. However, the special transmission/receipt designation packet 1001a1 does not include information which designates the second source device 703 as the data supply source. Therefore, at a time when the special transmission/receipt designation packet 1001a1 has been received by the second source device 703, the processing of storing the video data 806 that is retained in the controller 801b2 in a data packet and outputting the data is not performed. Then, when the transmission/receipt designation packet 1002a2 including the information which designates the second source device 703 as the data supply source is received after the receipt of the special transmission/receipt designation packet 1001a1, the processing of storing the video data 806 that is retained in the controller 801b2 in the data packet 1102a2 (data packet 1002a2 in FIG. 10(a)) and outputting the data packet 1102a2 subsequent to the transmission/receipt designation packet 1102a2 (transmission/receipt designation packet 1001a2 in FIG. 10(a)) is performed (FIG. 11(e)).

Then, in the sink device 701, the data packet 1002a1 is received subsequent to the special transmission/receipt designation packet 1001a1, and then, the data packet 1002a2 is received subsequent to the transmission/receipt designation packet 1001a2. Then, in the controller 801a of the sink device 701, the processing of copying isochronous data that is included in the received data packets 1002a1 and 1002a2 and outputting copied isochronous data 804a1 (FIG. 11(f)) and 804a2 (FIG. 11(g)) to the video composition device 1020 as the video data 805 and 806 that are output from the source devices 702 and 703 is performed.

These two kinds of video data are input from the first and second data output units 1011 and 1012 to the first and second source devices 702 and 703 in the status where their frame synchronization is established. Therefore, when these two kinds of video data are output from the sink device 701 to the video composition device 1020, the frame synchronization of these video data is established.

Here, after the data packet 1002a2 is transmitted from each source device, plural transmission/receipt designation packets which contain NULL information such as the transmission/receipt designation packet 1001a3 are transmitted from the sink devices 701. However, since the transmission/receipt designation packet does not include data transmission information, the processing of transmitting a data packet which is subsequent to the transmission/receipt designation packet is not performed in each of the source devices.

As described above, in the data transmission system 20 of the second embodiment, the transmission processing of storing the synchronous information which is supplied from the video composition device 1020 in the special transmission/receipt designation packet 1001a1 and transmitting the special transmission/receipt designation packet 1001a1 to the source devices is performed by the sink device 701. In the source devices 702 and 703, the same special transmission/receipt designation packet 1001a1 which is output from the sink device 701 is received, and the timing reference signal is reproduced from the synchronous information that is included in the received special transmission/receipt designation packet 1001a1. Therefore, as shown in FIGS. 11(a) and 11(c), the timing reference signals 808b1 and 808b2 having the frequency and the same phase are output from the reference signal generators 802b1 and 802b2 of the first and second source devices 702 and 703 to the first and second data output units 1011 and 1012, respectively. However, a data delay resulting from the receipt or transfer in the respective devices, or a data delay on the transmission line is ignored.

In this data transmission system 20 of the second embodiment, the frame synchronous signal is output from the first and second source devices 702 and 703 to the first and second data output units 1011 and 1012 which are external to the system as the timing reference signal. Therefore, the two kinds of video data which are input from the first and second data output units 1011 and 1012 to the source devices 702 and 703, respectively, are in the status where the frame synchronization is established. In other words, the two kinds of video data are input to the respective controllers 801b1 and 80b12 of the source devices 702 and 703 at the same timing and are output from the source devices 702 and 703 to the sink device 701 at the same timing, respectively.

Consequently, in the sink device receiving plural pieces of isochronous data, plural pieces of isochronous data having the established frame synchronization can be received as the video data from the first and second data output units 1011 and 1012. Therefore, a video data buffer for absorbing the gap of the processing timing for the corresponding frames of two kinds of video data between the sink device 701 and the video composition device 1020 is dispensed with. Further, a data delay from when the sink device 701 receives plural pieces of video data as isochronous data to when the video data are output to the video composition device can be avoided.

In the data transmission system 20 according to the second embodiment, the synchronous information is stored in the special transmission/receipt designation packet 1001*a*1 so as to be transmitted. However, in the data transmission system of the second embodiment, the synchronous information can be stored in a data packet together with asynchronous data or isochronous data so as to be transmitted.

In addition, in this second embodiment, the transmission/receipt designation packet designates the device for transmitting the immediately following data packet and the device for receiving this data packet. However, it is possible that a transmission channel and a receiving channel are previously allocated to each device, and that the transmission/receipt designation packet designates the transmission channel of the device for transmitting the data packet and the receiving channel of the device for receiving the data packet.

Further, in this second embodiment, a description is given of the data transmission system in which the sink device 701 transmits the synchronous information to the first and second source devices 702 and 703. However, in the data transmission system 20 of the second embodiment, one of the two source devices can transmit the synchronous information to the sink device and the other source device. Also, in this case, the same effects as those in the second embodiment can be obtained.

Further, in this data transmission system of the second embodiment, the synchronous information that is generated by the sink device 701 is successively transferred in a fixed direction to the sink device 701 and the first and second source devices 702 and 703 which constitute the transmission path in the form of a ring. However, the data transmission system can transmit the synchronous information from the sink device 701 directly to each of the first and second source devices 702 and 703. Also, in this case, the same effects as those in the second embodiment can be obtained.

Further, according to this second embodiment, the sink device and the source devices constituting the data transmission system perform the data transmission based on one synchronous information. However, in the data transmission system, it is possible that plural data transmission apparatus constituting the data transmission system (i.e., plural sink devices and plural source devices) are divided into plural groups and the data transmission apparatus belonging to each of the groups performs the data transmission based on different synchronous information for each group.

Further, in the data transmission system according to the second embodiment, the transmission/receipt designation packet is transmitted for each fixed time period. However, in the data transmission system of the second embodiment, the transmission/receipt designation packet can be transmitted at arbitrary time intervals.

Furthermore, in this second embodiment, the timing reference signal that is used in the data transmission system is a frame synchronous signal which indicates the head of each video frame (i.e., indicates the timing of starting the signal processing for each video frame). However, when the signal processing for each video frame is performed for each of the blocks which divide the video frame, the timing reference signal can be a signal which indicates the timing of the signal processing for each of the blocks (block synchronous signal).

Further, the timing reference signal can be a signal which indicates the timing of the signal processing for each of the left and right channels of an audio signal (channel synchronous signal). The signal processing for each of the left and right channels of the audio signal is performed for each processing unit for the audio signal (audio frame). Therefore, the signal processing for each of the left and right channels can be synchronized by the channel synchronous signal for each audio frame.

Further, in this second embodiment, the camera is connected to each of the source devices as the data output unit which is external to the system, and the video composition device is connected to the sink device as the device which is external to the system. However, the data output unit which is external to the system and connected to the source device can be a video transmission device such as video reproduction device (VTR). Alternatively, the device which is external to the system and connected to the sink device can be a monitor, a display device such as a navigation system, or a video recording device.

For example, when the data output unit which is external to the system and connected to the source device is a camera, and the device which is external to the system and connected to the sink device is a display device, a motor-vehicle-mounted navigation system with real video can be realized. In addition, when the data output unit which is external to the system and connected to the source device is a camera, and the device which is external to the system and connected to the sink device is a video composition device, a monitoring camera system or a motor-vehicle-mounted drive recorder (such as a device for recording video on the occurrence of accidents or robbery) can be realized.

In this second embodiment, specific elements constituting the transmission lines of the data transmission system are not particularly shown. However, optical fibers can be used for these transmission lines.

Further, in this second embodiment, the video data propagating on the transmission lines as the isochronous data in the data transmission system can be non-compressed data or data which are compressed by a compression method corresponding to MPEG (Moving Picture Experts Group).

Further, in the data transmission system of the second embodiment, the plural devices for performing the data transmission, i.e., the sink device 701 and the first and second source devices 702 and 703, are connected by the data transmission path in the form of a ring. However, the form of the transmission path connecting the devices of the data transmission system is not limited to the front of a ring in the second embodiment.

Figure 12:
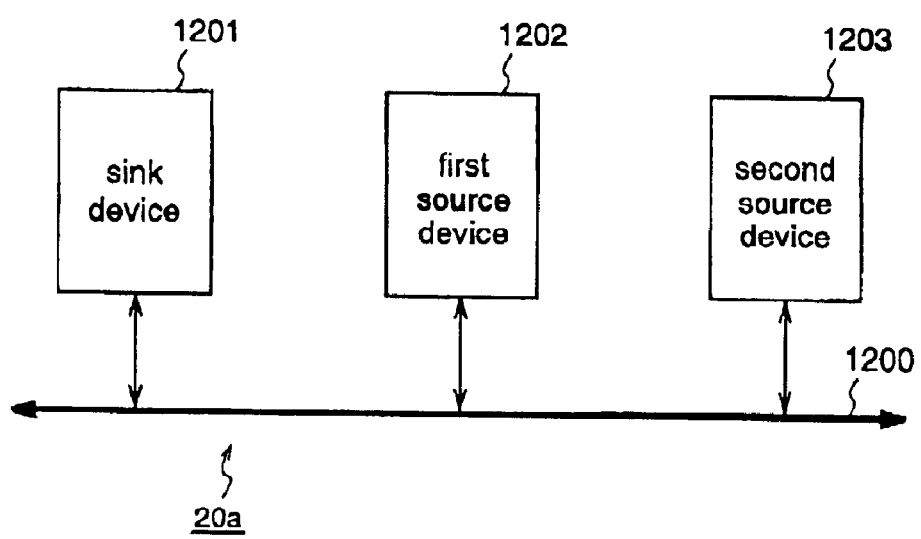
FIG. 12 is a diagram illustrating an example of the system in a case where the connection form of the devices in the data transmission system of the second embodiment is changed from a connection in the form of a ring to bus connection.

FIG. 12 is a diagram illustrating a data transmission system 20*a* in which the connection form of the devices is different from the connection form of the second embodiment.

In this data transmission system 20*a*, as shown in FIG. 12, a sink device 1201 and first and second source devices 1202 and 1203 are connected by a data bus 1200 as a transmission line. In this case, packets that are output from the devices are received by d predetermined device and thereafter disappear. Therefore, there is no need for the devices 1201 to 1203 to abandon the transmitted packets. Accordingly, the selector switches in the devices 701 to 703 in the second embodiment are eliminated.

Figure 13:
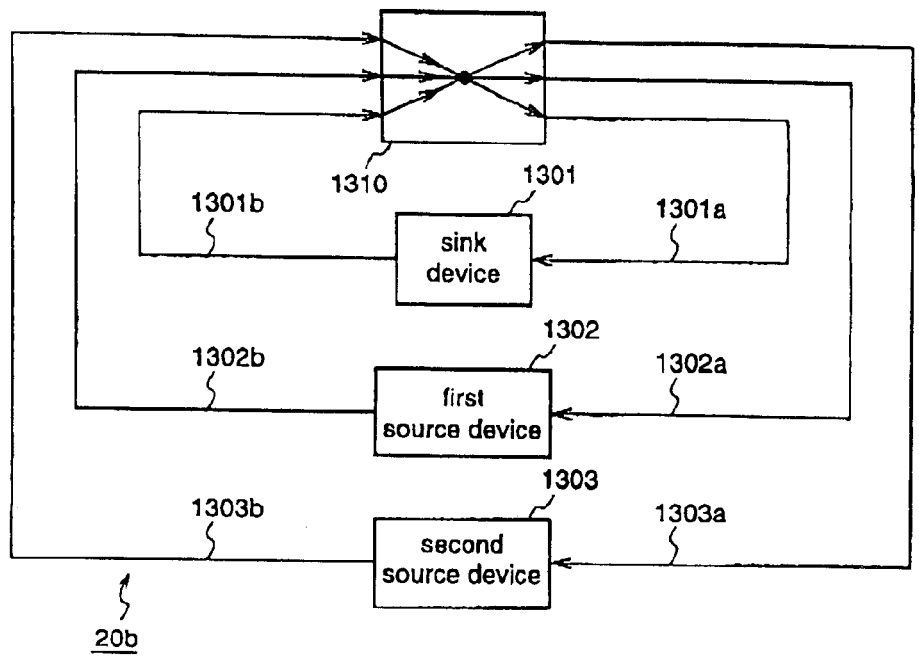
FIG. 13 is a diagram illustrating a system in which the connection form of the devices in the data transmission system of the second embodiment is replaced with a connection form in which data input side transmission lines and data output side transmission lines of the sink device and the first and second source devices are separated by using a multi-input-multi-output signal distributor and the devices are connected via buses.

FIG. 13 is a diagram illustrating another example of the data transmission system 20b in which the connection form of the devices is different from the connection form of the second embodiment.

In this data transmission system 20b, as shown in FIG. 13, data input side transmission lines and data output side transmission lines of a sink device 1301 and first and second source devices 1302 and 1303 are separated by using a multi-input-multi-output signal distributor 1310, and the respective devices are connected by buses.

In this data transmission system 20b, transmission data which are output from the sink device 1301 and the first and second source devices 1302 and 1303 are transmitted to the signal distributor 1310 via transmission lines 1301b, 1302b and 1303b, respectively. The transmission data which are input to the signal distributor 1310 are simultaneously output to the sink device 1301 and the first and second source devices 1302 and 1303 via the transmission lines 1301a, 1302a and 1303a, respectively.

In this case, the sink device 1301 and the first and second source devices 1302 and 1303 have the same structures as those of the sink device 701 and the first and second source devices 702 and 703 of the second embodiment. In addition, optical fibers are used as the transmission lines 1301a to 1303a and 1301b to 1303b, for example. As the signal distributor 1310, the multi-input-multi-output star coupler is used, for example.

In this data transmission system 20b, unlike the data transmission system 20 of the second embodiment, even when part of the transmission lines (for example, the transmission line 1301a) is broken, data transmission from the sink device 1301 to the first and second devices 1302 and 1303 is possible.

Figure 14:
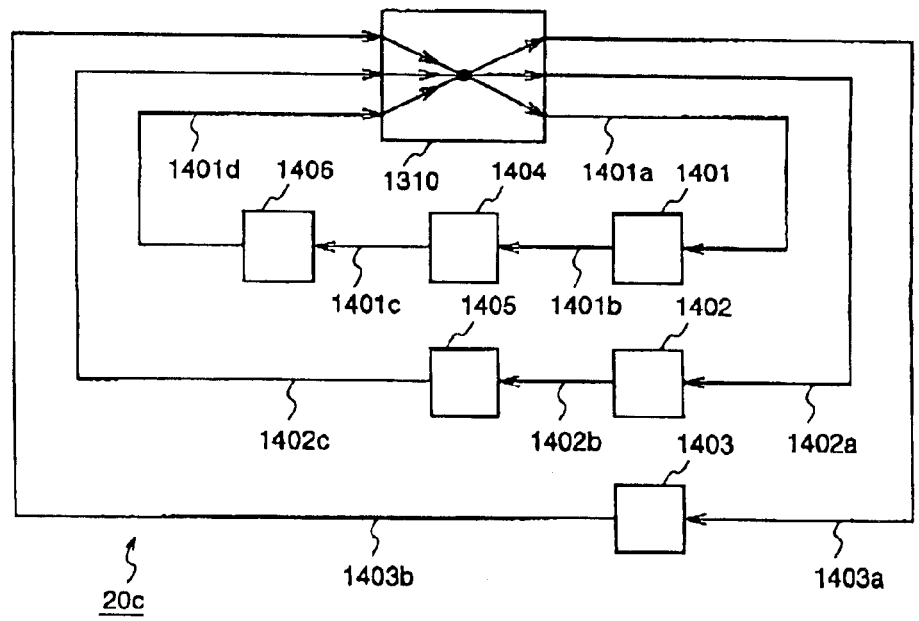
FIG. 14 is a diagram illustrating a system in which the connection form of the devices in the data transmission system of the second embodiment is replaced with a connection form in which data input side transmission lines and data output side transmission lines of first, second and third groups of data transmission apparatus are separated by using a multi-input-multi-output signal distributor and the groups are connected via buses.

FIG. 14 is a diagram illustrating another example of the data transmission system 20c having a connection form of the devices which is different from the connection form in the second embodiment.

In this data transmission system 20c, as shown in FIG. 14, data input side transmission lines and data output side transmission lines of first, second and third groups of data transmission apparatus are separated by using the multi-input-multi-output signal distributor 1310, and the respective groups are connected via buses.

In this case, the first group of data transmission apparatus includes a sink device 1401, a first source device 1404, and a second source device 1406. In this data transmission apparatus group, transmission data which are input from the distributor 1310 to the sink device 1401 via the transmission line 1401a are output to the first source device 1404 via the transmission line 1401b. Transmission data from the first source device 1404 are transmitted to the second source device 1406 via the transmission line 1401c. Transmission data output from the second source device 1406 are transmitted to the distributor 1310 via the transmission line 1401d.

In addition, the second group of data transmission apparatus includes a third source device 1402 and a fourth source device 1405. In this data transmission apparatus group, transmission data which are input from the distributor 1310 to the third source device 1402 via the transmission line 1402a are output to the fourth source device 1405 via the transmission line 1402b. Transmission data which are output from the fourth source device 1405 are transmitted to the distributor 1310 via the transmission line 1402c.

The third group of data transmission apparatus includes a fifth source device 1403. In this data transmission apparatus group, transmission data which are input from the distributor 1310 to the fifth source device 1403 via the transmission line 1403a are transmitted to the distributor 1310 via the transmission line 1403b.

In this case, the sink device 1401 has the same structure as the sink device 701 of the second embodiment. The source devices 1402 to 1405 have the same structure as the first and second source device 702 or 703 of the second embodiment. Further, the optical fibers are used as the transmission lines 1401a to 1401d, 1402a to 1402c, and 1403a and 1403b, and the multi-input-multi-output optical star coupler is used as the signal distributor 1310.

This data transmission system 20c has one sink device 1401 and the five source devices 1402 to 1406. However, in the data transmission system as shown in FIG. 14, one of the source devices 1402 to 1406 can be replaced with a sink device. Further, the number of sink devices and the number of source devices are not limited to fixed numbers as long as the data transmission system includes at least one sink device and two source devices.

Third Embodiment

Figure 15:
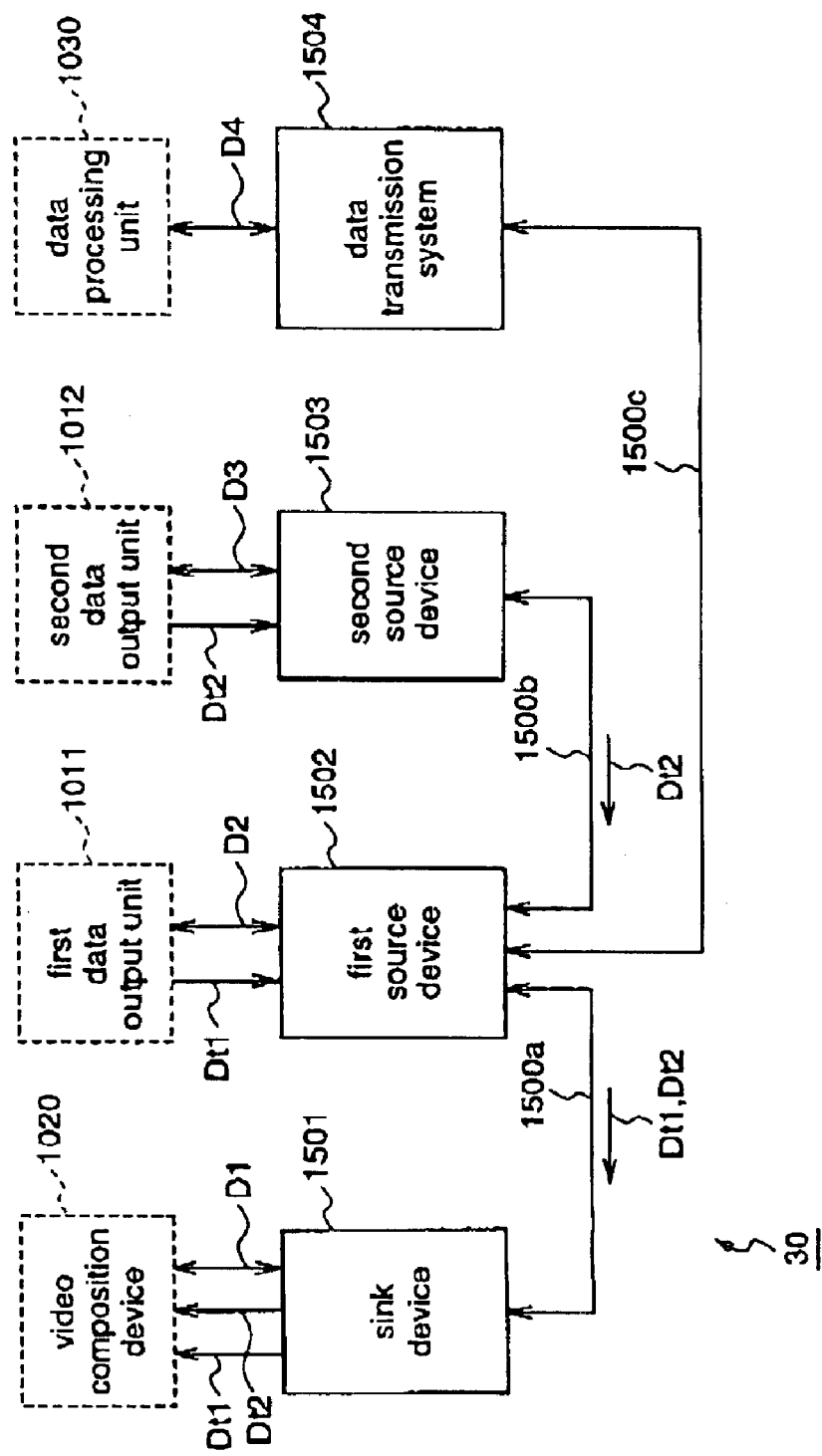
FIG. 15 is a diagram illustrating a data transmission system of a third embodiment of the present invention.

FIG. 15 is a diagram illustrating a data transmission system 30 according to the third embodiment of the present invention.

The data transmission system 30 of the third embodiment comprises a first source device 1502 for receiving a data having high real-time characteristics like audio data or video data from a first data output unit 1011 such as a camera which is external to the system, and transmitting the data as an isochronous data Dt1. The data transmission system 30 also comprises a second source device 1503 for receiving a data having high real-time characteristics like audio data or video data from a second data output unit 1012 such as a camera which is external to the system, and transmitting the data as an isochronous data Dt2.

This data transmission system 30 has a sink device 1501 for receiving the isochronous data Dt1 and Dt2 which are transmitted from the first and second source devices 1502 and 1502, respectively, and outputting the synchronous data Dt1 and Dt2 to a video composition device 1020 which is external to the system. Further, the data transmission system 30 also includes a data transmission apparatus 1504 for receiving data from a data processing unit 1030 which is external to the system, and transmitting the data. In this case, the data processing unit 1030 is a device for outputting video data, such as a camera and a video reproduction device (VTR), or a device for receiving the video data, such as a video composition device and a video display device In addition, the data transmission apparatus 1504 is a source device for transmitting video data which are externally input from outside of the system, or a sink device for receiving video data from a transmission line in the system and outputting the video data to the outside of the system.

The data transmission system 30 of the third embodiment has a first transmission line 1500a for transmitting data between the sink device 1501 and the first source device 1502, a second transmission line 1500b for transmitting data between the first source device 1502 and the second source device 1503, and a third transmission line 1500c for transmitting data between the first source device 1502 and the data transmission apparatus 1504.

In this data transmission system 30, the sink device 1501, the first and second source devices 1502 and 1503, the data transmission apparatus 1504, and the first to third transmission lines 1500a to 1500c constitutes one data transmission path in the form of a tree.

According to the third embodiment, identification ID (ID:#1), identification ID (ID:#2), identification ID (ID:#3), and identification ID (ID:#4) are set in the devices 1501 to 1504, respectively, as identification TDs for identifying these devices.

Figure 16:
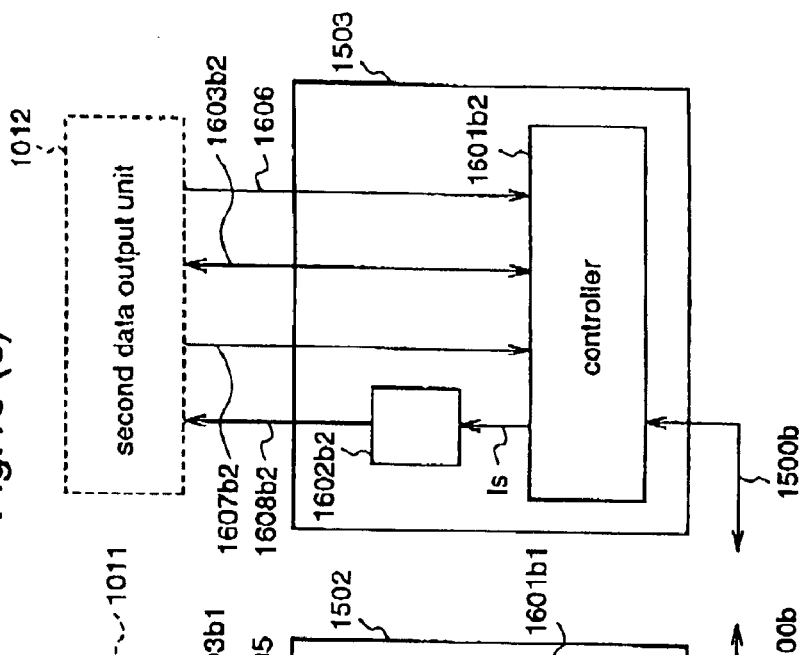
FIG. 16(a) is a diagram illustrating a sink device of the data transmission system according to the third embodiment.
FIG. 16(b) is a diagram illustrating a first source device of the data transmission system.
FIG. 16(c) is a diagram illustrating a second source device of the data transmission system.

FIG. 16(*a*) is a diagram illustrating a specific structure of the sink device 1501.

The sink device 1501 comprises a controller 1601*a* for performing a processing of receiving transmission data Td from the transmission line 1500*a*, a processing of transmitting transmission data Td to the transmission line 1500*a*, a processing of controlling the video composition device 1020 which is external to the system, and an arbitration processing for data transmission. The sink device 1501 also comprises a reference signal generator 1602*a* for generating a reference signal 1608*a* based on synchronous information Is that is included in the received transmission data Td.

Here, the reference signal 1608*a* is a frame synchronous signal for determining the timing of composing the isochronous data for each frame in the video composition device 1020. The receiving processing of the controller 1601*a* is a processing of receiving the transmission data Td from the transmission line 1500*a* and outputting an isochronous data 1604*a*1 and 1604*a*2 that are included in the transmission data Td to the video composition device 1020 which is external to the system. The transmission processing of the controller 1601*a* is a processing of transmitting synchronous information 1607*a* from the video composition device 1020 to the transmission line 1500*a* as a part of the transmission data Td. This synchronous information 1607*a* is a frame synchronous signal for indicating the timing of composing plural pieces of isochronous data for each frame in the video composition device 1020. Further, the control processing of the controller 1601*a* is a processing of transmitting/receiving an asynchronous data 1603*a* such as commands for controlling the video composition device 1020 to/from the video composition device 1020. The arbitration processing of the controller 1601*a* is a processing of determining to which device from among the data transmission apparatus that are connected via the transmission lines 1500*a* to 1500*c*, i.e., the sink device 1501, the first and second source devices 1502 and 1503, and the data transmission apparatus 1504, the right for data transmission is given.

In this data transmission system 30 of the third embodiment, the sink device 1501 outputs the synchronous information of the data transmission system 30. Therefore, a synchronous information output processing in the controller 1601*a* of the sink device 1501 of outputting the synchronous information Is that is included in the received transmission data Td to the reference signal generator 1602*a* and an operation in the reference signal generator 1602*a* for generating the reference signal 1608*a* based on the synchronous information Is are not performed. However, when the source device other than the sink device 1501 in the data transmission system 30 generates the synchronous information of the data transmission system 30, the synchronous information output processing in the controller 1601*a* and the operation in the reference signal generator 1602*a* for generating the reference signal 1608*a* are performed.

FIG. 16(*b*) is a diagram illustrating a specific structure of the first source device 1502.

The first source device 1502 comprises a controller 1601*b*1 for performing a processing of receiving transmission data Td from the transmission lines 1500*a* to 1500*c*, a processing of transmitting the transmission data to the transmission lines 1500*a* to 1500*c*, a processing of controlling a first data output unit (camera) 1011 which is external to the system, and an arbitration processing for the data transmission. The first source device 1502 also comprises a reference signal generator 1602*b*1 for generating a reference signal 1608*b*1 based on synchronous information Is that is included in the received transmission data Td.

Here, the reference signal 1608*b*1 is a frame synchronous signal for determining the timing of outputting video data of each frame in the first data output unit 1011. The receiving processing of the controller 1601*b*1 includes an output processing of receiving transmission data Td from the transmission line 1500*a* and outputting the synchronous information Is that is included in the transmission data Td to the reference signal generator 1602*b*1. Further, the transmission processing of the controller 1601*b* includes a processing of transmitting a video data 1605 from the first data output unit 1011 to the transmission line 1500*b* as a part of the transmission data Td (isochronous data), and a processing of transferring a transmission data from the first source device 1501 to the second source device 1503 via the transmission line 1500*b*. The control processing of the controller 1601*b*1 is a processing of transmitting/receiving an asynchronous data 1603*b*1 such as commands for controlling the first data output unit 1011 to/from the first data output unit 0111.

In this data transmission system 30 of the third embodiment, the sink device 1501 generates the synchronous information of the data transmission system 30. However, when the first source device 1502 outputs the synchronous information of the data transmission system 30, a processing of transmitting synchronous information 1607*b*1, which indicates the operational timing from the first data output unit 1011 at least to the transmission lines 1500*a* and 1500*b*, as a part of the transmission data Td is also performed by the controller 1601*b*1 as the transmission processing in addition to the isochronous data transmission processing Specifically, the synchronous information 1607*b*1 indicating the operational timing indicates the timing of outputting video data of each frame to the first source device 1502 by the first data output unit 1011.

FIG. 16(*c*) is a diagram illustrating a specific structure of the second source device 1503.

The source device 1503 comprises a controller 1601*b*2 for performing a processing of receiving transmission data Td from the transmission line 1500*b*, a processing of transmitting the transmission data Td to the transmission line 1500*b*, a processing of controlling the second data output unit (camera) 1012 which is external to the system, and an arbitration processing for the data transmission. The second source device 1503 also comprises a reference signal generator 1602*b*2 for generating a reference signal 1608*b*2 based on synchronous information Is that is included in the received transmission data Td.

Here, the reference signal 1608*b*2 is a frame synchronous signal for determining the timing of outputting video data of each frame in the second data output unit 1012. The receiving processing of the controller 1601*b*2 is a processing of receiving the transmission data from the transmission line 1500*b* and outputting the synchronous information Is that is included in the transmission data to the reference signal generator 1602*b*2. In addition, the transmission processing of the controller 1601*b*2 is a processing of transmitting a video data 1606 that is output from the second data output unit 1012 to the transmission line 1500*b* as a part of the transmission data Td (isochronous data). The control processing of the controller 1601*b*2 is a processing of transmitting/receiving an asynchronous data 1603*b*2 such as commands for controlling the second data output unit 1012 to/from the second data output unit 1012.

Figure 17:
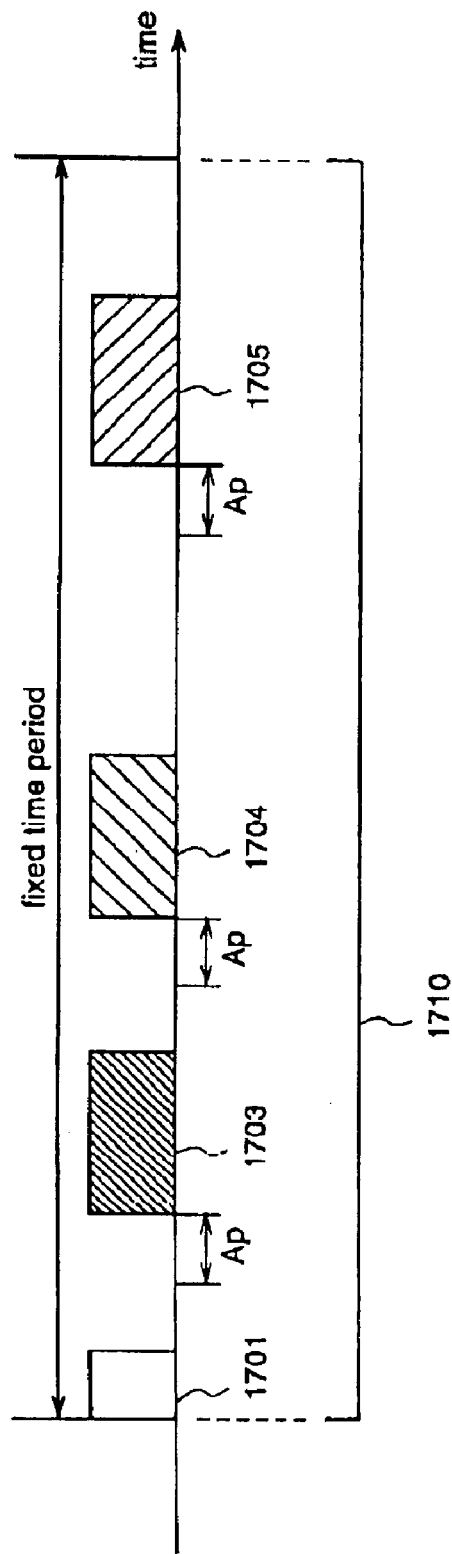
FIG. 17 is a diagram illustrating a data structure of transmission data which propagate on a transmission line of the data transmission system (transmission frame format) according to the third embodiment.

FIG. 17 is a diagram illustrating a data structure of transmission data which are transmitted to the transmission lines 1500a to 1500c (transmission frame format).

In the transmission frame 1710, as a repetitive unit of the data transmission, various packets 1703 to 1705 are transmitted subsequent to a cycle start packet 1701 which indicates the head of the transmission frame 1710.

Here, the cycle start packet 1701 is transmitted by one of the devices 1501 to 1504 for each fixed time period. In this data transmission system 30, the cycle start packet 1701 is transmitted from the sink device 1501 each fixed time period. The packets 1703 and 1704 are packets which are transmitted from the first and second source devices 1502 and 1503, respectively, and contain the isochronous data (isochronous data packet) The packet 1705 is a packet which is transmitted from the sink device 1501 and contains asynchronous data (asynchronous data packet).

Immediately before the transmission of each data packet, there is an arbitration period Ap which is required in the arbitration processing for the data transmission. During this period, the arbitration processing is performed for determining to which device from among the plural devices which retain data to be transmitted is given the right to transmit data. Therefore, the transmission of the data packets from any of the devices is not performed during this arbitration period Ap. After the arbitration period Ap has elapsed, the data packet transmission from the device which has acquired the data transmission right in the arbitration processing is performed.

In this data transmission system 30 of the third embodiment, the processing of transmitting the various packets 1703 to 1705 that are subsequent to the cycle start packet 1701 is repeatedly performed for each transmission frame 1710.

The operation of the data transmission system 30 will now be described.

Hereinafter, as the data transmission operation of the data transmission system 30 according to the third embodiment, a description is given of an operation for transmitting video data from the first and second data output units (cameras) 1011 and 1012 and in turn the corresponding two source devices 1502 and 1503 to the one sink device 1501, and outputting two kinds of video data that are received by the sink device 1501 to the video composition device 1020 which is external to the system for composing these video data to be displayed.

FIG. 18(a) shows a data structure of data which propagate on a transmission line in the data transmission system 30 of the third embodiment. FIGS. 18(b) and 18(c) show how the reference signals are generated in the first and second source devices 1502 and 1503 of the system. To be specific, when a predetermined asynchronous data packet 1705a which is output from the sink device 1501 is received by the first source device 1502 via the transmission line 1500a, a timing reference signal 1608b1 (FIG. 18(b)) is generated in the first source device 1502. In addition, when the predetermined asynchronous data packet 1705a is received by the second source device 1503 via the transmission line 1500a, the first source device 1502 and the transmission line 1500b, a timing reference signal 1608b2 (FIG. 18(c)) is generated in the first source device 1502.

The operation of the data transmission system 30 will now be described.

Initially, the synchronous information 1607a is input to the sink device 1501 from the video composition device 1020 which is external to the system. This synchronous information 1607a represents a timing signal as the reference of processing of composing two kinds of video data, i.e., the video data that are output from the first and second data output units 1011 and 1012, by the video composition device 1020. For example, a frame synchronous signal which indicates the head of a video frame is employed as the synchronous information 1607a.

The synchronous information is not limited to the frame synchronous signal. As long as the synchronous information can reproduce the frame synchronous signal, any information can be used. For example, the synchronous information can include the frequency information which indicates the frequency of the frame synchronous signal and the phase information which indicates the phase of the frame synchronous signal. Here, the frequency information is information which indicates that the frame synchronous signal is obtained by X-dividing (where X is a positive integer) the operational clock of the system, or information which indicates the cycle of the frame synchronous signal, in addition, the phase information is information which indicates the timing of the rising edge or falling edge of the frame synchronous signal, or temporal information which indicates the phase with respect to the rising edge or falling edge or the like.

When the synchronous information 1607a that is output from the video composition device 1020 which is external to the system is input to the sink device 1501, the processing of storing the synchronous information 1607a in an asynchronous data packet as an asynchronous data and the arbitration processing are performed in the controller 1601a of the sink device 1501. When the data transmission right is obtained in the arbitration processing, the processing of transmitting the asynchronous data packet 1705a which contains the asynchronous data to the first and second source devices 1502 and 1503 is performed. In the asynchronous data packet 1705a, control data for controlling the data transmission between the devices or status data indicating the status of the devices are also included in addition to the synchronous information 1607a. Therefore, the control data or status data are transmitted or received as the asynchronous data together with the synchronous information.

In the controller 1601a, the control data or status data in the asynchronous data are distinguished from the synchronous information which is stored in the same asynchronous data packet. The control data or status data are accessed as an asynchronous data 1603a between the controller 1601a and the video composition device 1020 which is external to the system.

In the first source device 1502, when the asynchronous data packet 1705a that is transmitted from the sink device 1501 is received via the transmission line 1500a, the processing of outputting the synchronous information that is included in the received packet 1705a to the reference signal generator 1602b1 is performed in the controller 1601b1 of the first source device 1502. Then, in the reference signal generator 1602b1, a frame synchronous signal, as the timing reference signal 1608b1 (FIG. 18(b)) in processing video data, is reproduced based on the synchronous information that is from the controller 1601b1.

Figure 19:
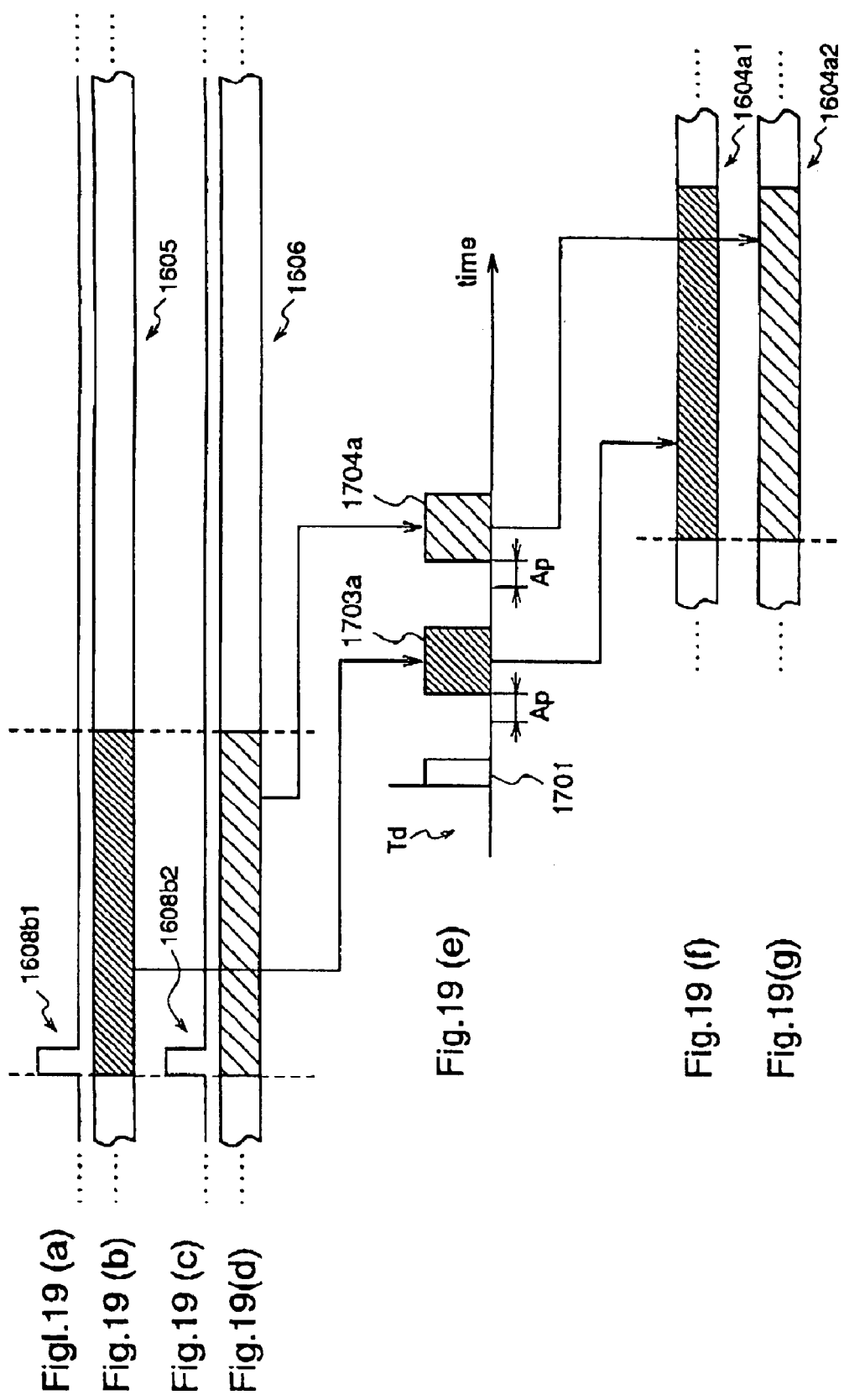

Then, the timing reference signal 1608b1 (FIG. 19(a)) which is generated by the reference signal generator 1602b1 of the first source device 1502 is output to the first data output unit 1011 which is external to the system. Then, the image-taking processing is performed by the first data output unit (camera) 1011 in synchronization with the timing reference signal 1608b1 that is output from the first source device 1502, and the video data 1605 which is obtained in the image-taking processing is output to the source device 1502 (FIG. 19(b)).

Then, in the controller 1601b1 of the first source device 1502, the video data 1605 that is output from the data output unit 1011 is retained. Thereafter, in the controller 1601b1, the video data 1605 is stored in an isochronous data packet 1703a as the isochronous data. When the data transmission right is obtained in the arbitration processing, a processing of transmitting the isochronous data packet 1703a which contains the video data 1605 to the transmission line 1500a, as shown in FIG. 19(e), is performed. In addition, in the controller 1601b1, the processing of transmitting the asynchronous data packet 1705a to the second source device 1503 via the transmission line 1500b is performed.

When the asynchronous data packet 1705a which is transmitted from the sink device 1501 is received by the second source device 1503 via the transmission line 1500b, the processing of outputting the synchronous information that is included in the received packet 1705a to the reference signal generator 1602b2 of the second source device 1503 is performed in the controller 1601b2. Then, the frame synchronous signal, as the timing reference signal 1608b2 (FIG. 118(c)) in processing the video data, is reproduced by the reference signal generator 1602b2 based on the synchronous information Is that is output from the controller 1601b2 of the second source device 1503.

Then, the timing reference signal 1608b2 (FIG. 19(c)) which is generated by the reference signal generator 1602b2 of the second source device 1503 is output to the second data output unit 1012 which external to the system. Then, in the second data output unit (camera) 1012, the image-taking processing is performed in synchronization with the timing reference signal 1608b2 that is output from the source device 1503, and the video data 1606 which is obtained in the image-taking processing is output to the second source device 1503 (FIG. 19(d)).

Then, the video data 1606 that is output from the second data output unit 1012 is retained by the controller 1601b2 of the second source device 1503. Thereafter, in the controller 1601b2 of the second source device 1503, the video data 1606 is stored in an isochronous data packet 1704a as the isochronous data. When the data transmission right is obtained in the arbitration processing, the processing of transmitting the isochronous data packet 1704a which contains the video data 1606 to the transmission line 1500b, as shown in FIG. 19(e), is performed. This isochronous data packet 1704a is transmitted to the sink device 1501 via the transmission line 1500b, the first source device 1502, and the transmission line 1500a.

When the isochronous data packets 1703a and 1704a are received by the sink device 1501, the processing of outputting the isochronous data 1604a1 and 1604a2 (FIGS. 19(f) and 19(g)) that are included in the received data packets 1703a and 1704a as the video data 1605 and 1606 which are outputted from the first and second source devices 1502 and 1503 to the video composition device 1020 is performed in the controller 1601a of the sink device 1501.

These two kinds of video data are input from the first and second data output units 1011 and 1012 to the first and second source devices 1502 and 1503 in the status where their frame synchronization is established. Therefore, when the video data are output from the sink device 1501 to the video composition device 1020, the frame synchronization of the two kinds of video data is established.

As described above, the data transmission system 30 according to the third embodiment has the sink device 1501 for receiving the video data (isochronous data), and the first and second source devices 1502 and 1503 for transmitting the video data. In this data transmission system 30, only the device which obtains the data transmission right in the arbitration performs the data transmission with packets. The sink device 1501 stores the synchronous information as the processing reference for the received isochronous data in the asynchronous data packet, and transmits the asynchronous data packet. The first and second source devices 1502 and 1502 transmit the isochronous data in synchronization with the synchronous information that is included in the asynchronous data packet that is output from the sink device 1501. Therefore, on the side of the sink device 1501 which receives plural pieces of isochronous data, the plural pieces of isochronous data whose processing timings for respective frames are synchronized can be obtained. Accordingly, the buffer for absorbing the timing gap can be dispensed with.

In this data transmission system 30 according to the third embodiment, the synchronous information is stored in the asynchronous data packet and transmitted. However, in the data transmission system of the third embodiment, the synchronous information can be stored in the isochronous data packet and transmitted.

Further, in the data transmission system of the third embodiment, the sink device 1501 transmits the synchronous information to the first and second source devices 1502 and 1503. However, in the data transmission system of the third embodiment, one of the source devices can transmit the synchronous information to the sink device and to other source devices.

Further, in the data transmission system of the third embodiment, the synchronous information that is output from the sink device 1501 is transmitted to the second source device 1503 via the first source device 1502. However, in the data transmission system of the third embodiment, one of plural devices constituting the system can transmit the synchronous information directly to other devices. Also, in this case, the timing reference signal having the same frequency and the same timing can be generated by each of the devices based on the synchronous information.

Further, in the data transmission system of the third embodiment, the sink device and the source devices constituting the data transmission system perform the data transmission based on one synchronous information. However, in this data transmission systems of the third embodiment, it is possible that plural data transmission apparatus (i.e., plural sink devices and plural source devices) constituting the system are divided into plural groups and that the data transmission apparatus included in each of the groups performs the data transmission based on different synchronous information for each group.

Further, in this third embodiment, the timing reference signal which is used in the data transmission system is a frame synchronous signal which indicates the head of each video frame (i.e., indicates the timing of starting the signal processing for each video frame). However, when the signal processing for each video data is performed for each of the blocks which divide the video frame, the timing reference signal can be a signal which indicates the timing of the signal processing for each of the blocks (block synchronous signal).

Further, the timing reference signal can be a signal which indicates the timing of signal processing for each of the left and right channels of an audio signal (channel synchronous signal).

Further, in this third embodiment, the camera is connected to each of the source devices as the data output unit which is external to the system, and the video composition device is connected to the sink device as the device which is external to the system. However, the data output unit which is external to the system and connected to the source device can be a video transmission device such as a VTR. The device which is external to the system and connected to the sink device can be a monitor, a display device of a navigation system or the like, or a video recording device.

Further, in this third embodiment, the specific structures of the transmission lines constituting the data transmission system are not shown. However, optical fibers can be used for the transmission lines.

Fourth Embodiment

Figure 20:
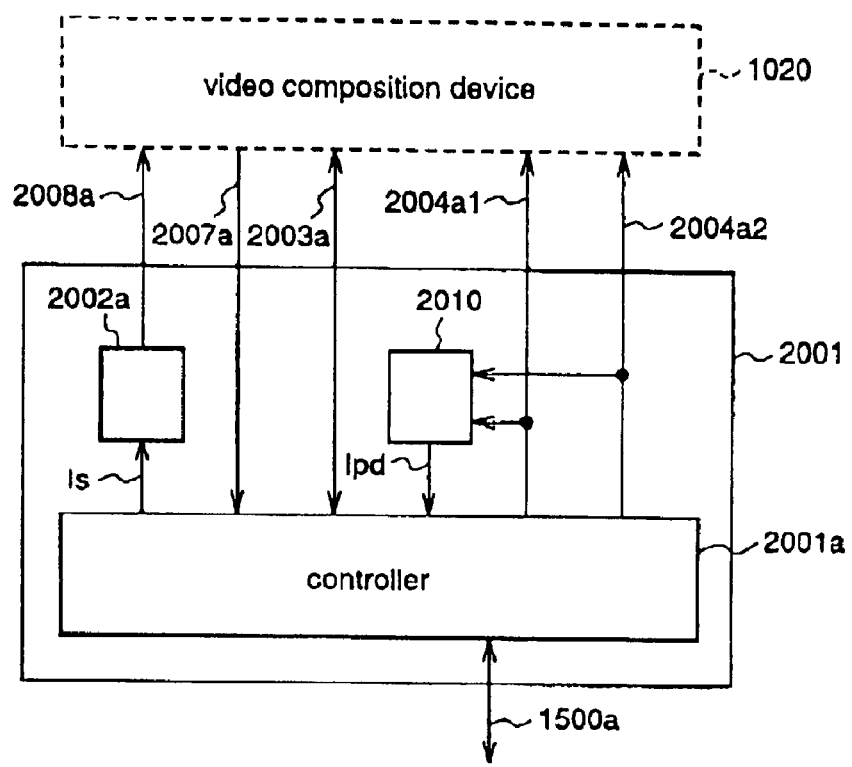
FIG. 20 is a diagram illustrating a sink device in a data transmission system of a fourth embodiment of the present invention.

FIG. 20 is a diagram for explaining a data transmission system according to the fourth embodiment of the present invention, and shows a structure of a sink device of the data transmission system of the fourth embodiment.

The data transmission system of the fourth embodiment comprises a sink device 2001 for performing the processing of the sink device 1501 as well as a processing of detecting a phase difference between the isochronous data 1605 and 1606 from the first and second source devices 1502 and 1503 in place of the sink device 1501 in the data transmission system 30 of the third embodiment.

The sink device 2001 comprises a controller 2001a for performing a processing of receiving a transmission data Td from the transmission line 1500a, a processing of transmitting the transmission data Td to the transmission line 1500a, a processing of controlling the video composition device 1020 which is external to the system, and an arbitration processing for the data transmission. The sink device 2001 also comprises a reference signal generator 2002a for generating a reference signal 2008a based on the synchronous information Is that is included in the received transmission data Td, and a phase detector 2010 for detecting a phase difference (phase shift) between the isochronous data 1605 and 1606 that are outputted from the source devices 1502 and 1503, which isochronous data 1605 and 1606 are output from the controller 2001a as video data 2004a1 and 2004a2, and outputting phase difference information Ipd.

Here, the reference signal 2008a is a frame synchronous signal for determining the timing of composing isochronous data for each frame by the video composition device 1020. The receiving processing of the controller 2001a is a processing of receiving transmission data from the transmission line 1500a, and outputting the isochronous data 1605 and 1606 that are included in the data to the video composition device 1020 which is external to the system as the video data 2004a1 and 2004a2.

In addition, the transmission processing of the controller 2001a includes a processing of storing synchronous information 2007a that is output from the video composition device 1020 in an asynchronous data packet and transmitting the asynchronous data packet to the transmission line 1500a, and a processing of storing the phase difference information 1pd that is output from the phase detector 2010 in an isochronous data packet or asynchronous data packet and transmitting the data packet to the transmission line 1500a. This synchronous information 2007a is a frame synchronous signal for determining the timing of composing plural pieces of isochronous data for each frame by the video composition device 1020. Further, the control processing of the controller 2001a is a processing of transmitting/receiving an asynchronous data 2003a such as commands for controlling the video composition device 1020 to/from the video composition device 1020. The arbitration processing of the controller 2001a is a processing of acquiring the right to transmit data from among the data transmission apparatus which are connected via the transmission lines 1500a to 1500c, i.e., the sink device 2001, the first and second source devices 1502 and 1503 and the data transmission apparatus 1504.

In addition, in the first and second source devices 1502 and 1503 of the data transmission system according to the fourth embodiment, the processing of shifting the timing reference signal based on the phase difference information 1pd so as to not have a phase difference Pd between the two kinds of video data 2004a1 and 2004a1, which are output from the sink device 2001 to the video composition device 1020, is performed.

In the data transmission system of the fourth embodiment, the sink device 2001 outputs the synchronous information of the data transmission system Therefore, the synchronous information output processing in the controller 2001a of the sink device 2001 for outputting the synchronous information Is that is included in the received transmission data Td to the reference signal generator 2002a, and the operation of the reference signal generator 2002a for generating the reference signal 2008a based on the synchronous information Is are not performed. However, when the source device other than the sink device 2001 of the data transmission system generates the synchronous information of the data transmission system, the synchronous information output processing in the controller 2001a and the operation in the reference signal generator 2002a for generating the reference signal 2008a are performed.

The remaining construction of the data transmission system according to the fourth embodiment is the same as that of the data transmission system 30 of the third embodiment.

FIGS. 21(a) to 21(f) are diagrams illustrating input/output signals to/from the sink device and the source device in the data transmission system of the fourth embodiment.

Figure 21:
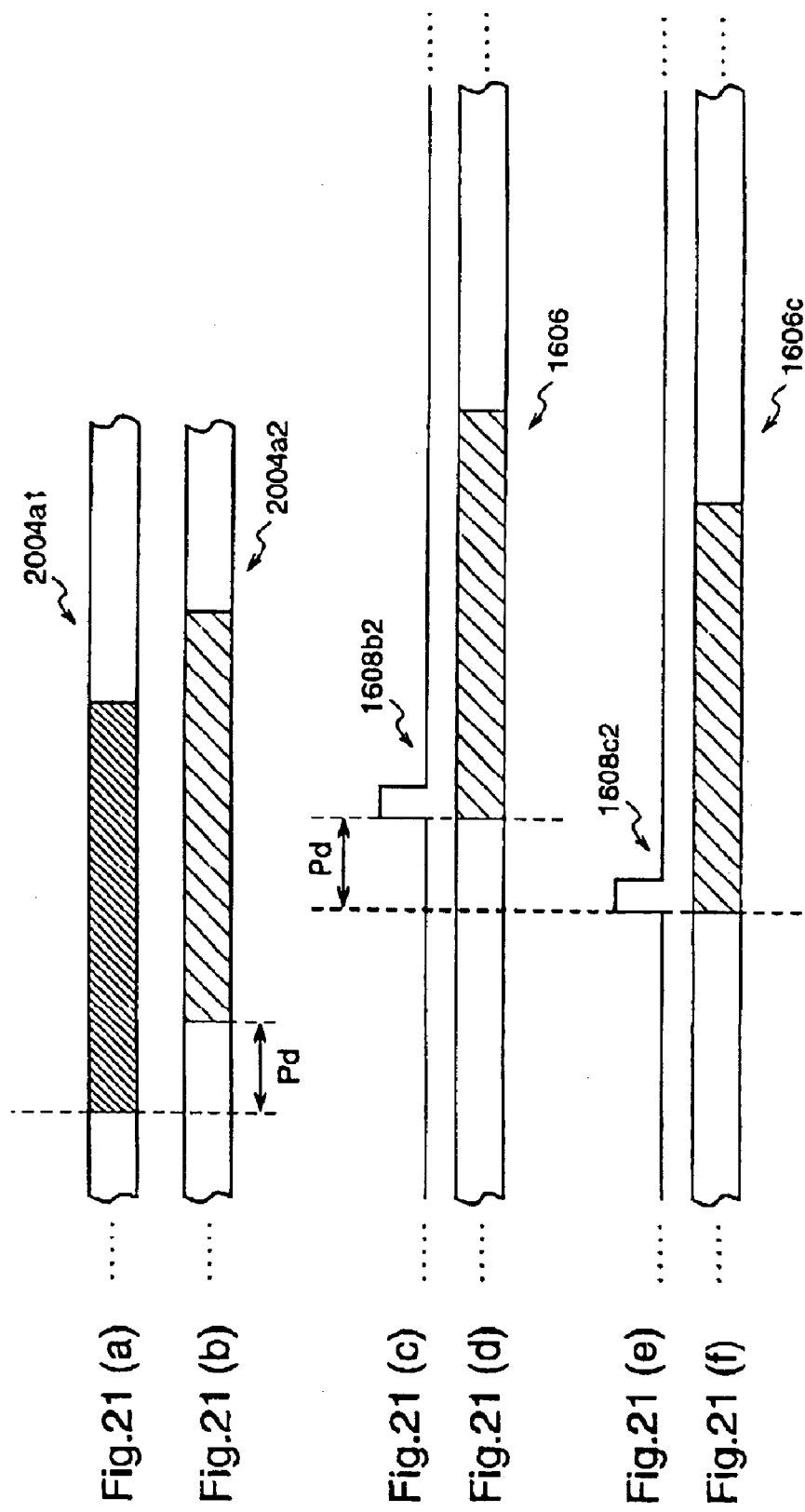
FIGS. 21(a) to 21(f) are diagrams illustrating input/output signals from/to devices of the data transmission system of the fourth embodiment.

The data 2004a1 as shown in FIG. 21(a) is a video data which is output from the sink device 2001 to the video composition device 1020, and the video data 1605 which is supplied from the first data output unit 1011 to the first source device 1502. The data 2004a2 as shown in FIG. 21(b) is a video data which is output from the sink device 001 to the video composition device 1020, and the video data 1606 which is supplied from the second data output unit 1012 to the second source device 1503. Here, the video data 2004a1 has a phase difference Pd with respect to the video data 2004a2.

In addition, the data 1606 as shown in FIG. 21(d) is a video data which is input from the second data output unit 1012 to the second source device 1503 in synchronization with the frame synchronous signal 1608b2 as shown in FIG. 21(c).

A data 1606c as shown in FIG. 21(f) is a video data which is input from the second data output unit 1012 to the second source device 1503 in synchronization with the frame synchronous signal 1608c2 as shown in FIG. 21(e).

Here, the frame synchronous signal 1608c2 as shown in FIG. 21(e) is obtained by advancing the phase of the frame synchronous signal 1608b2 as shown in FIG. 21(c) by the phase amount corresponding to the phase difference Pd.

The operation of the data transmission system of the fourth embodiment will now be described.

In the data transmission system of the fourth embodiment, when no phase shift occurs between the two kinds of video data 2004a1 and 2004a2 which are output from the controller 2001a of the sink device 2001 to the video composition device 1020, the same data transmission processing as those in the third embodiment is performed.

When the phase shift occurs between the two kinds of video data 2004a1 and 2004a2, information Ipd, which indicates the phase difference that is detected by the phase detector 2010 of the sink device 2001, is transmitted from the sink device 2001 to the source devices 1502 and 1503. Then, in a predetermined source device, the processing of shifting the timing reference signal is performed so as to have no phase difference Pd between the two kinds of video data 2004a1 and 2004a2 which are output from the sink device 2001 to the video composition device 1020.

To be specific, in the controller 2001a of the sink device 2001, when the first and second isochronous data 1605 and 1606 from the transmission line 1500a are received, the processing of outputting the first and second isochronous data 1605 and 1606 to the video composition device 1020, as the video data 2004a1 and 2004a2, is performed. At this time, in the phase detector 2002a, the phase shift between the video data 2004a1 and 2004a2 which are output to the video composition device 1020 is detected, and the information which indicates the detected phase difference Pd (phase difference information) Ipd is output to the controller 2001a.

Then, in the controller 2001a, the processing of storing the phase difference information Ipd that is input from the phase detector 2010 in an isochronous data packet or asynchronous data packet and transmitting the data packet to the source device via the transmission line 1500a is performed.

When the isochronous data packet or asynchronous data packet which contains the phase difference information Ipd that is output from the sink device 2001 is received by the source devices 1502 and 1503, the processing of controlling the respective reference signal generators 1602b1 and 1602b2 so that a timing reference signal which is generated by the reference signal generator 1602b1 or 1602b2 based on the synchronous information is shifted by a phase amount corresponding to the phase difference Pd between the video data 2004a1 and 2004a2 is performed in the respective controllers 1601b1 and 1601b2 of the first and second source devices 1502 and 1503 in accordance with the phase difference information Ipd. The phase difference Pd between these video data can be eliminated only when the phase of the video data 2004a1 or 2004a2 is advanced or delayed. Therefore, the processing of shifting the timing reference signal is performed normally in one of the source devices 1502 and 1503.

A simple description will now be given of a case where the processing of shifting the timing reference signal is performed by the second source device 1503.

In the reference signal generator 1602b2 of the second source device 1503, the signal generation processing of generating the timing reference signal 1608b2 (FIG. 21(c)) based on the synchronous information Is that is output from the controller 1601b2 is performed as well as the phase adjustment processing of advancing the phase of the timing reference signal 1608b2 based on the phase difference information Ipd that is output from the controller 1601b2 by a phase amount corresponding to the phase difference Pd that is indicated by the phase difference information Ipd are performed. Consequently, the timing reference signal 1606c (FIG. 21(f)) whose phase is advanced by the phase amount Pd with respect to the timing reference signal 1608b2 (FIG. 21(c)) is output from the reference signal generator 1602b2 to the second data output unit 1012. Thereby, the video data 1606c in accordance with the timing reference signal 1608c2 is output from the second data output unit 1012 at a timing which is previous (earlier) by a period corresponding to the phase amount Pd to the timing of outputting the video data 1606 in accordance with the timing reference signal 1608b2.

Consequently, isochronous data 2004b1 and 2004b2, whose synchronization is established and which are in phase, are output from the sink device 2001 to the video composition device 1020 as the video data from the first and second source devices 1502 and 1503.

As described above, the data transmission system of the fourth embodiment comprises the sink device 2001 for performing the processing of detecting the phase difference between the isochronous data 1605 and 1606 that are output from the source devices 1502 and 1503 and outputting the phase difference information Ipd which indicates the phase difference, together with the processing of the sink device 1501, in place of the sink device 1501 of the third data transmission system of the third embodiment. The source device 1503 shifts the timing reference signal based on the phase difference information Ipd so as to not have a phase difference Pd between the two kinds of video data 2004a1 and 2004a2 which are output from the sink device 2001 to the video composition device 1020. Therefore, in the sink device 2001 of the fourth embodiment, the video data whose synchronization is established and which are in phase can be output to the video composition device 1020 as video data from the two source devices.

In the data transmission system according to this fourth embodiment, the information relating to the phase shift phase difference information) Ipd is stored in the asynchronous data packet or isochronous data packet and is transmitted. However, the phase difference information Ipd can be stored in the cycle start packet 1701 and be transmitted.

Further, the data transmission system of the fourth embodiment comprises the sink device 2001 for performing the phase detection processing of detecting the phase difference between the isochronous data 1605 and 1606 that are output from the first and second source devices 1502 and 1503 and outputting the phase difference information Ipd in place of the sink device 1501 of the data transmission system of the third embodiment. In the first and second source devices 1502 and 1503, the processing of shifting the timing reference signal based on the phase difference information Ipd is performed. However, the data transmission system can have the sink device for performing the phase detection processing in addition to the processing in the sink device 101 of the data transmission system 10 of the first embodiment or the sink device 701 of the data transmission system 20 of the second embodiment instead of these sink devices, and one of the first and second source devices can perform the shift processing for the timing reference signal.

In this case, the phase difference information can be transmitted with the information that is included in the special frame header 401 of the first embodiment or the special transmission/receipt designation packet 1001a1 of the second embodiment, for example.

Fifth Embodiment

Figure 22:
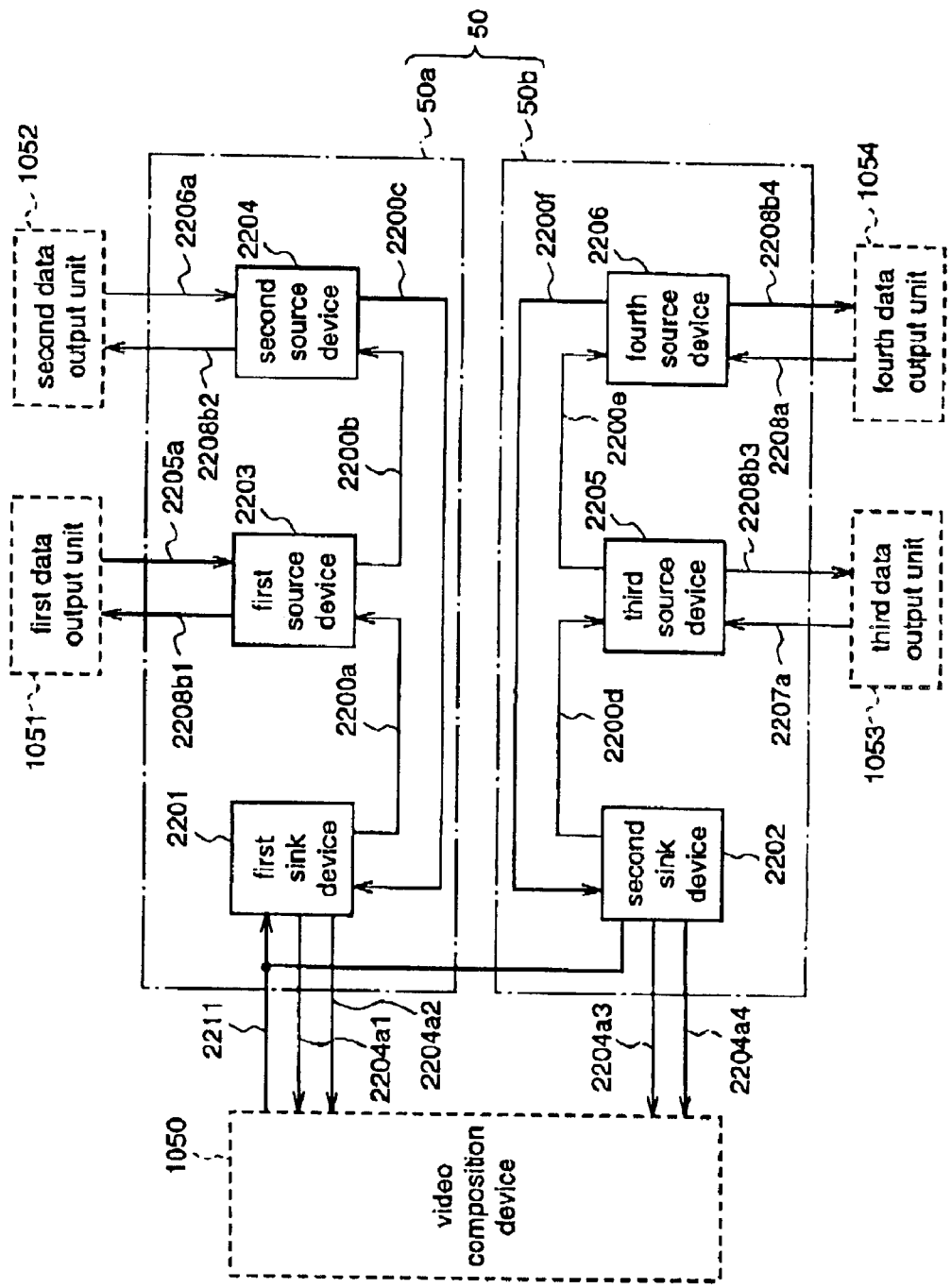
FIG. 22 is a diagram illustrating a data transmission system of a fifth embodiment of the present invention.

FIG. 22 is a block diagram for explaining a data transmission system 50 according to the fifth embodiment of the present i invention.

The data transmission system 50 of the fifth embodiment consists of first and second individual transmission systems 50a and 50b (hereinafter, simply referred to as the transmission system), each performing the transmission of video data. Here, each of the transmission systems 50a and 50b has the same structure as the data transmission system 10 of the first embodiment.

To be specific, the first transmission system 50a comprises a first source device 2203 for receiving a data 2205 having high real-time characteristics like audio data or video data from a first data output unit 1051 such as a camera which is external to the system, and transmitting the data as an isochronous data Dt1. The first transmission system 50a also comprises a second source device 2204 for receiving a data 2206a having high real-time characteristics like audio data or video data from a second data output unit 1052 such as a camera which is external to the system, and transmitting the data as an isochronous data Dt2.

The first transmission system 50a further has a first sink device 2201 for receiving the isochronous data Dt1 and Dt2 that are transmitted from the first and second source devices 2203 and 2204 and outputting the isochronous data Dt1 and Dt2 to a video composition device 1050 external to the system. The first transmission system 50a also includes a first transmission line 2200a for transmitting data between the sink device 2201 and the first source device 2203, a second transmission line 2200b for transmitting data between the first and second source devices 2203 and 2204, and a third transmission line 2200c for transmitting data between the second source device 2204 and the sink device 2201.

In this first transmission system 50a, the sink device 2201, the first and second source devices 2202 and 2203, and the first to third transmission lines 2200a to 2200c constitute one data transmission path in the form of a ring.

The second transmission system 50b comprises a third source device 2205 for receiving a data 2207a having high real-time characteristics like audio data or video data from a third data output unit 1053 such as a camera which is external to the system, and transmitting the data as an isochronous data Dt3. The second transmission system 50b also comprises a fourth source device 2206 for receiving a data 2208a having high real-time characteristics like audio data or video data from a fourth data output unit 1054 such as a camera which is external to the system, and transmitting the data as an isochronous data Dt4.

This second transmission system 50b further comprises a second sink device 2202 for receiving the isochronous data Dt3 and Dt4 that are transmitted from the third and fourth source devices 2205 and 2206 and outputting the isochronous data Dt3 and Dt4 to the video composition device 1050 external to the system. The second transmission system 50b also includes a fourth transmission line 2200d for transmitting data between the second sink device 2202 and the third source device 2205, a fifth transmission line 2200e for transmitting data between the third and fourth source devices 2205 and 2206, and a sixth transmission line 2200f for transmitting data between the fourth source device 2206 and the second sink device 2202.

In the transmission system 50b, the sink device 2202, the third and fourth source devices 2205 and 2206, and the fourth to sixth transmission lines 2202d to 2200f constitute one data transmission path in the form of a ring.

Further, in the data transmission system 50, the devices 2201 to 2206 operate with the same system clock, i.e., with the operational clock of one of these devices 2201 to 2206 (for example, the sink device 2201), and operational clocks of the other devices 2202 to 2206 are synchronized.

Here, the first and second sink devices 2201 and 2202 have the same structure as the sink device 101 of the first embodiment. To be specific, the sink device 2201 performs a processing of transmitting synchronous information 2211 that is output from the video composition device 1050 to the first and second source devices 2203 and 2204, and a processing of receiving video data that is transmitted from the first and second source devices 2203 and 2204 and outputting the video data to the video composition device 1050. The sink device 2202 performs a processing of transmitting the synchronous information 2211 that is output from the video composition device 1050 to the third and fourth source devices 2205 and 2206, and a processing of receiving video data that is transmitted from the third and fourth source devices 2205 and 2206 and outputting the video data to the video composition device 1050.

Further, the first and third source devices 2203 and 2205 have the same structure as the first source device 102 of the first embodiment. To be specific, the source devices 2203 and 2205 perform a processing of generating timing reference signals 2208b1 and 2208b3 based on the synchronous information 2211 that is output from the first and second sink devices 2201 and 2202 and outputting the timing reference signals 2208b1 and 2208b3 to the first and third data output units 1051 and 1053, and a processing of receiving video data 2205 and 2207 which are output from the first and third data output units 1051 and 1053 based on the timing reference signals 2208b1 and 2208b3 and outputting the video data 2205a and 2207a to the transmission lines 2200b and 2200e.

In addition, the second and fourth source devices 2204 and 2206 have the same structure as the second source device 103 of the first embodiment. To be specific, the second and fourth source devices 2204 and 2206 perform a processing of generating timing reference signals 2208b2 and 2208b4 based on the synchronous information 2211 that is output from the first and second sink devices 2201 and 2202 and outputting the timing reference signals 2208b2 and 2208b4 to the second and fourth data output units 1052 and 1054, and a processing of receiving video data 2206a and 2208a which are output from the second and fourth data output units 1052 and 1054 based on the timing reference signals 2208b2 and 2208b4 and outputting the video data 2206 and 2208 to the transmission lines 2200c and 2200f.

In FIG. 22, asynchronous data such as a control command, which is accessed between the first and second sink devices 2201 and 2202 and the video composition device 1050, and a reference signal, which is output from the sink device 2201 to the video composition device 1050, are not shown. Further, in FIG. 22, asynchronous data such as a control command, which is accessed between the first to fourth source devices 2203 to 2206 and the first to fourth data output units 1051 to 1054, and synchronous information, which is output from the first to fourth data output units 1051 to 1054 to the first to fourth source devices 2203 to 2206 are not shown.

The operation of the data transmission system 50 of the fifth embodiment will now be described.

In the first and second transmission systems 50a and 50b constituting the data transmission system 50 of the fifth embodiment, the data transmission processing is performed in the same manner as in the data transmission system 10 of the first embodiment.

Initially, the data transmission in the first transmission system 50a is described.

When the synchronous information 2211 that is output from the video composition device 1050 is input to the first sink device 2201 of the first transmission system 50a, the processing of storing the synchronous information 2211 in a special frame header of a predetermined transmission frame and transmitting the special frame header to the transmission line 2200a is performed in the sink device 2201. When the special frame header on the transmission line 2200a is input to the first source device 2203, the processing of generating the timing reference signal 2208b1 based on the synchronous information 2211 that is included in the special frame header and outputting the timing reference signal to the first data output unit 1051 is performed in the first source device 2203.

When the video data 2205a which is output from the first data output unit 1051 in accordance with the timing reference signal is received by the first source device 2203, a processing of inserting the video data 2205a into an isochronous data slot of a predetermined transmission frame and transmitting the isochronous data slot to the transmission line 2200b is performed in the first source device 2203.

When the predetermined special frame header from the transmission line 2200b is input to the second source device 2204, the processing of generating the timing reference signal 2208b2 and outputting the timing reference signal 2208b2 to the second data output unit 1052, and the processing of transmitting the video data 2206a which is output from the second data output unit 1052 based on the timing reference signal to the transmission line 2200c are performed in the second source device 2204, similar to the first source device 2203.

In the first sink device 2201, when the video data 2205a and 2206a that are output from the first and second source devices 2203 and 2204 are received via the transmission line 2200c, a processing of copying the data and outputting the data to the video composition device 1050 is performed.

The data transmission in the second transmission system 50b will now be described.

When the synchronous information 2211 that is output from the video composition device 1050 is input to the second sink device 2202 of the second transmission system 50b, the processing of storing the synchronous information in a special frame header of a predetermined transmission frame and transmitting the special frame header to the transmission line 2200d is performed in the second sink device 2202. When the special frame header from the transmission line 2200d is input to the third source device 2205, the processing of generating a timing reference signal 2208b3 based on the synchronous information that is included in the special frame header and outputting the timing reference signal to the third data output unit 1053 is performed in the third source device 2205.

When the video data 2207a which is output from the third data output unit 1053 based on the timing reference signal is received by the third source device 2205, a processing of inserting the video data 2207a into an isochronous data slot of the predetermined transmission frame and transmitting the isochronous data to the transmission line 2200e is performed in the third source device 2205.

When the predetermined special frame header from the transmission line 2200e is input to the fourth source device 2206, a processing of generating the timing reference signal 2208b4 and outputting the timing reference signal to the fourth data output unit 1054, and a processing of transmitting the video data 2208a which is output from the fourth data output unit 1054 based othe timing reference signal to the transmission line 2200f are performed in the fourth source device 2206, similar to the third source device 2205.

Then, when the video data 2207a and 2208a that are output from the third and fourth source devices 2205 and 2206 are received by the second sink device 2202 via the transmission line 2200f, a processing of copying the data and outputting the data to the video composition device 1050 is performed in the second sink device 2202.

Consequently, from the first and second source devices 2203 and 2204 which are included in the first transmission system 50a and the third and fourth source devices 2205 and 2206 which are included in the second transmission system 50b, which is different from the first transmission system, the video data between which the frame synchronization is established, which video data are output from the corresponding data output units, are output to the transmission lines 2200c and 2200f. Then, in the video composition device 1050, a processing of composing these video data 2205a to 2208a by using the video data that are output from the transmission lines 2200c and 2200f is performed.

As described above, the data transmission system 50 of the fifth embodiment comprises the first transmission system 50a which has the first sink device 2201 and the first and second source devices 2203 and 2204, and in which the video data 2205a and 2206a that are transmitted from the first and second source devices 2203 and 2204 are received by the first sink device 2201. Further, the data transmission system 50 comprises the second transmission system 50b which has the second sink device 2202 and the third and fourth source devices 2205 and 2206, and in which the video data 2207a and 2208a that are transmitted from the third and fourth source devices 2205 and 2206 are received by the second sink device 2202. In each of the transmission systems 50a and 50b, the data transmission is performed based on the synchronous information that is output from the video composition device 1050. Therefore, the video data 2205a and 2206a that are transmitted from the first transmission system 50a to the video composition device 1050 and the video data 2207a and 2208a that are transmitted from the second transmission system 50b to the video composition device 1050 are video data having the frame synchronization established. In the video composition device 1050, the composition processing can be performed directly to the video data which are input from the transmission lines 2200c and 2200f of the respective transmission systems.

According to the fifth embodiment, in the data transmission system having plural independent individual transmission systems, the individual transmission systems constituting the system have the same structure as the data transmission system of the first embodiment. However, the individual transmission system can have the same structure as the data transmission system of the second embodiment, the data transmission system of the third embodiment, or the data transmission system of the fourth embodiment.

For example, when the plural individual transmission systems constituting the data transmission system of the fifth embodiment have the same structure as the data transmission system of the second embodiment, the synchronous information is stored in the special transmission/receipt designation packet and is transmitted in each of the individual transmission systems. When the plural individual transmission systems constituting the data transmission system of the fifth embodiment have the same structure as the data transmission system of the third embodiment, the synchronous information is stored in the asynchronous data packet or the isochronous data packet and transmitted in each of the individual transmission systems. When the plural individual transmission system constituting the data transmission system have the same structure as the data transmission system of the fourth embodiment, the first and second sink devices 2201 and 2202 comprise the phase detector for detecting the phase shift to the received plural isochronous data, and store the information relating to the phase shift that is detected by the phase detector from the sink devices 2201 and 2202 to the first to fourth source devices 2203 to 2206 in the asynchronous data packet or isochronous data packet and transmit the data packet, respectively. The respective source devices 2203 to 2206 modify the reproduction timing of the frame reference signal based on the information, relating to the received phase shift.

According to the fifth embodiment, in the individual transmission systems of the data transmission system of the fifth embodiment, the plural data transmission apparatus (sink device and source devices) constituting the system are connected in the form of a ring, i.e., of a ring form connection type. However, in the individual transmission systems in the data transmission system, the plural data transmission apparatus constituting the system can be connected via buses, i.e., of a bus connection type. Alternatively, as shown in the third embodiment, one data transmission apparatus can be connected to other plural data transmission apparatus, i.e., the plural data transmission apparatus constituting the data transmission system of the fifth embodiment can be of a tree connection type.

In this fifth embodiment, the respective individual transmission systems constituting the data transmission system have one sink device and two source devices which are connected via the transmission lines. However, the individual transmission systems in the data transmission system of the fifth embodiment can have one sink device and one source device which are connected in a one-to-one relationship.

Sixth Embodiment

Figure 23:
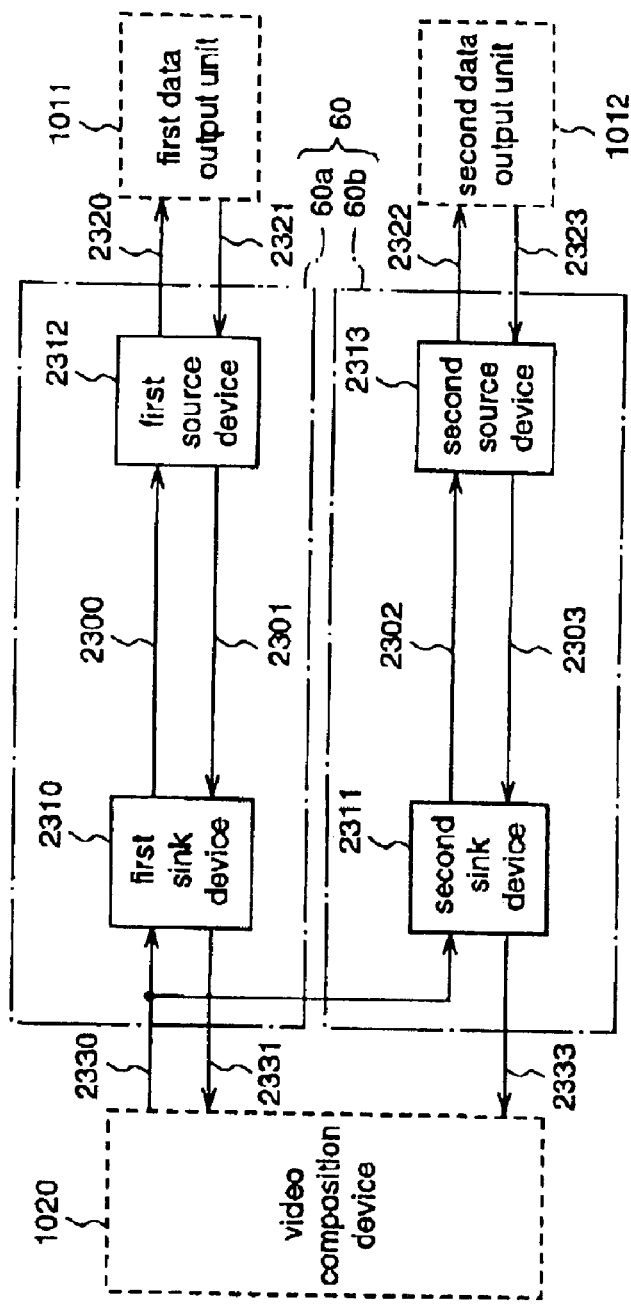
FIG. 23 is a diagram illustrating a data transmission system of a sixth embodiment of the present invention.

FIG. 23 is a block diagram for explaining a data transmission system 60 according to the sixth embodiment of the present invention.

The data transmission system 60 of the sixth embodiment consists of first and second individual transmission systems 60a and 60b which independently perform transmission of video data, respectively. In each of the individual transmission systems 60a and 60b, two data transmission apparatus constituting the system are connected in a one-to-one relationship.

To be specific, the first individual transmission system 60a comprises a first source device 2312 for receiving a data 2321 having high real-time characteristics like audio data or video data from a first data output unit 1011 such as a camera which is external to the system and transmitting the data as an isochronous data Dt1. The first individual transmission system 60a also comprises a first sink device 2310 for receiving the isochronous data Dt1 that is transmitted from the first source device 2312 and outputting the isochronous data Dt1 to a video composition device 1020 which is external to the system. The first individual transmission system 60a further comprises first and second transmission lines 2300 and 2301 for transmitting data between the first sink device 2310 and the first source device 2312.

The first transmission line 2300 is a transmission line for transmitting data from the first sink device 2310 to the first source device 2312, and a low-speed transmission line in which high-speed data transmission is impossible. Therefore, a data transmission unit of the first sink device 2310 and a data receiving unit of the first source device 2312 conform to low-speed data transmission. The second transmission line 2301 is a transmission line for transmitting data from the first source device 2312 to the first sink device 2310, and a high-speed transmission line in which high-speed data transmission is possible. Therefore, a data receiving unit of the first sink device 2310 and a data transmission unit of the first source device 2312 conform to high-speed data transmission.

The second individual transmission system 60b comprises a second source device 2313 for receiving a data 2323 having high real-time characteristics like audio data or video data from the second data output unit 1012 such as a camera which is external to the system, and transmitting the data as an isochronous data Dt2. The second individual transmission system 60b also comprises a second sink device 2311 for receiving the isochronous data Dt2 that is transmitted from the second source device 2313 and outputting the isochronous data Dt2 to the video composition device 1020 which is external to the system. The individual transmission system 60b further comprises third and fourth transmission lines 2302 and 2303 for transmitting data between the second sink device 2311 and the second source device 2313.

The third transmission line 2302 is a transmission line for transmitting data from the second sink device 2311 to the second source device 2313, and a low-speed transmission line in which high-speed data transmission is impossible. Therefore, a data transmission unit of the second sink device 2311 and a data receiving unit of the second source device 2313 conform to low-speed data transmission. In addition, the fourth transmission line 2303 is a transmission line for transmitting data from the second source device 2313 to the second sink device 2311, and a high-speed transmission line in which high-speed data transmission is possible. Therefore, a data receiving unit of the second sink device 2311 and a data transmission unit of the second source device 2313 conform to high-speed data transmission.

To be specific, the relationship between the maximum data transmission speed X (Mbps) of the low-speed transmission lines 2300 and 2302 and the maximum data transmission speed Y (Mbps) of the high-speed transmission lines 2301 and 2303 is shown as X<Y. For example, the transmission speed X is 5 Mbps and the transmission speed Y is 50 Mbps.

Further, the first and second sink devices 2310 and 2311 have the same structure as the sink device 101 of the first embodiment. To be specific, the sink devices 2310 and 2311 perform the processing of storing synchronous information 2330 that are output from the video composition device 1020 in a special frame header and transmitting the special frame header to the transmission lines 2300 and 2302, and the processing of receiving video data that are transmitted from the source devices 2312 and 2313 and outputting the video data to the video composition device 1020, respectively.

Further, the first and second source devices 2312 and 2313 have the same structure as the first source device 102 of the first embodiment. To be specific, the first and second source devices 2312 and 2313 perform the processing of generating timing reference signals 2320 and 2322 based on the synchronous information that are output from the first and second sink devices 2310 and 2311 and outputting the timing reference signals to the first and second data output units 1011 and 1012, and the processing of receiving the video data 2321 and 2323 that are output from the first and second data output units based on the timing reference signals 2320 and 2322, storing the data in isochronous data slots and transmitting the isochronous data slots to the transmission lines 2301 and 2303, respectively.

Figure 24:
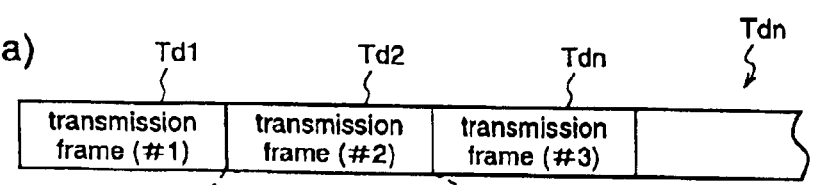
FIG. 24(a) is a diagram illustrating a transmission frame of transmission data which propagate on a transmission line of the data transmission system according to the sixth embodiment.
FIG. 24(b) is a diagram illustrating a transmission frame on a low-speed transmission line.
FIG. 24(c) is a diagram illustrating a transmission frame on a high-speed transmission line.
Figure 24:
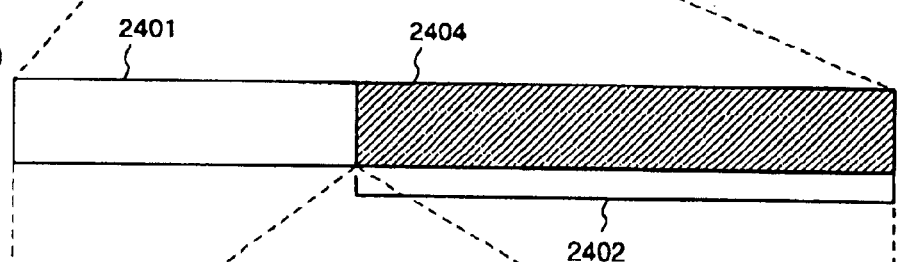
Figure 24:
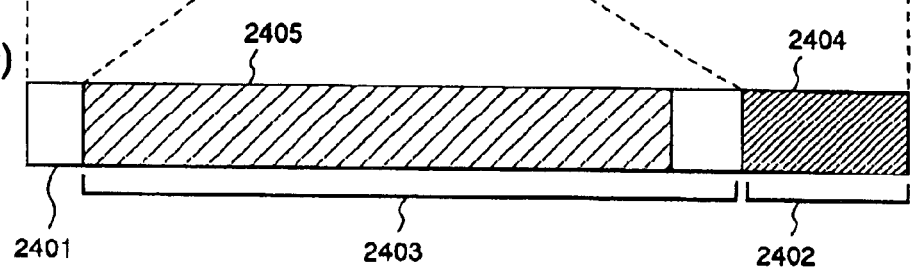

FIGS. 24(a) to 24(c) are diagrams illustrating a data structure of transmission data which are transmitted to the transmission lines 2300 to 2303 (transmission frame format).

As shown in FIG. 24(a), transmission frames (#1) Td1, (#2) Td2, (#3) Td3, . . . Tdn are transmitted on each of the transmission lines in a fixed cycle.

As shown in FIG. 24(b), on the low-speed transmission lines 2300 and 2302, an asynchronous data slot 2402 which contains an asynchronous data 2404 is transmitted subsequent to a frame header 2401 for detecting the head of the transmission frame. This asynchronous data slot 2402 can be previously allocated to a device for transmitting the asynchronous data (the first or second sink device). Alternatively, the respective devices (the first and second sink devices) can use the asynchronous data slot 2402 as needed.

As shown in FIG. 24(c), on the high-speed transmission lines 2301 and 2303, an isochronous data slot 2403, which contains an isochronous data 2405, and the asynchronous data slot 2402, which contains the asynchronous data 2404, are transmitted subsequent to a frame header 2401 for detecting the head of the transmission frame. The isochronous data slot 2403 is previously allocated to the first and second source devices 2312 and 2313 for transmitting isochronous data. Further, the asynchronous data 2404 includes a control command that is output from the sink device to the source device, a response signal for the control command that is output from the source device to the sink device (ACK, NACK or the like), status data (data indicating the status of each device), or the like. Further, the isochronous data 2405 is a video data that is output from the data output unit or the like.

As described above, in the data transmission system 60 of the sixth embodiment, only the asynchronous data can be transmitted from the sink device to the source device. On the other hand, the isochronous data and asynchronous data can be transmitted from the source device to the sink device. The data structure of the transmission frame which is used in this data transmission system 60 of the sixth embodiment is fundamentally the same as in the first embodiment. However, this sixth embodiment is different from the first embodiment in that the asynchronous data slot 2403 is not included in the transmission frame which is used for the data transmission from the first sink device 2310 to the first source device 2312 and the transmission frame which is used for the data transmission from the second sink device 2311 to the second source device 2313.

Further, the data transmission speed of the low-speed transmission line is different from that of the high-speed transmission line. Therefore, the sizes on the temporal axis of the frame header 2401 of the transmission frame corresponding to the high-speed transmission line, the asynchronous data slot 2402 and the asynchronous data 2404 are smaller than those on the temporal axis of the frame header 2401 of the transmission frame corresponding to the low-speed transmission line, the asynchronous data slot 2402 and the asynchronous data 2404. As described above, in this data transmission system 60 of the sixth embodiment, the period for transmitting the isochronous data from the source device to the sink device is ensured in the transmission frame from the source device to the sink device by utilizing the difference in the speed between the transmission speed from the source device to the sink device and the transmission speed from the sink device to the source device. Therefore, the cycle of the transmission frame that is transmitted from the sink device to the source device is made equal to the cycle of the transmission frame that is transmitted from the source device to the sink device.

The operation of the data transmission system 60 of the sixth embodiment will now be described.

In the first and second transmission systems 60a and 60b of the data transmission system 60 according to the sixth embodiment, the transmission of the synchronous information from the first and second sink devices 2310 and 2311 to the first and second source devices 2312 and 2313 is performed by using the low-speed transmission lines 2300 and 2302, and the transmission of the video data (isochronous data) from the first and second source devices 2312 and 2313 to the first and second sink devices 2310 and 2311 is performed by using the high-speed transmission lines 2301 and 2303, respectively.

To be specific, when the synchronous information 2330 that is output from the video composition device 1020 is input to the first and second sink devices 2310 and 2311 of the first and second individual transmission systems 60a and 60b, a processing of inserting the synchronous information in the asynchronous data slot 2402 subsequent to the frame header 2401 of the predetermined transmission frame and transmitting the asynchronous data slot 2402 to the low-speed transmission lines 2300 and 2303 is performed in the sink devices 2310 and 2311, respectively. When the synchronous information from the transmission lines 2300 and 2302 is input to the first and second source devices 2312 and 2313, a processing of generating the timing reference signals 2320 and 2322, which have the same frequency and the same phase based on the synchronous information, and outputting the timing reference signals to the first and second data output units 1011 and 1012 is performed in the respective source devices 2312 and 2313. Here, the timing reference signals 2320 and 2322 have the same frequency and the same phase. To be specific, the timing reference signals are frame synchronous signals which indicate the start timing of the processing for each video frame.

The video data (isochronous data) 2321 and 2323 are output from the first and second data output units 1011 and 1012 in synchronization with the timing reference signals, and are input to the first and second source devices 2312 and 2313 in the status where the frame synchronization is established, respectively.

In the first source device 2312, the input isochronous data 2321 is retained and thereafter a processing of inserting the isochronous data 2321 to the isochronous data slot 2403 following the frame header 2401 of the predetermined transmission frame, inserting the synchronous information 2404 from the sink device into the asynchronous data slot 2402 following the isochronous data slot 2403, and transmitting the isochronous data and synchronous information to the high-speed transmission line 2301 is performed. To be specific, in the first source device 2312, the video data 2321 is transferred to the first sink device 2310 and the received synchronous information 2404 is returned to the first sink device 2310.

Similarly, in the second source device 2313, the input isochronous data 2323 is retained, and thereafter, a processing of inserting the isochronous data 2323 into the isochronous data slot 2403 following the frame header 2401 of the predetermined transmission frame, inserting the synchronous information 2404 that is output from the sink device into an asynchronous data slot 2402 following the isochronous data slot 2403, and transmitting the isochronous data and the synchronous information to the high-speed transmission line 2303 is performed. To be specific, in the second source device 2313, the video data 2323 is transferred to the second sink device 2311, and the received synchronous information 2404 is returned to the second sink device 2311.

Then, in the first and second sink devices 2310 and 2311, the isochronous data 2405 that is stored in the isochronous data slot 2403 of the transmission frame, which are received via the high-speed transmission lines 2301 and 2303 are output to the video composition device 1020 as the respective video data 2331 and 2333. These video data 2331 and 2333 are input from the first and second data output units to the first and second source devices 2312 and 2313 in the status where the frame synchronization is established, respectively. Therefore, the frame synchronization is established also at the output timing of the first and second sink devices 2310 and 2311.

The video data 2405 that are received by the first and second sink devices 2310 and 2311 are abandoned after the receipt thereof by the first and second sink devices 2310 and 2311, and are not transferred to the first and second source devices 2312 and 2313 via the low-speed transmission lines. In addition, the asynchronous data 2402 which have been returned from the first and second source devices 2312 and 2313 to the sink first and second devices 2310 and 2311 are also abandoned similar to the video data 2405 after these data are received by the first and second sink devices 2310 and 2311, respectively.

As described above, the data transmission system 60 of the sixth embodiment comprises the first individual transmission system 60a which has the first sink device 2310 and the first source device 2312 and in which these devices are connected by the two transmission lines 2300 and 2302 having different transmission speeds in a one-to-one relationship. The data transmission system 60 also comprises the second individual transmission system 60b which has the second sink device 2311 and the second source device 2313 and in which these devices are connected by the two transmission lines 2301 and 2303 having different transmission speeds in a one-to-one relationship. In each of the first and second individual transmission systems 60a and 60b, the data transmission is performed based on the synchronous information this output from the video composition device 1020. Therefore, the video data 2331 that is transmitted to the video composition device 1020 by the first individual transmission system 60a and the video data 2333 that is transmitted to the video composition device 1020 by the second individual transmission system 60b are video data having the frame synchronization established. In the video composition device 1020, the composition processing can be performed directly to the video data which are transmitted by the respective transmission systems. Further, a buffer for absorbing the timing shift of two video data which are transmitted by the respective transmission systems can be dispensed with.

Further, in this individual transmission system, the transmission line having a transmission speed which is lower than the transmission speed of the transmission line for the data transmission from the source device to the sink device is used as the transmission line for the data transmission from the sink device to the source device. Therefore, low-cost elements can be used as the transmission lines for performing the data transmission from the sink device to the source device. Besides, a low-cost unit can be used as the transmission/receiving unit for performing the data transmission from the sink device to the source device. Therefore, both a low-cost and high-efficiency data transmission can be realized.

In the data transmission system of the sixth embodiment, the synchronous information 2404 that is received from the first and second sink devices 2310 and 2311 by the first and source devices 2312 and 2313 are inserted in the asynchronous data slot 2402 of the high-speed transmission frame and are returned to the first and second sink devices 2310 and 2311. However, in this data transmission system of the sixth embodiment, the low-speed transmission lines can end at the source devices 2312 and 2313, whereby the received synchronous information 2404 is not returned to the sink devices.

In the data transmission system of the sixth embodiment, the synchronous information is stored in the asynchronous data slot and transmitted. However, in the data transmission system of the sixth embodiment, the synchronous information can be stored in the isochronous data slot which is provided in the transmission frame for performing data transmission from the sink device to the source device so as to be transmitted. Further, in the data transmission system of the sixth embodiment, the synchronous information can be transmitted to the source devices 2312 and 2313, respectively, by using the special frame header, as shown in the first embodiment.

Further, in this sixth embodiment, the timing reference signal that is used in the data transmission system is a frame synchronous signal which indicates the head of each video frame (i.e., indicates the start timing of the signal processing for each video frame). However, when the signal processing for each video frame is performed for each of the blocks which divide the video frame, the timing reference signal can be a signal which indicates the timing of the signal processing for each of the blocks (block synchronous signal).

Further, in the sixth embodiment, the cameras are connected to the source devices as the data output units which are external to the system. The video composition device is connected to the sink device as the device which is external to the system. However, the data output units which are external to the system that are connected to the source devices can be video transmission devices such as a VTR and the device which is external to the system that is connected to the sink device can be a monitor or display device of a navigation system, or a video recording device.

Further, in this sixth embodiment, specific elements constituting the transmission line in the data transmission system are not particularly shown. However, optical fiber can be used for all of the transmission lines 2300 to 2303. In addition, metal lines (wires) can be used for the low-speed transmission lines 2300 and 2302 for performing data transmission from the sink device to the source device, and the optical fiber can be used for the high-speed transmission lines 2301 and 2303 for performing data transmission from the source device to the sink device.

Further, the data transmission system of the sixth embodiment can have a structure which comprises a phase detector for detecting a phase shift of received plural isochronous data in the sink devices 2310 and 2311, as shown in the fourth embodiment, and which transmits the information relating to the phase shift that is detected by the phase detector as the asynchronous data or isochronous data from the sink devices 2310 and 2311 to the source devices 2312 and 2313. In this case, the source device modifies the reproduction timing of the reference signal based on the received information relating to the phase shift. Therefore, the sink devices 2310 and 2311 can obtain the isochronous data having the synchronization established even when the phase difference between the isochronous data from the two source devices occurs due to a data delay on the transmission line.

Seventh Embodiment

Figure 25:
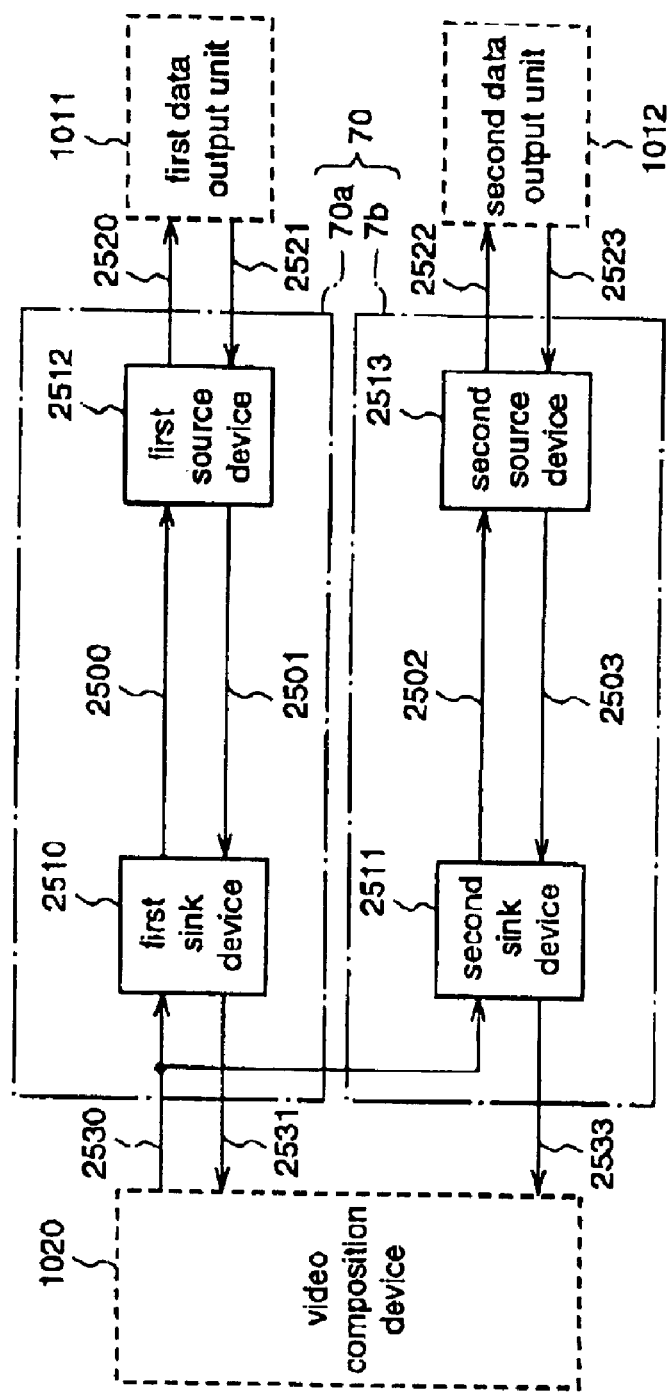
FIG. 25 is a diagram illustrating a data transmission system according to a seventh embodiment of the present invention.

FIG. 25 is a block diagram for explaining a data transmission system 70 according to the seventh embodiment of the present invention.

The data transmission system 70 of the seventh embodiment consists of first and second individual transmission systems 70a and 70b each independently performing transmission of video data, similar to the data transmission system 60 of the sixth embodiment. Here, in each of the first and second individual transmission systems 70a and 70b, two data transmission apparatus constituting the system are connected in a one-to-one relationship.

To be specific, the first individual transmission system 70a comprises a first source device 2512 for receiving a data 2521 having high real-time characteristics like audio data or video data from a first data output unit 1011 which is external to the system, and transmitting the data as an isochronous data Dt1. The first individual transmission system 70a also comprises a first sink device 2510 for receiving the isochronous data Dt1 the transmitted from the first source device 2512 and outputting the isochronous data Dt1 to a video composition device 1020 which is external to the system. The individual transmission system 70a farther comprises a first transmission line (low-speed transmission line) 2500 for transmitting data from the first sink device 2510 to the first source device 2512 at low speeds, and a second transmission line (high-speed transmission line) 2501 for transmitting data from the first source device 2512 to the first sink device 2510 at high speeds. Therefore, a data transmission unit of the first sink device 2510 and a data receiving unit of the first source device 2512 conform to low-speed data transmission. In addition, a data receiving unit of the first sink device 2510 and a data transmission unit of the first source device 2512 conform to high-speed data transmission.

In addition, the second individual transmission system 70b comprises a second source device 2513 for receiving a data 2523 having high real-time characteristics like audio data or video data from a second data output unit 1012 which is external to the system, and transmitting the data as an isochronous data Dt2. The second individual transmission system 70b also comprises a second sink device 2511 for receiving the isochronous data Dt2 that is transmitted from the second source device 2513 and outputting the isochronous data Dt2 to the video composition device 1020 which is external to the system This individual transmission system 70b comprises a third transmission line (low-speed transmission line) 2502 for transmitting data from the second sink device 2511 to the second source device 2513 at low speeds, and a fourth transmission line (high-speed transmission line) 2503 for transmitting data from the second source device 2513 to the second sink device 2511 at high speeds. Therefore, a data transmission unit of the second sink device 2511 and a data receiving unit of the second source device 2513 conform to low-speed data transmission. In addition, a data receiving unit of the second sink device 2511 and a data transmission unit of the source device 2513 conform to high-speed data transmission.

To be specific, the relationship between the maximum data transmission speed X (Mbps) of the low-speed transmission lines 2500 and 2502 and the maximum data transmission speed Y (Mbps) of the high-speed transmission lines 2501 and 2503 is shown as X<Y. For example, the transmission speed X is 5 Mbps and the transmission speed Y is 50 Mbps.

In this seventh embodiment, the first and second sink devices 2510 and 2011 and the first and second source devices 2512 and 2513 perform data transmission by using packets similar the sink device 701 and the first and second source devices 702 and 703 of the second embodiment.

To be specific, the first and second sink devices 2510 and 2511 perform the processing of storing synchronous information 2530 that is output from the video composition device 1020 in data packets and transmitting the data packets to the transmission lines 2500 and 2502, and the processing of receiving video data that is transmitted from the first and second source devices 2512 and 2513 and outputting the video data to the video composition device 1020.

In addition, the first and second source devices 2512 and 2513 perform the processing of generating timing reference signals 2520 and 2522 based on the synchronous information that are output from the first and second sink devices 2510 and 2511 and outputting the timing reference signals to the first and second data output units 1011 and 1012, and the processing of receiving video data 2521 and 2523 that are output from the first and second data output units 1011 and 1012 based on the timing reference signals 2520 and 2522 and storing the data to the transmission lines 2501 and 2503 in data packets to be transmitted, respectively.

As described above, the data transmission system 70 of the seventh embodiment is different from the data transmission system 60 of the sixth embodiment in that data transmission is performed by using packets.

Figure 26:
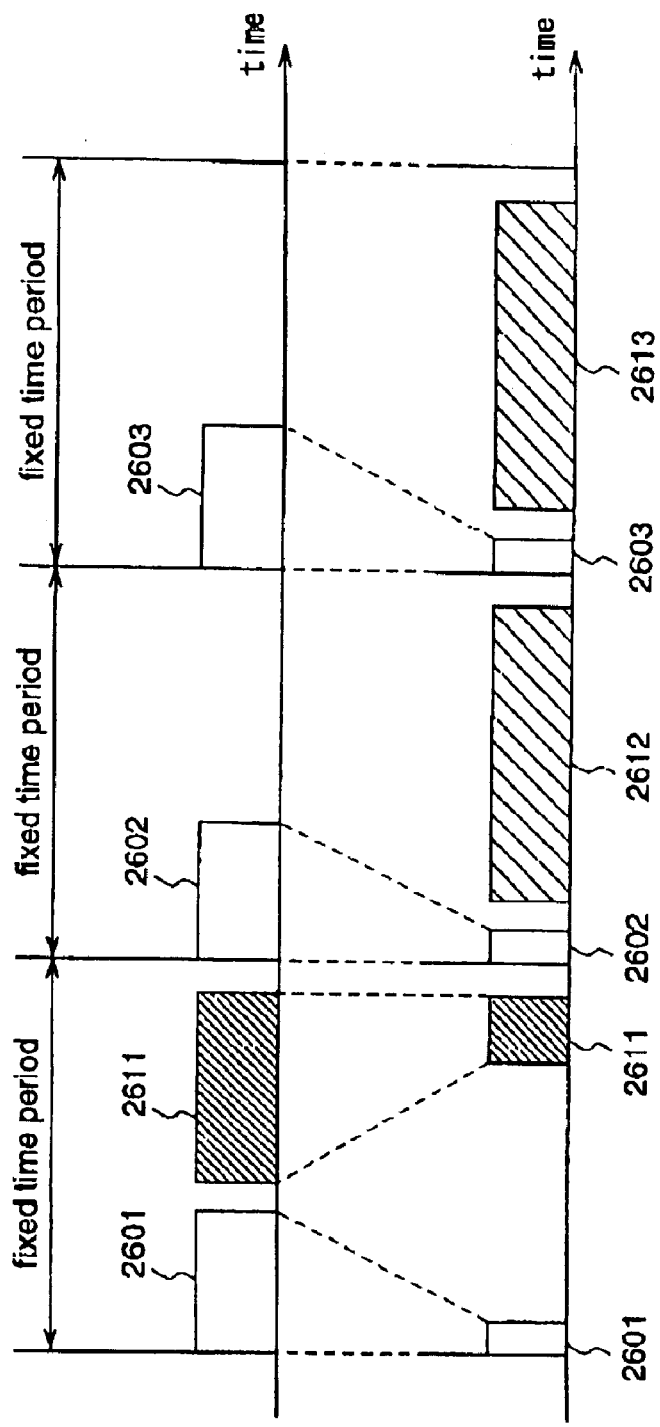
FIG. 26(a) is a diagram illustrating an example of a transmission frame on a low-speed transmission line of the data transmission system according to the seventh embodiment.
FIG. 26(b) is a diagram illustrating an example of a transmission frame on a high-speed transmission line of the system.

FIGS. 26(a) and 26(b) are diagrams illustrating data structures of transmission data which are transmitted to the transmission lines 2500 to 2503 (transmission frame format). FIG. 26(a) shows a data structure of a transmission frame on the low-speed transmission lines 2500 and 2502 for transmitting data from the first and second sink devices 2510 and 2511 to the first and second source devices 2512 and 2513. FIG. 26(b) shows a data structure of a transmission frame on the high-speed transmission lines 2501 and 2503 for transmitting data from the first and second source devices 2512 and 2513 to the first and second sink devices 2510 and 2511.

As shown in FIGS. 26(a) and 26(b), in the first and second individual transmission systems 70a and 70b, transmission/receipt designation packets 2601 to 2603 are output by the sink device or source device to the transmission lines for each fixed time period. Thereby, the transmission/receipt designation packets are transmitted on the transmission lines 2500 to 2503 to the data transmission system 70 in the same cycle. These transmission/receipt designation packets 2601 to 2603 include transmission/receipt designation information which designates a device for receiving data to be stored in the immediately following data packet and a device for transmitting the data.

For example, the transmission/receipt designation packet 2601 among the transmission/receipt designation packets 2601 to 2603 includes information which instructs the transmission of asynchronous data from the sink device to the source device. The transmission/receipt designation packets 2602 and 2603 include information which instructs the transmission of isochronous data from the source device to the sink device. Here, when information which instructs the transmission of asynchronous data from the source device to the sink device is stored in the transmission/receipt designation packets 2601 and 2603, the asynchronous data can be transmitted from the source device to the sink device.

A data packet 2611 following the transmission/receipt designation packet 2601 is a data packet including asynchronous data which are transmitted by the first sink device 2510 or the second sink device 2511. As the asynchronous data, control commands from the sink device to the source device, response signals for the control commands from the source device to the sink device (ACK, NACK or the like), or status data (data indicating status of the respective devices) are transmitted.

In addition, data packets 2612 and 2613 following the transmission/receipt designation packets 2602 and 2603 include isochronous data that are transmitted by the first source device 2512 or the second source device 2513. These data packets including the isochronous data are transmitted only from the source device to the sink device.

As described above, in the data transmission system 70 of the seventh embodiment, the asynchronous data are transmitted from the sink device to the source device, and the isochronous data and the asynchronous data are transmitted from the source device to the sink device. Further, the data structure of the transmission frame in the data transmission system 70 is fundamentally the same as the data structure of the transmission frame in the data transmission system 20 of the second embodiment. The data transmission 70 of the seventh embodiment is different from the data transmission system 20 of the second embodiment in that the isochronous data are transmitted only in one direction, i.e., from the first and second source devices 2512 and 2513 to the first and second sink devices 2510 and 2511, respectively.

In this seventh embodiment, the data transmission speed on the high-speed transmission line is larger than the data transmission speed on the low-speed transmission line similar to the sixth embodiment. Therefore, the sizes of the packets on the high-speed transmission line are smaller than the sizes of the corresponding packets on the low-speed transmission lines.

The operation of the data transmission system 70 of the seventh embodiment will now be described.

In the first and second individual transmission systems 70a and 70b of the data transmission system 70 according to the seventh embodiment, the transmission of the synchronous information from the first and second sink devices 2510 and 2511 to the first and second source devices 2512 and 2513 is performed by using the low-speed transmission lines 2500 and 2502, and the transmission of the video data (isochronous data) from the first and second source devices 2512 and 2513 to the first and second sink devices 2510 and 2511 is by performed using the high-speed transmission lines 2501 and 2503, respectively.

To be specific, in the first and second individual transmission systems 70a and 70b of the data transmission system 70, the processing of transmitting the transmission/receipt designation packets from the first and second sink devices 2510 and 2511 to the first and second source devices 2512 and 2513 in a fixed cycle is performed, respectively. When the synchronous information 2530 that is output from the video composition device 1020 is input to the first and second sink devices 2510 and 2511 of the first and second individual transmission systems 70a and 70b in this status, the first sink device 2510 performs the processing of transmitting the data packet 2611 which contains tho synchronous information via the low-speed transmission line 2500, subsequent to the transmission/receipt designation packet 2601. At the same time, the second sink device 2511 performs the processing of transmitting the data packet 2611 which contains the synchronous information via the low-speed transmission line 2502, subsequent to the transmission/receipt designation packet 2601. At this time, information which designates the sink device as the supply source of the synchronous information that is stored in the data packet following the packet 2601 and designates the source device as the supply destination of the synchronous information is stored in the transmission/receipt designation packet 2601. Here, the synchronous information is a frame synchronous signal of the video data which are received by the sink device or information for generating the frame synchronous signal.

Thereafter, a processing of transmitting the transmission/receipt designation packet from the first sink device 2510 to the first source device 2512 via the low-speed transmission lines 2500 repeatedly every fixed period is performed in the first individual transmission system 70a. For example, in the first individual transmission system 70a, after the transmission of the transmission/receipt designation packet 2601, the transmission/receipt designation packets 2602 and 2603 are transmitted. Here, these transmission/receipt designation packets 2602 and 2603 include information which designates the first source device 2512 as a supply source of video data to be stored in the immediately following data packet and which designates the first sink device 2510 as the supply destination.

In addition, in the second individual transmission system 70b, after the transmission of the data packet 2611, a processing of transmitting the transmission/receipt designation packet from the second sink device 2511 to the second source device 2513 via the low-speed transmission line 2502 repeatedly every fixed time period is performed as in the first individual transmission system 70a. For example, in the second individual transmission system 70b, after the transmission of the transmission/receipt designation packet 2601, the transmission/receipt designation packets 2602 and 2603 are transmitted. These transmission/receipt designation packets 2602 and 2603 include information which designates the second source device 2513 as the supply source of video data to be stored in the immediately following data packet and which designates the second sink device 2511 as the supply destination.

On the other hand, in the first and second source devices 2512 and 2513 of the first and second individual transmission systems 70a and 70b, when the transmission/receipt designation packet 2601 and data packet 2611 are received from the first and second sink devices 2510 and 2511, the timing reference signals 2520 and 2522 are reproduced based on the synchronous information that is included in the data packet 2611, and the timing reference signal 2520 and 2522 are output to the first and second data output units 1011 and 1012, respectively. The timing reference signal 2520 and the timing reference signal 2522 have the same frequency and the same phase as each other. Then, the video data 2521 and 2523 which are output from the first and second data output units 1011 and 1012 based on the timing reference signals 2520 and 2522 are input to the source device 2512 and 2513 and retained, respectively. The frame synchronization is established between the video data 2521 and the video data 2523.

In the first source device 2512 of the first individual transmission system 70a, a processing of returning the transmission/receipt designation packet 2601 from the first sink device 2510 and the data packet 2611 to the first sink device 2510 via the high-speed transmission line 2501 is performed. In the first sink device 2510, the transmission/receipt designation packet 2601 and data packet 2611 which have been returned from the first source device 2512 are abandoned. Similarly, in the second source device 2513 of the second individual transmission system 70b, a processing of returning the transmission/receipt designation packet 2601 from the second sink device 2511 and the data packet 2611 to the second sink device 2511 via the high-speed transmission line 2503 is performed. In the second sink device 2511, the transmission/receipt designation packet 2601 and data packet 2611 which have been returned from the second source device 2513 are abandoned.

Thereafter, in the first source device 2512 of the first individual transmission system 70a, each time the transmission/receipt designation packets 2602 and 2603 are received via the low-speed transmission line 2500, a processing of returning the transmission/receipt designation packets 2602 and 2603 that are output from the first sink device 2510 to the sink device, storing the video data 2521 that is output from the first data output unit 1011 in the data packets 2612 and 2613 subsequent to the transmission/receipt designation packets 2602 and 2603, and transmitting the data packets to the first sink device 2510 via the high-speed transmission line 2501 is performed. Similarly, in the second source device 2513 of the second individual transmission system 70b, each time the transmission/receipt designation packets 2602 and 2603 are received via the low-speed transmission line 2502, a processing of returning the transmission/receipt designation packets 2602 and 2603 from the second sink device 2511 to the second sink device 2511, storing the video data 2523 that is output from the second data output unit 1012 in the data packets 2612 and 2613 subsequent to the transmission/receipt designation packets 2602 and 2603, and transmitting the data packets to the second sink device 2511 via the high-speed transmission line 2503 is performed.

Then, in the first and second sink devices 2510 and 2511, the transmission/receipt designation packets 2602 and 2603 which are received via the high-speed transmission lines 2501 and 2503 are abandoned, respectively. In addition, in the first and second sink devices 2510 and 2511, when the data packets 2612 and 2613 containing the video data are received, the received video data are output to the video composition device 1020 as the output data 2531 and 2533 of the sink device.

These video data 2531 and 2533 are data which have been respectively input from the first and second data output units 1011 and 1022 to the first and second source devices 2512 and 2513 in the status where their frame synchronization is established. Therefore, also at a time when the video data are output from the first and second sink devices 2510 and 2511, the synchronization of the video frame is established.

Here, the data packets 2612 and 2613 are abandoned after being received by the first and second sink devices 2510 and 2511. Therefore, these data packets 2612 and 2613 are not re-transferred to the first and second source devices 2512 and 2513.

As described above, the data transmission system 70 of the seventh embodiment comprises the first individual transmission system 70a which has the first sink device 2510 and the first source device 2512 and in which these devices are connected by the low-speed transmission line 2500 and the high-speed transmission line 2501 in a one-to-one relationship. The data transmission system 70 also comprises the second individual transmission system 70b which has the second sink device 2511 and the second source device 2513 and in which these devices are connected by the low-speed transmission line 2502 and the high-speed transmission line 2503 in a one-to-one relationship. In each of the individual transmission system 70a and 70b, the data transmission by using the packets is performed based on the synchronous information that are output from the video composition device 1020. Therefore, the video data 2531 which is transmitted to the video composition device 1020 by the first individual transmission system 70a and the video data 2533 which is transmitted to the video composition device 1020 by the second individual transmission system 70b are video data having the frame synchronization established. In the video composition device 1020, the composition processing can be performed directly for the video data which are transmitted by the respective transmission systems Further, the buffer for absorbing the gap of the timings of the two kinds of video data which are transmitted by the transmission systems can be dispensed with.

In each of the individual transmission systems, as the transmission line for the data transmission from the sink device to the source device, the transmission line having a transmission speed lower than the transmission speed of the transmission line for the data transmission from the source device to the sink device is employed. Therefore, low-cost elements can be used for the transmission line for performing the data transmission from the sink device to the source device. Further, a low-cost transmission/receiving unit for performing the data transmission from the sink device to the source device can be used. Thereby, the data transmission can be performed at both a low cost and with good efficiency.

In the data transmission system of the seventh embodiment, the data packets 2611 including the asynchronous data which have been transmitted from the first and second sink devices 2510 and 2511 to the first and second source devices 2512 and 2513 are returned from the first and second source devices 2512 and 2513 to the first and second sink devices 2510 and 2511. However, in the data transmission system, it is possible that the data packets 2611 that are output from the first and second sink devices 2510 and 2511 to the first and second source devices 2512 and 2513 are not returned to the sink devices.

Figure 27:
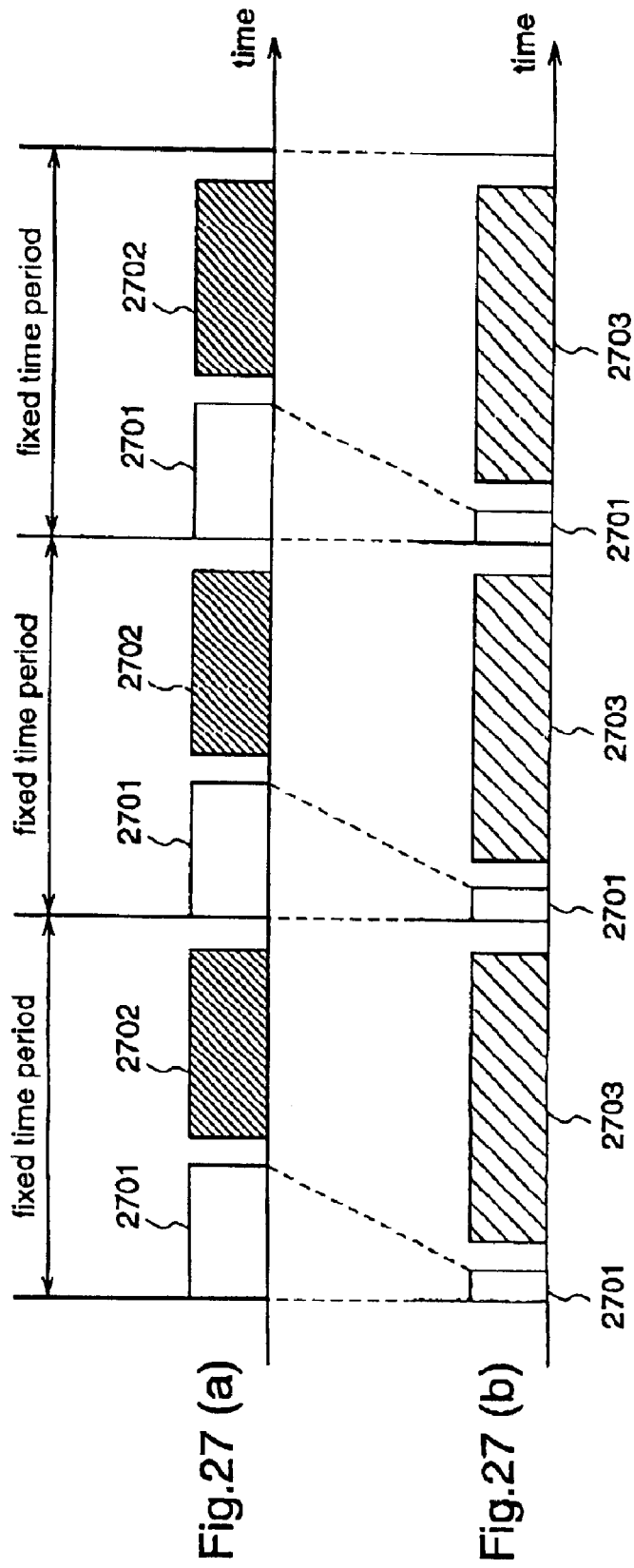
FIG. 27(a) is a diagram illustrating another example of the transmission frame on the low-speed transmission line of the data transmission system according to the seventh embodiment.
FIG. 27(b) is a diagram illustrating another example of the transmission frame on the high-speed transmission line of the system.

FIGS. 27(a) and 27(b) show data structures of transmission frames in the data transmission system in which the data packets 2611 from the first and second sink devices 2510 and 2511 to the first and second source devices 2512 and 2513 are not returned to the sink devices.

FIG. 27(a) shows a data structure of a transmission frame on the low-speed transmission line from the first and second sink devices 2510 and 2511 to the first and second source devices 2512 and 2513 FIG. 27(b) shows a data structure of a transmission frame on the high-speed transmission line from the first and second source devices 2512 and 2513 to the first and second sink devices 2510 and 2511.

In the data transmission system, after the transmission/receipt designation packets 2701 are received from the first and second sink devices 2510 and 2511 by the first and second source devices 2512 and 2513 via the low-speed transmission lines, the transmission/receipt designation packets 2701 are returned from the source devices to the sink devices via the high-speed transmission lines. Here, the transmission/receipt designation packet 2701 which is transmitted on the low-speed transmission line from the sink device to the source device includes information which designates the sink device as the transmission source of information such as the asynchronous data that is included in the following data packet 2702 and which designates the source device as the supply destination. On the other hand, the transmission/receipt designation packet 2701 which is transmitted on the high-speed transmission line from the source device to the sink device includes information which designates the source device as the transmission source of information such as video data that is included in the following data packet 2703 and which designates the sink device as the supply destination.

In addition, the data packets 2702 including the asynchronous data which are transmitted from the first and second sink devices 2510 and 2511 are received by the first and second source devices 2512 and 2513, and thereafter disappear in the source devices as the transmission line ends.

Further, the data packets including the video data which are transmitted from the first and second source devices 2512 and 2513 are received by the first and second sink devices 2510 and 2511, and then disappear in the sink devices as the transmission line ends.

In this data transmission system of the seventh embodiment, the return of the data packets including the asynchronous data or video data that are output from the receiving side device to the transmission side device is not required.

In this data transmission system of the seventh embodiment in which the data packet containing the asynchronous data or isochronous data is eliminated on the receiving end and not returned to the transmission end, only the data packet 2702 containing the asynchronous data exists in the transmission frame for the data transmission from the sink device to the source device, and only the data packet 2703 containing the isochronous data exists in the transmission frame for the data transmission from the source device to the sink device.

In this seventh embodiment, the transmission/receipt designation packet designates the device for transmitting the immediately following data packet and the device for receiving this data packet. However, a transmission channel and a receiving channel can be previously allocated to each device, whereby the transmission/receipt designation packet designates the transmission channel of the device for transmitting the data packet and the receiving channel of the device for receiving the data packet.

Further, in the data transmission system of the seventh embodiment the synchronous information is stored in the data packet as asynchronous data and is transmitted. However, the synchronous information can be stored in the data packet as isochronous data so as to be transmitted.

Further, in the data transmission system of the seventh embodiment, the synchronous information is stored in the data packet as asynchronous data and is transmitted. However, in the data transmission system, the first and second sink devices 2510 and 2511 can multiplex the synchronous information as a reference of processing timing for the isochronous data with other packets by using a special transmission/receipt designation packet so as to transmit the multiplexed packet to the first and second source devices 2512 and 2513, respectively, similar to the second embodiment.

Also, in this case, in the source devices of the first and second individual transmission systems constituting the data transmission system, the same frame synchronous signal (timing reference signal) can be reproduced based on the synchronous information that is output from the sink devices.

In addition, in the data transmission system of the seventh embodiment, the transmission/receipt designation packet is transmitted for each fixed time period. However, in the data transmission system of the seventh embodiment, the transmission/receipt designation packets can be transmitted at arbitrary time intervals. Also, in this case, the same effects as those in the data transmission system of the seventh embodiment can be obtained.

Further, in this seventh embodiment, the timing reference signal to be used in the data transmission system is a frame synchronous signal which indicates the head of each video frame (i.e., indicates the start timing of the signal processing for each video frame). However, when the signal processing for each video frame is performed for each of the blocks which divide the video frame, the timing reference signal can be a signal which indicates the timing of the signal processing for each of the blocks (block synchronous signal).

Further, in this seventh embodiment, the camera is connected to each source device as the data output unit which is external to the system, and the video composition device is connected to the sink device as the device which is external to the system. However, the data output unit which is external to the system and connected to the source device can be a video transmission device such as a VTR. Further, the device which is external to the system and connected to the sink device can be a monitor, a display device of a navigation system, or a video recording device.

Further, in the seventh embodiment, specific elements constituting the low-speed transmission line and the high-speed transmission line in the data transmission system are not shown. However, optical fiber can be used for both of the low-speed transmission lines and the high-speed transmission lines. Alternatively, metal lines (wires) can be used for the low-speed transmission lines 2500 and 2502 and the optical fiber can be used for the high-speed transmission lines 2501 and 2503. Also, in this case, the data transmission system similar to the data transmission system of the seventh embodiment can be realized.

Further, the data transmission system of the seventh embodiment can comprise a phase detector for detecting a phase shift of received plural isochronous data in the sink devices 2510 and 2511, and transmit information relating to the phase shift which is detected by the phase detector as asynchronous data or isochronous data that are ouput from the sink first and second devices 2510 and 2511 to the first and second source devices 2512 and 2513, as shown in the fourth embodiment. In this case, when the reproduction timing of the reference signal based on the received information relating to the phase shift is modified by the source device, the isochronous data having the synchronization established can be obtained by the sink first and second devices 2510 and 2511 even when the phase difference between the isochronous data from the two source devices occurs due to a data delay on the transmission line.

Further, in the data transmission system according to any of the aforementioned first to seventh embodiments, the sink device transmits the synchronous information to the source device. However, in the data transmission system of the seventh embodiment, the source device can generate synchronous information and video data, and transmit multiplexed data which are obtained by multiplexing the synchronous information and the video data as isochronous data.

Hereinafter, a description is given of a case where the source device transmits a multiplexed signal which is obtained by multiplexing the video data and the synchronous information as the isochronous data.

Figure 28:
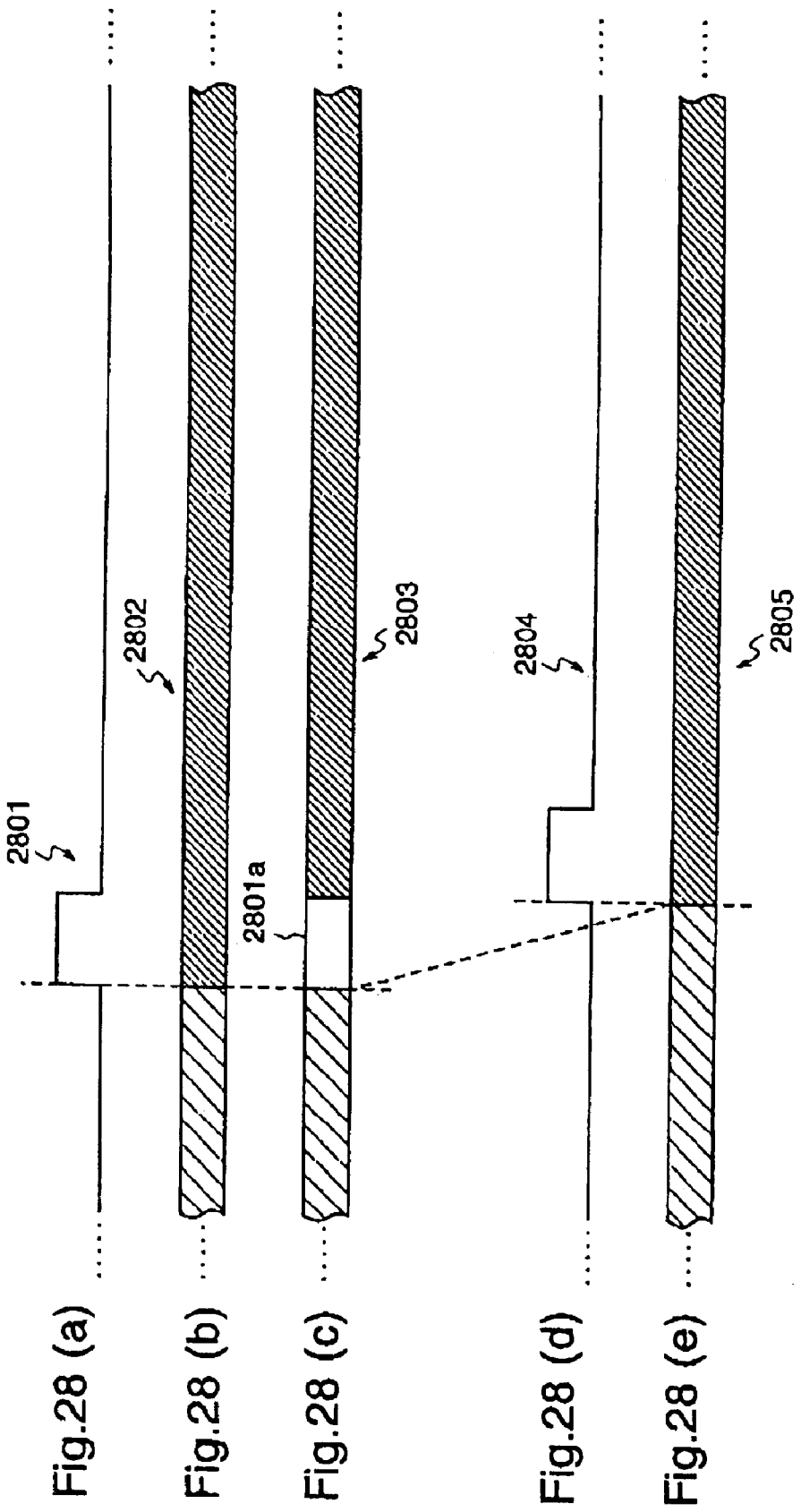
FIGS. 28(a) to 28(e) are diagrams for explaining a processing of transmitting a multiplexed signal as isochronous data in the data transmission system according to any one of the aforementioned embodiments.

FIGS. 28(*a*) to 28(*e*) are diagrams showing the processing of performing data transmission by using the multiplexed signal.

In the source device of the data transmission system of the seventh embodiment, a processing of multiplexing a timing reference signal 2801 (FIG. 28(*a*)) and video data 2802

(FIG. 28(b)) is performed, and a multiplexed signal 2803 (FIG. 28(c)) is generated in the multiplexing processing. Here, the multiplexed signal 2803 includes synchronous information 2801a for reproducing the timing reference signal 2801. This synchronous information 2801a represents the phase of the timing reference signal 2801 for the operational clock of the system (i.e., the operational clock of one of the sink device, source device, data output unit and the video composition device). For example, this includes the frame number, line number or block number of video data.

When the multiplexed signal 2803 is received by the sink device, a timing reference signal 2804 (FIG. 28(d)) and video data 2805 (FIG. 28(e)) are generated in the sink device by the reproduction processing for the multiplexed signal 2803.

As described above, in the data transmission system according to any one of the aforementioned first to seventh embodiments, the source device can transmit the multiplexed signal 2803 (FIG. 28(c)) which is obtained by the multiplexing the video data and the synchronous information as the isochronous data, instead of transmitting the video data 2802 (FIG. 28(b)) between the sink device and the source device or between the source devices. Also, in this case, the sink device can easily reproduce the video data 2805 (FIG. 28(e)) and the reference signal 2804 (FIG. 28(d)) which is synchronized with the video data.

Eighth Embodiment

Figure 29:
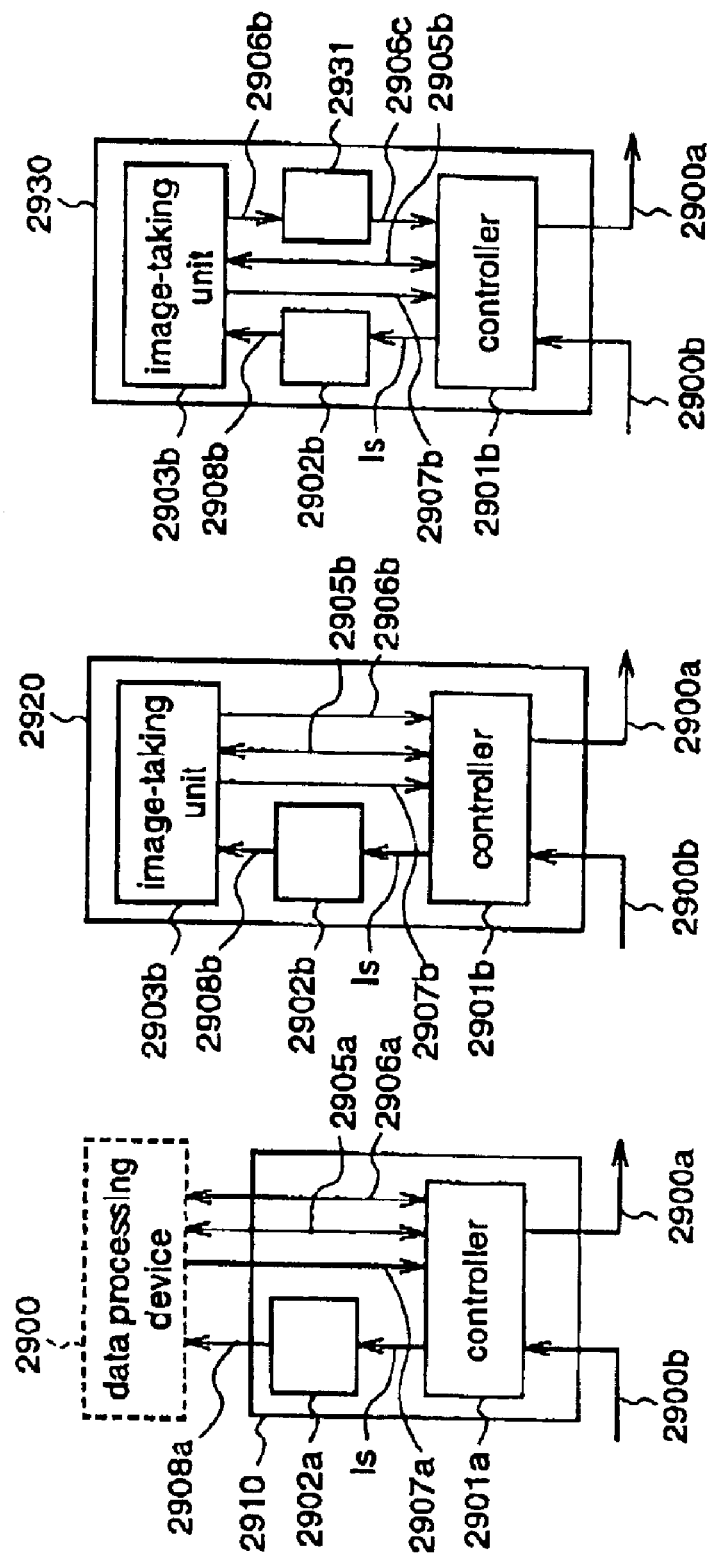
FIGS. 29(a) to 29(c) are diagrams for explaining a data transmission system according to an eighth embodiment of the present invention.
Figure 30:
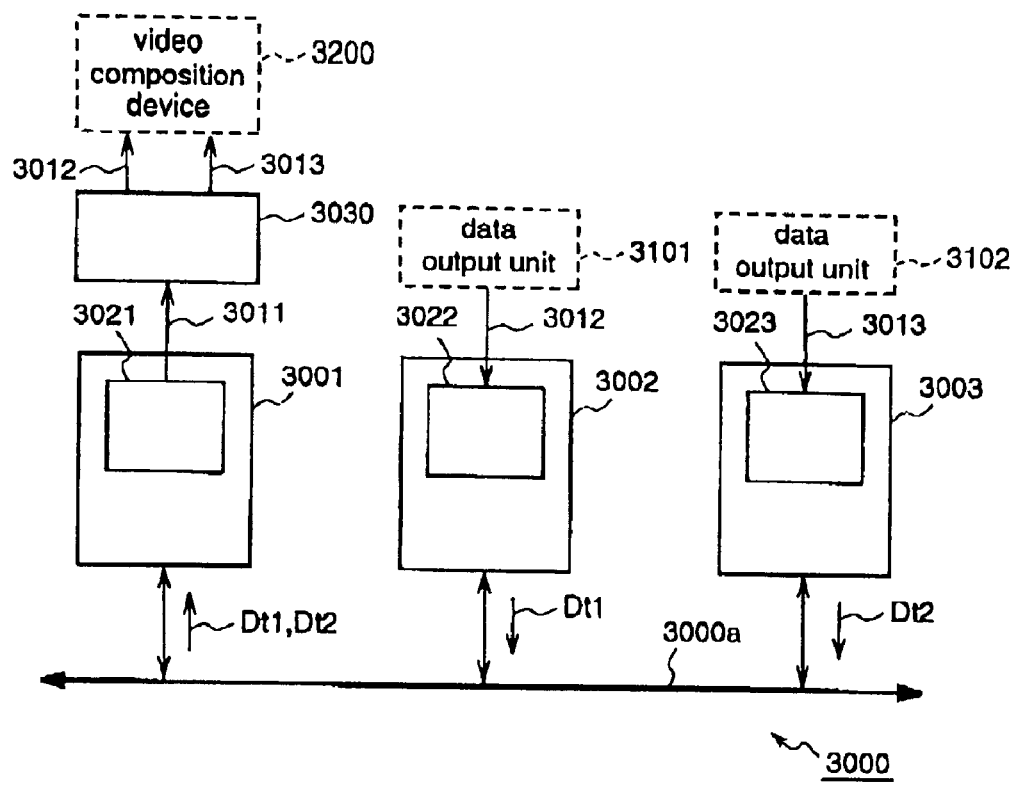
FIG. 30 is a diagram illustrating a prior art data transmission system.

FIGS. 29(a)–29(c) are block diagrams for explaining a data transmission apparatus of the eighth embodiment of the present invention. This data transmission apparatus is used as the sink device or source device of the data transmission system of the first embodiment, for example.

FIG. 29(a) shows a common structure of the data transmission system which is used as the sink device or source device in the data transmission system 10 of the first embodiment.

This data transmission apparatus 2910 comprises a controller 2901a for performing a processing of receiving a transmission data Td from an input side transmission line 2900b, a processing of transmitting the transmission data Td to an output side transmission line 2900a, an accessing processing of data for a data processing device 2900 which is external to the system, and a processing of outputting synchronous information Is that is received as the transmission data Td. The data transmission apparatus 2910 also comprises a reference signal generator 2902a for outputting a timing reference signal 2908a based on the synchronous information to the data processing device 2900.

The transmission data Td includes isochronous data such as video data, or asynchronous data such as control commands and status data In addition, the data access processing of the controller 2901a includes a processing of receiving synchronous information 2907a from the data processing device 2900 and transmitting the synchronous information 2907a as transmission data to the output side transmission line 2900a, a processing of inputting/outputting an isochronous data 2906a such as video data to/from the data processing device 2900, and a processing of inputting/outputting an asynchronous data 2905a such as control commands to/from the data processing device 2900.

When the data processing device 2900 is a data output unit such as a camera or video reproduction device, this data transmission apparatus 2910 operates as the source device of the first embodiment. In addition, when the data processing device 2900 is, for example, a device using plural pieces of isochronous data such as the video composition device 1020, this data transmission apparatus 2910 operates as the sink device of the first embodiment.

FIG. 29(b) shows a camera 2920 having a network control function which is used as the source device in the data transmission system 10 of the first embodiment (hereinafter, referred to as a camera device).

This camera device 2920 comprises an image-taking unit 2903b for performing an image-taking processing based on a frame synchronous signal 2908b and outputting a video data 2906b, and a controller 2901b for performing a processing of receiving the transmission data Td from the input side transmission line 2900b, a processing of transmitting the transmission data Td to the output side transmission line 2900a, an access processing of data for the image-taking unit 2903b and a processing of outputting the synchronous information Is that is received as the transmission data Td. The camera device 2920 also comprises a reference signal generator 2902b for outputting a frame synchronous signal to the image-taking unit 2903b as a timing reference signal 2908b based on the synchronous information Is.

The transmission data Td include isochronous data such as video data, or asynchronous data such as control commands and status data. The data access processing of the controller 2901b includes a processing of receiving an isochronous data 2906b such as video data that is output from the image-taking unit 2903b and transmitting the isochronous data 2906b to the output side transmission line 2900a, and a processing of inputting/outputting an asynchronous data 2905b such as control commands to/from the image-taking unit 2903b.

When the camera device 2920 provides the system with the synchronous information, the data access processing of the controller 2901b also includes a processing of transmitting a frame synchronous signal 2907b that is output from the image-taking unit 2903b as the synchronous information to the output side transmission line 2900a.

In this camera device 2920, the image-taking unit 2903b operates as the data output unit 1011 in the data transmission system 10 of the first embodiment. In addition, the controller 2901b and the reference signal generator 2902b operate as the controller 201b1 and the reference signal generator 202b1 in the first source device 102 of the first embodiment, respectively.

In the camera device 2920 constructed as described above, the video data are output from the image-taking unit 2903b in synchronization with the reference signal that is inherent to the isochronous data which has been reproduced by the reference signal generator 2902b from the synchronous information Is (i.e., frame synchronous signal). Thus, in the data transmission system having a plurality to the camera devices 2920, frame synchronization between video data which are respectively output from the plural camera devices 2920 is established. Therefore, in the data transmission apparatus (sink device) for receiving plural pieces of video data in the data transmission system of the eighth embodiment, plural pieces of video data having the frame synchronization established can be obtained.

FIG. 29(c) shows a camera (camera device) 2930 having a network control function which is used as the source device in the data transmission system 10 of the first embodiment.

This camera device 2930 comprises a video compression unit 2931 for compressing a video data 2906b which is output from the image-taking unit 2903b and outputting a compressed video data 2906c, in addition to the construction of the camera device 2920 as shown in FIG. 29(b). Therefore, in the controller 2901b of the camera device 2930, a processing of transmitting the compressed video data 2906c in place of the video data 2906b to the output side transmission line 2900a is performed as the transmission processing of isochronous data.

In the data transmission apparatus 2910 as shown in FIG. 29(a), the camera device 2920 as shown in FIG. 29(b) and the camera device 2930 as shown in FIG. 29(c), the asynchronous data which are received from the input side transmission line 2900b are input to the controllers 2901a, 2901b, respectively. Therefore, the data transmission apparatus 2910 and the camera devices 2920 and 2930 can be controlled by the asynchronous data.

Further, in the data transmission apparatus 2910 and camera devices 2920 and 2930, status signals which indicate the statuses of the devices are transmitted by the controllers 2901a and 2901b to the output side transmission line 2900a as the asynchronous data. Therefore, in the data transmission apparatus 2910 and the camera devices 2920 and 2930, operational statuses of other devices constituting the data transmission system can be detected.

What is claimed is:

1. A data transmission system comprising:
    a transmission line operable to transmit isochronous data to be processed at a timing in synchronization with a reference signal having a fixed cycle, and asynchronous data to be processed at an arbitrary timing
    a plurality of source devices operable to transmit the isochronous data to said transmission line; and
    at least one sink device operable to receive a plurality of pieces of the isochronous data which have been transmitted to said transmission line; wherein:
    a specific device which is one of said sink device and said plurality of source devices is operable to transmit, to said transmission line, reference signal information for reproducing a predetermined reference signal as a reference for a processing timing of the isochronous data;
    said plurality of source devices other than said specific device are operable to receive the reference signal information which has been transmitted to said transmission line, to obtain the predetermined reference signal, and to output the isochronous data which are synchronized with the reference signal; and
    said sink device is operable to respectively receive the isochronous data from said plurality of source devices in a timing that is synchronous with the reference signal, and to output the plurality of pieces of received isochronous data to a data processing device which is not connected to said transmission line in a timing that is synchronous with the reference signal.

2. The data transmission system of claim 1, wherein:
    the data transmission on said transmission line is repeatedly performed for each transmission frame as a unit of transmission data;
    the transmission frame has a frame header which contains information indicating the head of each transmission frame and an isochronous data slot which contains the isochronous data; and
    said specific device is operable to transmit the reference signal information by including the reference signal information in a special frame header.

3. The data transmission system of claim 2, wherein said specific device is operable to periodically transmit the special frame header which includes the reference signal information.

4. A data transmission system comprising:
    a transmission line operable to transmit isochronous data to be processed at a timing in synchronization with a reference signal having a fixed cycle, and asynchronous data to be processed at an arbitrary timing;
    a plurality of source devices operable to transmit the isochronous data to said transmission line; and
    at least one sink device operable to receive a plurality of pieces of the isochronous data which have been transmitted to said transmission line; wherein:
    a specific device which is one of said sink device and said plurality of source devices is operable to transmit, to said transmission line, reference signal information for reproducing a predetermined reference signal as a reference for a processing timing of the isochronous data;
    said plurality of source devices other than said specific device are operable to receive the reference signal information which has been transmitted to said transmission line, to obtain the predetermined reference signal, and to output the isochronous data which are synchronized with the reference signal;
    the data transmission on said transmission line is performed for each transmission frame as a unit of transmission data;
    each transmission frame includes a frame header which contains information indicating the head of each transmission frame, respectively, an isochronous data slot which contains the isochronous data, and an asynchronous data slot which contains the asynchronous data;
    said sink device os operable to perform a processing of transmitting/receiving the asynchronous data in addition to the processing of receiving the isochronous data;
    said plurality of source devices are operable to perform a processing of transmitting/receiving the asynchronous data in addition to the processing of transmitting the isochronous data; and
    said specific device is operable to store the reference signal information in at least one of the isochronous data slot and asynchronous data slot and to transmit at least one of the isochronous data slot and asynchronous data slot.

5. A data transmission system comprising:
    a transmission line operable to transmit isochronous data to be processed at a timing in synchronization with a reference signal having a fixed cycle, and asynchronous data to be processed at an arbitrary timing;
    a plurality of source devices operable to transmit the isochronous data to said transmission line; and
    at least one sink device operable to receive a plurality of pieces of the isochronous data which have been transmitted to said transmission line; wherein:
    a specific device which is one of said sink device and said plurality of source devices is operable to transmit, to said transmission line, reference signal information for reproducing a predetermined reference signal as a reference for a processing timing of the isochronous data;
    said plurality of source devices other than said specific device are operable to receive the reference signal information which has been transmitted to said transmission line, to obtain the predetermined reference signal, and to output the isochronous data which are synchronized with the reference signal;

wherein the said specific device is operable to transmit, to said transmission line, a transmission/receipt designation packet which contains information designating a source device as a transmission source of the isochronous data and designating a sink device as a transmission destination of the isochronous data; and said specific device is operable to transmit a specific transmission/receipt designation packet which includes the reference signal information.

6. The data transmission system of claim 5, wherein said specific device is operable to periodically transmit the specific transmission/receipt designation packet including the reference signal information.

7. A data transmission system comprising:

a transmission line operable to transmit isochronous data to be processed at a timing in synchronization with a reference signal having a fixed cycle, and asynchronous data to be processed at an arbitrary timing;

a plurality of source devices operable to transmit the isochronous data to said transmission line; and at least one sink device operable to receive a plurality of pieces of the isochronous data which have been transmitted to said transmission line; wherein:

a specific device which is one of said sink device and said plurality of source devices is operable to transmit, to said transmission line, reference signal information for reproducing a predetermined reference signal as a reference for a processing timing of the isochronous data;

said plurality of source devices other than said specific device are operable to receive the reference signal information which has been transmitted to said transmission line, to obtain the predetermined reference signal, and to output the isochronous data which are synchronized with the reference signal;

said sink device and aid plurality of source devices are operable to perform a processing of transmitting/receiving a data packet which contains at least one of the isochronous data and asynchronous data; and said specific device is operable to transmit, to said transmission line, the transmission/receipt designation packet which contains information designating said sink device as a transmission source of the isochronous data, said sink device as a transmission destination of the isochronous data, and at least one of said sink device and one of said plurality of source devices as a transmission source and transmission destination of the asynchronous data, and to transmit the reference signal information by including the reference signal information in at least one of the isochronous data and asynchronous data.

8. A data transmission system comprising:

a transmission line operable to transmit isochronous data to be processed at a timing in synchronization with a reference signal having a fixed cycle, and asynchronous data to be processed at an arbitrary timing;

a plurality of source devices operable to transmit the isochronous data to said transmission line; and at least one sink device operable to receive a plurality of pieces of the isochronous data which have been transmitted to said transmission line; wherein:

a specific device which is one of said sink device and said plurality of source devices is operable to transmit, to said transmission line, reference signal information for reproducing a predetermined reference signal as a reference for a processing timing of the isochronous data;

said plurality of source devices other than said specific device are operable to receive the reference signal information which has been transmitted to said transmission line, to obtain the predetermined reference signal, and to output the isochronous data which are synchronized with the reference signal;

said sink device and said plurality of source devices are operable to perform a processing of transmitting/receiving a data packet which contains at least one of the isochronous data and the asynchronous data;

the data transmission on said transmission line repeatedly performs a unit transmission processing for transmitting data in a fixed time period;

said plurality of source devices and said sink device are operable to transmit the data packet in each transmission cycle as the period of the unit transmission processing to perform arbitration for obtaining a transmission right to transmit the data packet, and to transmit the data packet between a transmission source device which obtains the transmission right of the data packet by the arbitration and a transmission destination device corresponding to the transmission source device; and said specific device is operable to transmit a cycle start packet which indicates a start timing of the transmission cycle as the period of the unit transmission processing for each fixed time period, and to transmit the reference signal information to said transmission line by including the reference signal information in at least one of the isochronous data and asynchronous data.

9. A data transmission system comprising:

a transmission line operable to transmit isochronous data to be processed at a timing in synchronization with a reference signal having a fixed cycle, and asynchronous data to be processed at an arbitrary timing;

a plurality of source devices operable to transmit the isochronous data to said transmission line; and at least one sink device operable to receive a plurality of pieces of the isochronous data which have been transmitted to said transmission line; wherein:

a specific device which is one of said sink device and said plurality of source devices is operable to transmit to said transmission line, reference signal information for reproducing a predetermined reference signal as a reference for a processing timing of the isochronous data;

said plurality of source devices other than said specific device are operable to receive the reference signal information which has been transmitted to said transmission line, to obtain the predetermined reference signal, and to output the isochronous data which are synchronized with the reference signal;

a plurality of individual transmission systems are formed, each individual transmission system including at least one of said plurality of source devices and at least one of said sink device;

one specific device from among the at least one source device and said at least one sink device constituting each of the individual transmission systems is operable to transmit the reference signal information to the device other than said specific device in the individual transmission system including said specific device; and the device other than said specific device in each of the individual transmission systems is operable to receive the reference signal information transmitted from said specific device, and to reproduce a reference signal which is inherent to each of the individual transmission systems.

10. A data transmission system comprising:
a transmission line operable to transmit isochronous data to be processed at a timing in synchronization with a reference signal having a fixed cycle, and asynchronous data to be processed at an arbitrary timing;
a plurality of source devices operable to transmit the isochronous data to said transmission line; and
at least one sink device operable to receive a plurality of pieces of the isochronous data which have been transmitted to said transmission line; wherein:
a specific device which is one of said sink device and said plurality of source devices is operable to transmit, to said transmission line, reference signal information for reproducing a predetermined reference signal as a reference for a processing timing of the isochronous data;
said plurality of source devices other than said specific device are operable to receive the reference signal information which has been transmitted to said transmission line, to obtain the predetermined reference signal, and to output the isochronous data which are synchronized with the reference signal;
said sink device comprises a phase detector which is operable to detect a phase shift amount of the received plurality of pieces of isochronous data, and said sink device is operable to transmit phase difference information which indicates the phase shift amount detected by said phase detector; and
at least one of the said plurality of source devices is operable to modify a timing of reproducing the reference signal from the reference signal information based on the phase difference information which is transmitted from said sink device so as to reduce the phase shift amount in said sink device.

11. A data transmission system comprising:
a source device operable to transmit isochronous data to be processed at a timing in synchronization with a reference signal having a fixed cycle;
a sink device operable to receive the isochronous data which have been transmitted from said source device; and
first and second transmission lines which have different data transmission directions and which connect said source device and said sink device in a one-to-one relationship; wherein:
said first transmission line is a low-speed transmission line having a low data transmission rate, and is operable to transmit data from said sink device to said source device,
said second transmission line is a high-speed transmission line having a data transmission rate that is higher than the transmission rate of said first transmission line, and is operable to transmit data from said source device to said sink device;
said sink device is operable to perform an information transmission processing of transmitting, to said source device via said first transmission line, reference signal information for reproducing a predetermined reference signal as a reference of a processing timing of the isochronous data;
said source device is operable to perform a signal reproduction processing of receiving the reference signal information from said sink device and reproducing the predetermined reference signal from the received reference signal information, and a data transmission processing of transmitting the isochronous data to said sink device via said second transmission line in synchronization with the reproduced predetermined reference signal; and
a transmission speed of the isochronous data on said second transmission line is higher than a transmission speed of the reference signal information on said first transmission line.

12. The data transmission system of claim 11, wherein:
said sink device and said source device are operable to perform a processing of transmitting/receiving asynchronous data to be processed at an arbitrary timing;
the data transmission on each of said first and second transmission lines is performed for each transmission frame as a unit of transmission data;
data transmission from said sink device to said source device is performed in a unit of a first transmission frame, which has a frame header indicating the head of each transmission frame, and an asynchronous data slot containing the asynchronous data to be processed at an arbitrary timing;
data transmission from said source device to said sink device is performed in a unit of a second transmission frame which has the frame header, an isochronous data slot containing the isochronous data, and the asynchronous data slot; and
said sink device is operable to transmit the reference signal information by including the reference signal information in the frame header of the first transmission frame.

13. The data transmission system of claim 12, wherein said sink device is operable to transmit the frame header including the processing timing information in a fixed cycle.

14. The data transmission system of claim 11, wherein:
said sink device and said source device perform a processing of transmitting/receiving asynchronous data to be processed at an arbitrary timing;
the data transmission on each of the transmission lines is performed for each transmission frame as a unit of transmission data;
data transmission from said sink device to said source device is performed in a unit of a first transmission frame which has a frame header indicating the head of each transmission frame and an asynchronous data slot containing the asynchronous data to be processed at an arbitrary timing;
data transmission from said source device to said sink device is performed in a unit of a second transmission frame which has the frame header and an isochronous data slot containing the isochronous data and the asynchronous data slot; and
said sink device is operable to transmit the reference signal information by including the reference signal information in the asynchronous data.

15. The data transmission system of claim 11, wherein:
said sink device is operable to store, in a transmission/receipt designation packet, information which designates a device as a transmission source of the isochronous data and a device as a transmission destination of the isochronous data, to transmit the transmission/receipt designation packet to said first transmission line; and
a specific transmission/receipt designation packet which is transmitted from said sink device includes the reference signal information.

16. The data transmission system of claim 15, wherein said sink device is operable to periodically transmit the specific transmission/receipt designation packet including the reference signal information.

17. The data transmission system of claim 11, wherein:
said sink device is operable to perform a processing of transmitting/receiving asynchronous data to be processed at an arbitrary timing, to perform a processing of storing in a transmission/receipt designation packet to be transmitted to said first transmission line, information which designates a device as a transmission source of at least one of the isochronous data and the asynchronous data and a device as a transmission destination of at least one of the isochronous data and the asynchronous data, and to store the reference signal information in a required asynchronous data packet from among asynchronous data packets including the asynchronous data to be transmitted to said first transmission line; and
said source device operable to perform a processing of transmitting/receiving the asynchronous data to be processed at an arbitrary timing in addition to transmitting an isochronous data packet which contains the isochronous data to said second transmission line.

18. The data transmission system of claim 1, wherein at least one of said first and second transmission lines is composed of an optical fiber.

19. The data transmission system of claim 1, wherein
said sink device and said plurality of source devices are operable to transmit/receive data as an optical signal; and
said transmission line comprises:
an optical star coupler having a plurality of input terminals and a plurality of output terminals, said optical star coupler being operable to output the optical signal which has been supplied to any one of said plurality of input terminals from all of said plurality of output terminals;
output side optical fibers operable to connect output terminals of said sink device and said plurality of source devices and said plurality of input terminals of said optical star coupler; and
input side optical fibers operable to connect input terminals of said sink device and said plurality of source devices and said plurality of output terminals of said optical star coupler.

20. The data transmission system of claim 11, wherein:
said sink device is operable to transmit output data as an electric signal and to receive input data as an optical signal;
said source device is operable to transmit output data as an optical signal and to receive input data as an electric signal;
said first transmission line for transmitting data from said sink device to said source device is composed of a conductor which propagates the electric signal; and
said second transmission line for transmitting data from said source device to said sink device is composed of an optical fiber which propagates the optical signal.

21. A data transmission system comprising:
a transmission line operable to transmit isochronous data to be processed at a timing in synchronization with a reference signal having a fixed cycle, and asynchronous data to be processed at an arbitrary timing;
a plurality of source devices operable to transmit the isochronous data to said transmission line; and
at least one sink device operable to receive a plurality of pieces of the isochronous data which have been transmitted to said transmission line, wherein:
a specific device which is one of said sink device and said plurality of source devices is operable to transmit, to said transmission line, reference signal information for reproducing a predetermined reference signal as a reference for a processing timing of the isochronous data;
said plurality of source devices other than said specific device are operable to receive the reference signal information which has been transmitted to said transmission line, to obtain the predetermined reference signal, and to output the isochronous data which are synchronized with the reference signal;
at least one of said plurality of source devices is respectively connected to a video data output unit which has at least one of an image-taking unit operable to perform an image-taking processing and a video reproduction unit operable to perform a reproduction processing for video data, and said at least one of said plurality of source devices is operable to transmit the video data output from said video data output unit to said transmission line as isochronous data; and
said sink device is connected to a video processing device operable to at least one of compose and record a plurality of pieces of video data, and said sink device is operable to receive the plurality of pieces of video data which have been transmitted from said plurality of source devices as isochronous data so as to supply the plurality of pieces of video data to said video processing device.

22. The data transmission system of claim 21, wherein at least one of said plurality of source devices comprises a video compression unit operable to compress the video data which have been supplied from said video data output unit and output compressed video data, and said at least one of said plurality of source devices is operable to transmit the compressed video data as the isochronous data.

23. A data transmission system comprising:
a transmission line operable to transmit isochronous data to be processed at a timing in synchronization with a reference signal having a fixed cycle, and asynchronous data to be processed at an arbitrary timing;
a plurality of source devices operable to transmit the isochronous data to said transmission line; and
at least one sink device operable to receive a plurality of pieces of the isochronous data which have been transmitted to said transmission line; wherein:
a specific device which is one of said sink device and said plurality of source devices is operable to transmit, to said transmission line, reference signal information for reproducing a predetermined reference signal as a reference for a processing timing of the isochronous data;
said plurality of source devices other than said specific device are operable to receive the reference signal information which has been transmitted to said transmission line, to obtain the predetermined reference signal, and to output the isochronous data which are synchronized with the reference signal;
said sink device, said plurality of source devices, and said transmission line which connects said sink device and said plurality of source devices are mounted on a motor vehicle;

at least one of said plurality of source devices is respectively connected to a motor-vehicle-mounted video data output unit having at least one of an image-taking unit which is operable to perform an image-taking processing, and a video reproduction unit which is operable to perform a reproduction processing for video data, and said at least one of said plurality of source devices is operable to transmit the video data which have been output from said video data output unit as the isochronous data to said transmission line;

said sink device is connected to a motor-vehicle-mounted video processing device which is operable to at least one of compose and record a plurality of pieces of video data, and said sink device is operable to received the plurality of pieces of video data which have been transmitted from said at least one of said plurality of source devices as the isochronous data so as to supply the data to said video processing device; and said sink device, said at least one of said plurality of source devices, and said transmission line constitute a network for transmitting the video data in the motor vehicle.

24. A data transmission method for transmitting isochronous data to be processed at a timing in synchronization with a reference signal having a fixed cycle and asynchronous data to be processed at an arbitrary timing from a plurality of source devices as transmission sources of the isochronous data to at least one sink device as a transmission destination of the isochronous data via a transmission line, said method comprising:

transmitting reference signal information for reproducing a predetermined reference signal as a reference of a processing timing of the isochronous data from a specific device from among the sink device and the plurality of source devices to the transmission line, and outputting isochronous data from the plurality of source devices in a timing that is synchronous with the reproduced reference signal;

receiving the reference signal information transmitted in said transmitting of the reference signal information to the transmission line, and reproducing the reference signal in the plurality of source devices; and receiving, in the sink device, the isochronous data respectively outputted from the plurality of source devices in a timing that is synchronous with the reference signal, and outputting the plurality of pieces of received isochronous data to an external data processing device in a timing that is synchronous with the reference signal.

25. A data transmission method for transmitting isochronous data to be processed at a timing in synchronization with a reference signal having a fixed cycle from a source device as a transmission source of the isochronous data to a sink device as a transmission destination of the isochronous data;

wherein said sink device is connected to said source device in a one-to-one relationship via first and second transmission lines, said first transmission line being a low-speed transmission line having a low data transmission rate and being operable to transmit data from said sink device to said source device, and said second transmission line being a high-speed transmission line having a higher transmission rate than the transmission rate of said first transmission line and being operable to transmit data from said source device to said sink device;

wherein said method comprises:

transmitting reference signal information for reproducing a predetermined reference signal as a reference of a processing timing of the isochronous data from said sink device to said source device via said first transmission line;

receiving the reference signal information from said sink device, and reproducing the predetermined reference signal in said source device; and transmitting the isochronous data to said sink device via said second transmission line in synchronization with the reproduced predetermined reference signal; and wherein a transmission speed of the isochronous data on said second transmission line is higher than a transmission speed of the reference signal information on said first transmission line.

26. A data transmission apparatus which is connected to a transmission line and which at least one of transmits and receives isochronous data to be processed at a timing in synchronization with a reference signal having a fixed cycle and asynchronous data to be processed at an arbitrary timing via the transmission line, said apparatus comprising:

a controller operable to control the transmission or receipt of the isochronous data and asynchronous data;

a reference signal generator operable to reproduce the reference signal based on reference signal information for reproducing a predetermined reference signal as a reference of a processing timing of the isochronous data, which have been received as the asynchronous data; and an image-taking unit operable to perform an image-taking processing and to output video data; wherein:

said image-taking unit is operable to output the video data in synchronization with the reference signal which has been reproduced by said reference signal generator; and said controller is operable to transmit the video data which have been output from said image-taking unit as the isochronous data to said transmission line.

27. The data transmission apparatus of claim 26, further comprising:

a video compression unit operable to compress the video data outputted from said image-taking unit and to output compressed video data, wherein said controller is operable to transmit the compressed video data as the isochronous data.

28. The data transmission system of claim 11, wherein said transmission line is composed of an optical fiber.

29. The data transmission system of claim 11, wherein:

said source device is connected to a video data output unit having at least one of an image-taking unit which is operable to perform an image-taking processing and a video reproduction unit which is operable to perform a reproduction processing for video data, and said source device is operable to transmit the video data output from said video data output unit to said transmission line as isochronous data; and said sink device is connected to a video processing device which is operable to compose or record a plurality of pieces of video data, and said sink device is operable to receive the plurality of pieces of video data which have been transmitted from said source device as isochronous data so as to supply the data to said video processing device.

30. The data transmission system of claim 29, wherein said source device comprises a video compression unit which is operable to compress the video data which have been supplied from the video data input unit and to output compressed video data, and said source device is operable to transmit the compressed video data as the isochronous data.

31. The data transmission system of claim 11, wherein:
said sink device, said source device, and said transmission line which connects said sink device and said source device are mounted on a motor vehicle;

said source device is connected to a motor-vehicle-mounted video data output unit having at least one of an image-taking unit which is operable to perform an image-taking processing and a video reproduction unit which is operable to perform a reproduction processing for video data, and said source device is operable to transmit the video data which have been output from said video data output unit as the isochronous data to said transmission line;

said sink device is connected to a motor-vehicle-mounted video processing device which is operable to compose or record a plurality of pieces of video data, said sink device is operable to receive the plurality of pieces of video data which have been transmitted from said source device as the isochronous data so as to supply the data to said video processing device; and said sink device, said source device, and said transmission line constitute a network for transmitting the video data in the motor vehicle.

* * * * *

UNITED STATES PATENT AND TRADEMARK OFFICE
CERTIFICATE OF CORRECTION

PATENT NO. : 6,961,345 B2
APPLICATION NO. : 09/749723
DATED : November 1, 2005
INVENTOR(S) : Yuji Mizuguchi et al.

It is certified that error appears in the above-identified patent and that said Letters Patent is hereby corrected as shown below:

On the Title Page, item (56) References Cited, under the heading "OTHER PUBLICATIONS"

Under the second reference,

Line 2, please change "Mashushita" to --Matsushita-- after "Systems" and before "Technical".

Line 4, please change "jun." to --June-- after "3," and before "1998".

Fourth Reference

Line 1, please change "Orented" to --Oriented-- after "Media" and before "Systems".

Line 1, please change "Ttrnsport" to --Transport-- after "Systems" and before "(Most)".

Line 2, please change "Medai" to --Media-- after "Fahrzeung".

Line 3, please change ")Most)" to --(Most)-- after "Transport" and before "Standard".

Fifth Reference

Line 1, please change "Philips" to --Philps--.

Line 2, please change "Reserach Elsevier," to --Research, Elsevier,-- after "of" and before "Amsterdam".

Sixth Reference

Line 2, please change "IEE" to --IEEE--.

Line 3, please change "IEE" to --IEEE-- before "Inc.".

Line 3, please change "Yuork, US." to --York, US,-- after "New" and before "vol.".

In Column 73, Line 29, please add --;-- after "timing".

In Column 74, Line 31, please change "os" to --is-- after "device" and before "operable".

In Column 75, Line 1, please delete "wherein the" before "said".

UNITED STATES PATENT AND TRADEMARK OFFICE
CERTIFICATE OF CORRECTION

PATENT NO. : 6,961,345 B2
APPLICATION NO. : 09/749723
DATED : November 1, 2005
INVENTOR(S) : Yuji Mizuguchi et al.

It is certified that error appears in the above-identified patent and that said Letters Patent is hereby corrected as shown below:

In Column 75, Line 36, please change "aid" to --said-- after "and" and before "plurality".

In Column 76, Line 41, please add --,-- after "transmit" and before "to".
In Column 77, Line 29, please delete "the" after "of" and before "said".
In Column 78, Line 15, please change "data;" to --data,-- after "transmission".
In Column 78, Line 40, please change "data;" to --data,-- after "transmission".
In Column 78, Line 60, please add --and-- after "," and before "to".
In Column 79, Line 9, please add --,-- after "storing" and before "in".
In Column 79, Line 20, please add --is-- after "device" and before "operable".
In Column 80, Line 3, please change "," to --;-- after "line" and before "wherein".
In Column 80, Line 37, please add --to-- after "and" and before "output".
In Column 81, Line 5, please delete "," after "processing" and before "and".
In Column 82, Line 38, please delete ":" after "comprising".

Signed and Sealed this

Eighth Day of August, 2006

JON W. DUDAS
*Director of the United States Patent and Trademark Office*